United States Patent [19]

Covington et al.

[11] Patent Number: 5,524,193

[45] Date of Patent: Jun. 4, 1996

[54] INTERACTIVE MULTIMEDIA ANNOTATION METHOD AND APPARATUS

[75] Inventors: Sam Covington, Inglewood; Morgan Newman, Topanga; Allen Debevoise, Los Angeles; Christian Van Hammersveld, San Diego; Brian Black, W. Los Angeles, all of Calif.

[73] Assignee: AND Communications, Los Angeles, Calif.

[21] Appl. No.: 301,261

[22] Filed: Sep. 2, 1994

Related U.S. Application Data

[63] Continuation of Ser. No. 779,069, Oct. 15, 1991, abandoned.

[51] Int. Cl.⁶ .................................................. G06T 1/00
[52] U.S. Cl. .................................... 395/154; 395/159
[58] Field of Search ................................ 395/154, 600, 395/155–161; 369/83, 84; 434/317, 323

[56] References Cited

U.S. PATENT DOCUMENTS

| | | | |
|---|---|---|---|
| 4,943,866 | 7/1990 | Barker et al. | 358/335 |
| 5,109,482 | 4/1992 | Bohrman | 395/154 |
| 5,241,671 | 8/1993 | Reed et al. | 395/600 |
| 5,367,621 | 11/1994 | Cohen et al. | 395/154 |

OTHER PUBLICATIONS

Tonomura et al, "Content Oriented Visual Interface Using Video Icons . . .;" 1989 IEEE Workshop on Visual Languages; 4–6 Oct. 1989; pp. 68–73.

*Primary Examiner*—Heather R. Herndon
*Assistant Examiner*—Joseph H. Feild
*Attorney, Agent, or Firm*—Hecker & Harriman

[57] ABSTRACT

The present invention provides an improved method for annotating a text document or other media event with any other media event or events. One aspect of the invention allows authors to quickly and easily, without the hard programming of the prior art, create a sequence of media events that are connected to a particular word or phrase in a text, a portion of a graphic illustration, or to an audio or video clip. The media events used in a sequence may be selected from a library of media events, or may be created by the user from scratch or by modifying existing media events. Another aspect of the invention allows a trigger, and the sequence of media events connected to that trigger, to be associated with a particular "filter". A "filter", as the term is used in the present invention, is a particular grouping of triggers. Any desired number of filters and triggers may be created.

34 Claims, 14 Drawing Sheets

FIG. 2

POETRY; ULYSSES, by TENNYSON

It little profits that an idle king,
By this still hearth, a[n]
Matched with an aged
Unequal laws uto a sa
That hoard, and sleep Hyades A V-shaped cluster of
stars in the head of the
constellation Taurus held
by the ancients to indicate
rainy weather when they
rise with the sun.

I cannot rest from tra
Life to the lees, All ti[me]
Greatly, have suffered greatly, both with those
That loved me, and alone: on shore, and when
Through scudding drifts the rainy Hyades

EXPLORE
REF
HELP

DEFINE
CONTEXT
INTERPRET
METHOD
LINK

INTERACTIVE MULTIMEDIA ANNOTATION METHOD AND APPARATUS

This is a continuation of application Ser. No. 779,069 filed Oct. 15, 1991 abandoned.

BACKGROUND OF THE INVENTION

1. Field of the Invention

The present invention relates to the field of multimedia creation and presentation apparatuses and processes, and more particularly to an interactive method for annotating a multimedia work.

2. Background Art

"Multimedia" is a term used to describe the combined use of different kinds of information storage and/or communication media. Examples of information storage media include books, phonograph records, audio and video tapes, microfilm, and magnetic and optical disks. Examples of communication media include written words ("text"), still pictures ("graphics"), sounds ("audio") moving pictures ("video"), light, live performances, and other forms of expression that can be perceived or sensed, including such things as smell and feel. Common examples of multimedia works include magazines and illustrated books (combining text and graphics), movies (combining audio and video), and laser light shows (combining lights, live acting, and sound).

Personal computers typically have the capability to provide information by means of multiple forms of media. Depending on its sophistication and configuration, a personal computer can typically display information in text or pictorial form (either still or animated) on a display screen and can emit sounds through a loudspeaker. Accordingly, computers tend to have some multimedia capabilities. In the past, however, the use of the multimedia potential of personal computers has been limited. To some extent this limited use has been dictated by limitations on the amount of memory that could be addressed by and the computational speed of the central processing units of the computers. These limitations were especially relevant to full motion video, which requires a large amount of memory and computational capacity.

As performance of personal computers has improved, so has their ability to more fully utilize multimedia. One area in which multimedia applications for personal computers have been developing is in what can be referred to as the "audio-visualization" of literary and other artistic works. One prior art example is a multimedia encyclopedia in which the text and illustrations found in a book version of an encyclopedia are supplemented on a computer with audio and video segments or "clips". Like an encyclopedia in book form, a computer based encyclopedia may contain entries for a variety of separate topics. For example, there may be an entries for topics such as "Shakespeare", "Dinosaurs", "Olympics", and others. For an entry such as "Shakespeare", for example, in addition to the text and pictorial entries contained in the written encyclopedia, the computer based encyclopedia may also provide an audio clip of an actor reading lines from a Shakespearean play and a video clip of a Shakespearean performance.

Each media segment described above (that is, a piece of text, an illustration, an audio or video clip) may be referred to as a "media event" or simply an "event". For example, the text entry that is displayed under any topic of the computer based encyclopedia described above may be referred to as a "text event". Any illustration displayed may be referred to as a "graphic event". Any audio segment displayed may be considered to be a "audio event". And any video segment displayed may be considered to be a "video event".

If more than one media event is available for a particular topic, a procedure must be implemented to determine when and how the various media events are presented to the user. Referring back to the "Shakespeare" example described above, one possibility is to have the text event be the default media event, that is, the first event that would ordinarily be presented when a topic is queried. The other media events available would be listed on a menu on the computer display. A user, who in this instance may also be referred to as a "reader", can call up the other available media events through the execution of an appropriate keyboard, mouse, or other command. It may also be possible to display more than one media event simultaneously.

More than one of each kind of media event may be available for each topic. For example, in addition to a video clip of a Shakespearean play, video clips of an eminent scholar discussing the significance of "Macbeth" or of the English countryside may be included under the topic "Shakespeare".

In prior art multimedia works, the media events associated with a particular topic are predetermined by the author of the work. The author decides what events to use, where to use them, and how to present them to the reader. Once the author has decided what events to use for a particular topic, appropriate computer programming codes are written into the software that drives the multimedia work fixing the author's choices. Once the programming of a work is complete, the arrangement of topics and media events can generally only be changed by reprogramming. The reader is presented with a fixed work, and has no choice as to what events may be associated with what topics.

SUMMARY OF THE INVENTION

The present invention provides an improved method for annotating a text document or other media event with any other media event or events.

One aspect of the invention allows authors to quickly and easily, without the "hard programming" of the prior art, create a sequence of media events that are connected to a particular word or phrase in a text document or a section of a graphic illustration. Such word, phrase or section to which a sequence of media events is connected will be referred to herein as a "trigger". The invention also provides to users (who may include "authors" who create and/or modify a multimedia work and "readers" who view and interact with works created by authors) the same capabilities previously available only to programmers: that is, the ability to create sequences of media events that are connected to and accessible from other media events, and the ability to change existing annotating sequences. The media events used in a given sequence may be selected from a library of media events, or may be created by a user from scratch or by modifying existing media events. Also, each media event used in the annotation sequence may itself be annotated.

Another aspect of the invention allows a trigger, and the sequence of media events connected to that trigger, to be associated with a particular "filter". A "filter", as the term is used in the present invention, is a particular grouping of triggers. For example, in one embodiment of the invention, a standard set of filters provided includes a "Define" filter. In this embodiment, triggers associated with the "Define" filter have event sequences connected to them that are intended by the author to provide a definition for the trigger. When the "Define" filter is activated, the triggers that are associated with the "Define" filter in a connection map in the computer's memory are highlighted on the work that is displayed. Activating a highlighted trigger (typically by positioning a cursor over the trigger and pressing and releasing or "clicking" a mouse button) initiates the connected "defining" sequence. A "connection map", a look-up table in the computer's memory, records the location of triggers in a media work, the filter each trigger is associated with, and the media sequence connected to that trigger.

If a different "filter" is activated, the triggers associated with the new filter are displayed. The triggers for one filter may be the same as or different from the triggers for a different filter. If a particular trigger is associated with more than one filter, it may have a different sequence connected to it for each filter. For example, the sequence that is displayed when a trigger is selected while the "Define" filter is active may be different from the sequence that is displayed when the same trigger is activated under a different filter (as for example a "Context" filter). Which trigger is associated with which filter, what name the filter is given, and what events are connected to the trigger, are determined by the creator of the trigger and the connected event sequence. Any desired number of filters and triggers may be created.

BRIEF DESCRIPTION OF THE DRAWINGS

FIG. 2 illustrates a second main display screen of an embodiment of the present invention.

DETAILED DESCRIPTION OF THE INVENTION

A method and apparatus for annotating multimedia works with sequences of multimedia events is described. In the following description, numerous specific details, such as microprocessor type, memory storage type, etc, are set forth in detail in order to provide a more thorough description of the present invention. In addition, certain specific user actions may be described, such as "clicking on" or "dragging and dropping." It will be apparent, however, to one skilled in the art, that the present invention may be practiced without these specific details. In other instances, well known features have not been described in detail so as not to obscure the present invention.

The present invention may be used with a variety of computers, operating systems, storage media (including magnetic disk, CD-ROM, and laserdisk) and communication media. One embodiment of the invention is incorporated in a software program running under the Windows 3.0™ graphical environment from Microsoft Corporation on an IBM PS/2 personal computer with a 25 Mhz Intel 80386 microprocessor and 8 megabytes of RAM. Connected to the computer are a CD-ROM player, a laserdisk player such as the Pioneer LDV-8000, and a video display monitor capable of digitizing live video, such as a Matrox Illuminator-16. Another embodiment of the invention may be used with the OS/2 Presentation Manager™ graphical environment from IBM.

Figure 1:
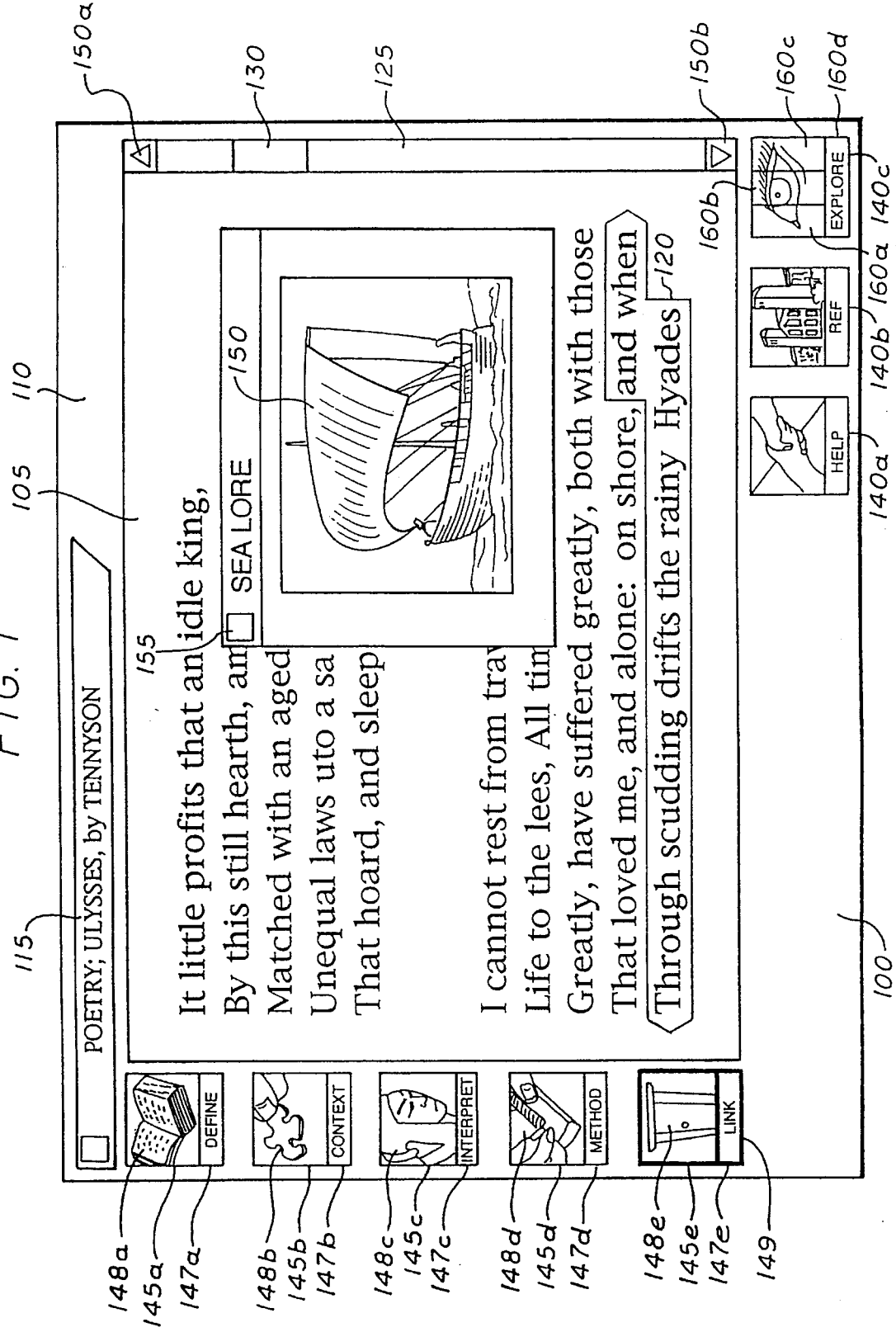
FIG. 1 illustrates a main display screen of one embodiment of the present invention.

FIG. 1 shows a screen 100 that may be displayed on a display monitor by a computer program incorporating features of the present invention. Screen 100 consists primarily of a central main display window 105 and a border 110. Central display window 105 is shown displaying a portion of the poem Ulysses by Lord Alfred Tennyson, as identified in title bar 115. The phrase "and when Through scudding drifts the rainy Hyades" is highlighted with a shaded bar 120. As used herein, the term "highlighting" means marking or displaying an item in a manner that distinguishes it from items that are not highlighted. A scroll bar 125 incorporating an elevator button 130 is found to the right of main window 105. Three "tool" buttons 140a, 140b and 140c are located along the bottom right portion of border 110. Five "filter" buttons 145a, 145b, 145c, 145d and 145e are located along the left side portion of border 110. A video event window 150 incorporating a "close" button 155 is displayed within main display window 105. Video event window 150 is shown displaying an illustration of a sailing vessel.

The screen shown in FIG. 1 shows a portion of a multimedia work whose subject is the poem "Ulysses" by Lord Alfred Tennyson. In the present example, the work consists of the original text of the poem annotated with text, video, graphic and audio events. When the work is first opened, an initial screen, typically showing a title page, may be displayed. The screen shown in FIG. 1 may be reached from the initial screen by taking the actions described below.

The vertical position of elevator button 130 along scroll bar 125 controls what portion of the document fin the present example the text of the poem Ulysses) is displayed. If the elevator button 130 is at the top of scroll bar 125, the beginning of the text file is displayed. If elevator button 130 is at the bottom of scroll bar 125 the end of the text file is displayed. The elevator button 130 may typically be moved by positioning a cursor over the elevator button 130 with a mouse, pressing and holding a mouse button, and, while holding the mouse button, dragging the elevator button 130 up or down along scroll bar 125. The elevator bar 130 may also me moved by clicking a mouse button while a cursor is displayed over one of the two arrow buttons 150a and 150b (This action of selecting an item by positioning a cursor at a particular position over a displayed item on a screen and pressing a mouse button is referred to herein as "clicking on" that position or item. Whenever an item is herein described to have been "clicked-on" or "double-clicked," it is intended that any other appropriate method of selecting that item, as are known in the art, may be used as well). Each mouse button click moves the elevator bar the equivalent of one screen of text in the direction of the arrow.

The position of the elevator bar 130 in FIG. 1 is near the top of scroll bar 125. Accordingly, the text displayed in main display window 105 is text from near the beginning of the poem.

In the embodiment of FIG. 1 there are five filters and five associated filter buttons 145a to 145e (in other embodiments, there may be any desired number of filters). Filter buttons 145a to 145e determine which "triggers" are displayed in main display window 105. As described previously, a "trigger" has additional information connected to it in the form of a sequence or hierarchy of media events that is linked to that trigger in a "connection map" look-up table in the computer's memory. For a text document such as the poem "Ulysses" shown in main display window 105 in FIG. 1, a trigger typically would consist of a word or a group of words. Triggers may be shown by being highlighted. For example, in FIG. 1, shaded bar 120 highlights the trigger consisting of the words "and when Through scudding drifts the rainy Hyades". In a color display system, shaded bar 120 may be colored. The color of the bar may coincide with the color of the appropriate label 147a to 147e displayed on the filter button 145a to 145e that is currently activated for ease of association by the user. In the example of FIG. 1, the "Link" filter 145e is highlighted (as shown in FIG. 1 by highlight frame 149) The "Link" filter is therefore activated. Accordingly, on a color monitor, shaded bar 120 might be shown having the same color as label 147e of "Link" filter button 145e.

The media events "connected to" a highlighted trigger may be accessed by selecting that trigger, for example by clicking on it with a mouse (the term "connected to" as used here means that these media events are in some manner identified as being associated with a given trigger, for example by being linked together in a connection map memory table as described above). The media event connected to the trigger indicated by shaded bar 120 in FIG. 1 is the illustration of a sailing vessel labeled "Sea Lore" shown in video event window 150. In the example shown in FIG. 1, only one event is directly connected to the trigger identified by shaded bar 120. However, other triggers may have more than one event connected to them. Depending on the type and number of connected events, the events may be displayed simultaneously in separate windows on the display screen. Alternatively, they may be displayed sequentially, with the event subsequent to the one currently displayed being initiated either automatically or manually. Each event displayed may also contain its own triggers, each of which may also be selected to display a connected media sequence.

FIG. 2 shows the same text screen as shown in FIG. 1. However, instead of "Link" filter button 145e being activated, "Define" filter button 145a is activated. Accordingly, the trigger highlighted by shaded bar 120 in FIG. 1 is no longer highlighted. Instead, trigger 205 (consisting of the word "lees") and trigger 210 (consisting of the word "Hyades") are highlighted. In a color display system, the highlighting of triggers 205 and 210 may be the same color as label 147a of "Define" filter button 145a (which is preferably a different color or shade than that used to highlight the triggers shown when any of the other filter buttons 145b to 145e are activated).

In FIG. 2, trigger 210 has been selected. As a result, the media event sequence connected to trigger 210 is displayed.

In the example of FIG. 2, the media event connected to trigger 210 is a text event consisting of a dictionary definition of the word "Hyades". This definition is displayed in text event window 200.

Although in the example of FIG. 2 only one media event is directly connected to trigger 210 (i.e. the text event of window 200), other media events can be nested within that displayed event. Accordingly, events connected to triggers in the primary document may themselves have triggers that have event sequences connected to them in the same manner. For example, the media event shown in text event window 200 contains a trigger 215 consisting of the word "Taurus". Selecting trigger 215 initiates the event sequence connected to trigger 215 in the "connection map" in the computer's memory. The resulting events may each contain additional triggers and connected event sequences.

Filter buttons 145b to 145d are also displayed in FIGS. 1 and 2 for a "Context" filter, an "Interpret" filter, and a "Method" filter, respectively. Media events connected to triggers associated with the "Context" filter may, for example, provide information about the context of the trigger. Media events connected to triggers associated with the "Interpret" filter may, for example, provide information about various interpretations of the trigger. Media events connected to triggers associated with the "Method" filter may, for example, provide information about literary or poetic method represented by the trigger.

In other embodiments of the invention, additional or different filters may be used. Possible examples could include a filter that represents a person's thoughts or point of view about the work displayed. Thus, there could be a "Bob" filter created by a user named "Bob" that represents Bob's personal feelings about the triggers associated with the "Bob" filter. There could be a "Source" filter that may have triggers associated with it that are connected to event sequences providing information about the sources of the triggers or passages containing the triggers. There could be a "Humor" filter associated with triggers connected to media events containing humorous information about the triggers. There may even be a completely random filter associated with triggers connected to event sequences having absolutely no logical connection to the trigger.

A filter button may also have subcategories of filters associated with it. In this case, a menu of subfilters may be displayed when that filter button is activated.

In the embodiment shown in FIG. 1, the filter buttons 145a to 145e contain graphic display areas 148a to 148d, respectively. In this embodiment, when a filter button is selected, animation, consisting of a sequence of graphic frames, is displayed in that filter button's graphic display area for a short period of time (on the order of half a second) as the filter button is being highlighted. The graphic frames may each be separate images, or they may be a successive related moving framing sequence. This animation is produced by having bitmaps (or vector maps or other graphic display definitions), one for each frame, stored in memory. Each filter button has a list associated with it in the computer's memory that lists a sequence of frames. When the filter is selected, a loop is initiated that displays each frame in the sequence associated with the filter button one at a time. When the sequence is finished, the last frame in the sequence remains displayed and the filter button is highlighted.

The part of the present invention that allows a user to interactively create sequences of media events and connect them to triggers is referred to herein as the "media manager".

Referring again to FIG. 1, the media manager can be activated by using "mode" button 140c. In the embodiment of FIG. 1, mode button 140c features three vertical bars 160a, 160b and 160c and a label 160d. Clicking on bar 160a activates the "Explore" mode indicated by the word "Explore" on label 160d. In the "Explore" mode, a reader may read and explore the work (that is, activate filters, activate sequences connected to filters, and generally view all the features that an author has provided in the work). In Explore mode, however, no changes can be made to the work.

Clicking on bar 160b activates the "Analyze" mode indicated by the word "Analyze" on label 160d. In the "Analyze" mode, triggers and event sequences may be created, and existing triggers and event sequences may be edited. In a preferred embodiment of the invention, access to the "Analyze" mode may be limited to predetermined users through a password security system to prevent unauthorized users from changing the work. Such password systems are well known in the art.

Clicking on bar 160c may access a "Create" mode. In the embodiment of FIG. 1, clicking on bar 160c causes a word processor module to be displayed. The word processor module can be used to add text to and edit the displayed work, or to create a new document.

Double clicking on a trigger when in "Analyze" mode activates the media manager. The media manager can be used to compile a sequence of media events connected to a trigger associated with a filter. Prior to activating the media manager, therefore, the desired filter must first be activated, and then the trigger must be created.

To create a trigger after the desired filter has been activated and the Analyze mode has been entered, the document portion in which it is desired to create a trigger is selected for display, such as by scrolling to it, or by bringing it to the display using other alternative navigation approaches (such as those disclosed in U.S. patent application Ser. No. 08/422,088 entitled "Method and Apparatus for Display and Manipulation of Data", assigned to the assignee of the present invention and incorporated herein by reference). Once the desired text is displayed, a cursor is moved to one end of the character, word, or group of words that is intended to be the trigger. A mouse button is depressed, and held depressed while the cursor is dragged to the other end of the characters that are to make up the trigger. The mouse button is then released. The trigger may then be highlighted, for example by being surrounded with a rectangular border, to indicate that the trigger that has been created.

A trigger may be created within an existing trigger. Such a trigger may be highlighted in a different manner from the trigger within which it is located for example, by having a darker shading or deeper color) for identification.

The method described above to select the characters making up the trigger being created is the method used in the embodiment of the invention shown in FIG. 1. In other embodiments, other means to select the required text may be used, as is known by those skilled in the art.

After the trigger has been created, the media manager may be activated. In one embodiment of the invention, the media manager may be activated by double-clicking on the trigger after it has been created while the "Analyze" tool has been activated.

The media manager also allows an existing event sequence connected to an existing trigger to be edited. In this application of the media manager, a trigger need not be newly created. Instead, the media manager is activated and the trigger is selected by clicking on the desired trigger while the "Analyze" tool is active. For creating events that are not connected to a trigger, the media manager may also be activated by double-clicking on bar 160b.

Figure 3:
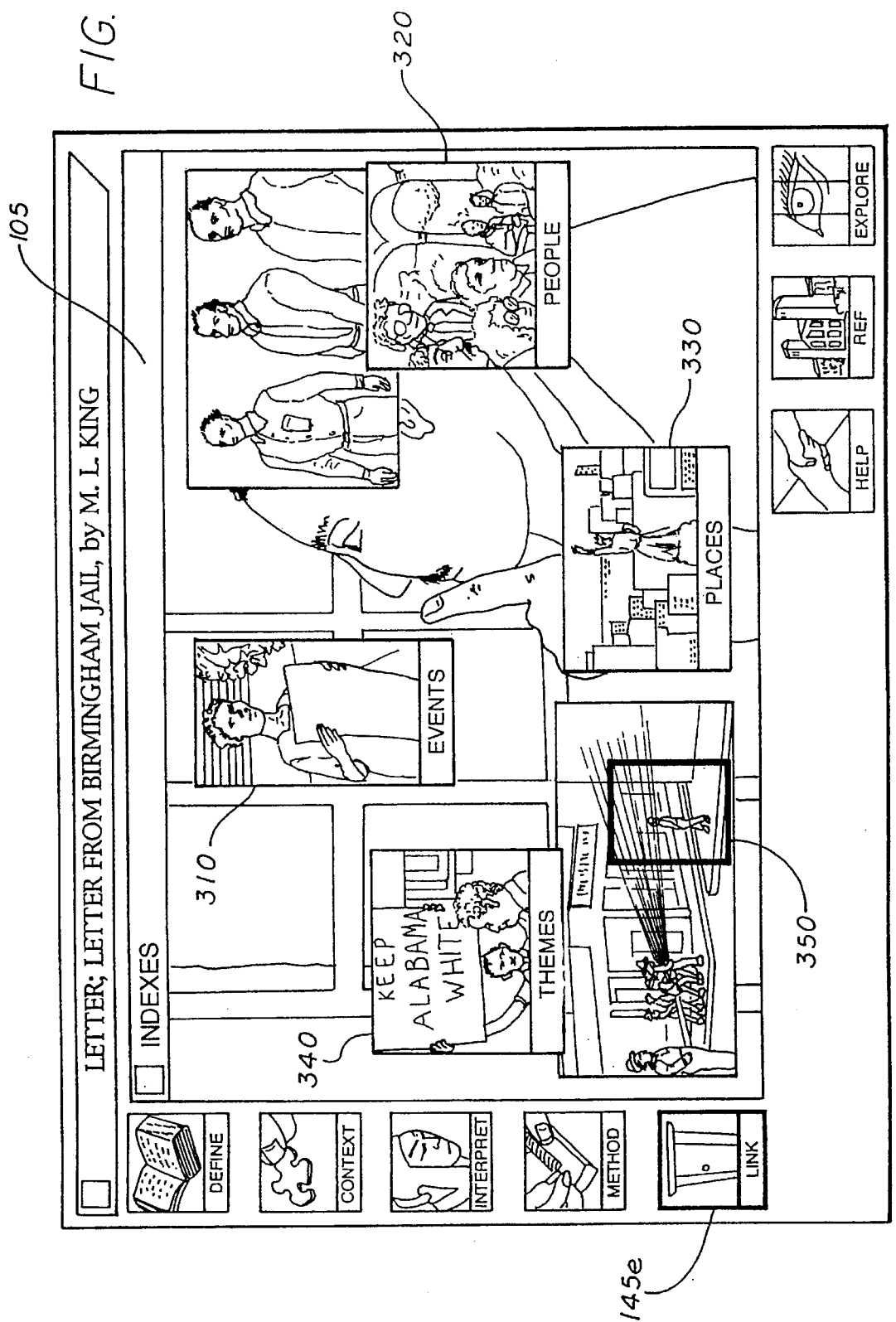
FIG. 3 illustrates a third main display screen of an embodiment of the present invention.

A similar method may be used to select a trigger and activate the media manager for a graphical event, instead of a text event, that may be displayed in main display window 105. FIG. 3 shows a screen for an embodiment of the invention for which a graphical event is displayed in main display window 105. "Link" filter 145e is activated, and triggers 310, 320, 330 and 340 are highlighted in main display window 105. Since the event displayed in main display window 105 is a graphical event, the triggers are graphical segments (in the embodiment shown in FIG. 3, rectangular segments), that are highlighted by displaying a border around the segment and displaying a label for the trigger within the borders.

An existing trigger in a graphical event is selected in the same manner as described above used to select a trigger for a text event.

A new trigger is created in a manner that: is also similar to the manner in which a new trigger is created for a text event. In the embodiment shown in FIG. 3, the cursor is placed at one corner of a rectangular segment of the graphical event displayed in main display window 105. A mouse button is pressed, and held pressed as the cursor moves the opposite corner to the rectangular segment being selected. As the cursor moves, a rectangular box indicates the outline of the area that is being selected. When the desired area is enclosed by the box, the mouse button is released, and a border 350 appears around the selected area, as shown in FIG. 3.

In one embodiment of the invention, after the desired graphical segment has been selected, a dialog box appears in which a label and an associated icon or image for the newly created trigger may be entered. The media manager may again be activated by double-clicking on the desired trigger while the "Analyze" tool is active.

Figure 4:
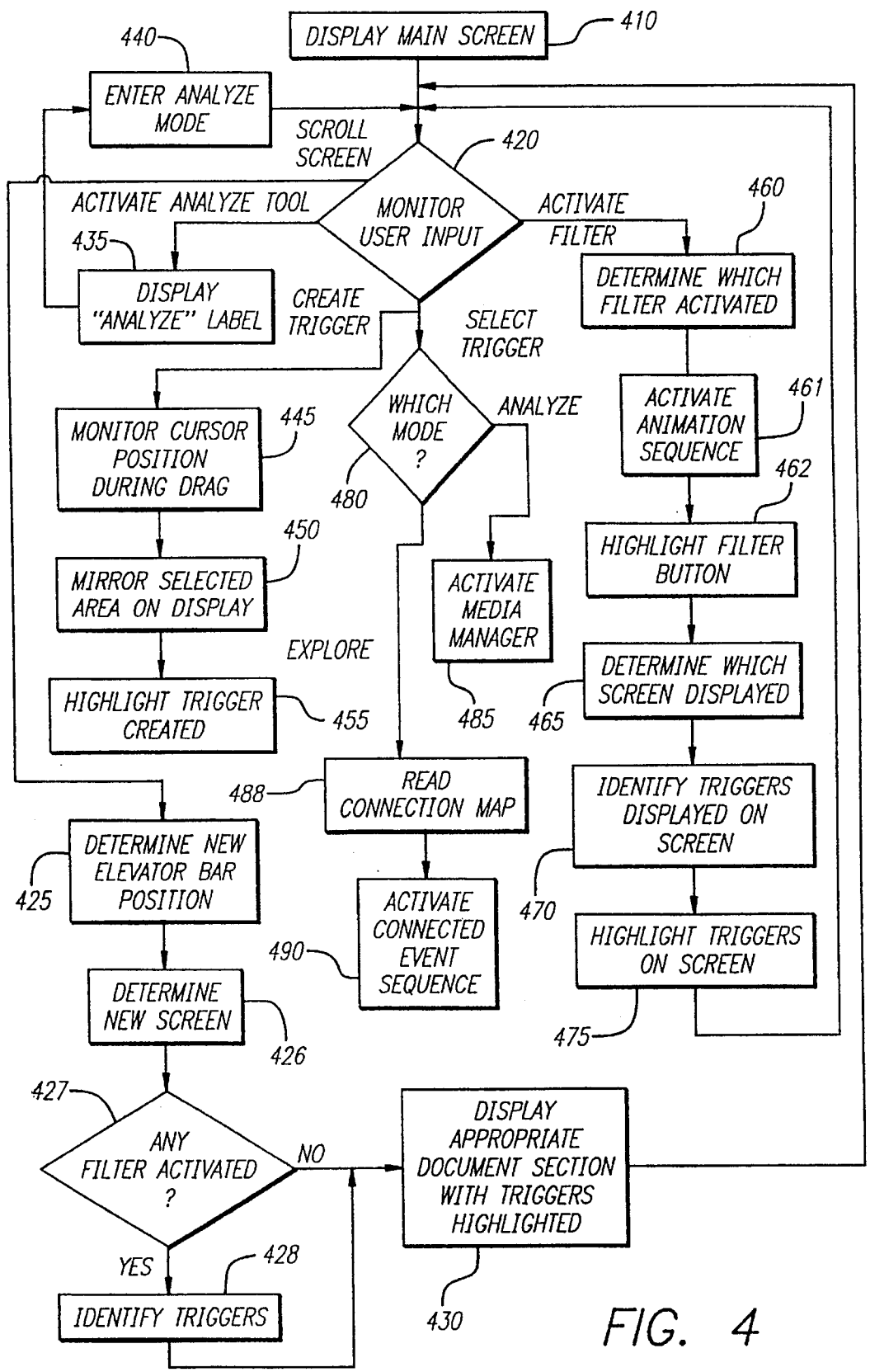
FIG. 4 is a block diagram illustrating an embodiment of the annotation method of the present invention.

The steps followed for activating filters, displaying existing triggers, creating new triggers and calling up the media manager for one embodiment of the present invention is summarized by the computer process shown in FIG. 4. The method of the present invention illustrated in FIG. 4 first displays the main display screen, which may be the display screen 100 shown in FIG. 1, on a display monitor at block 410. Thereafter, user input is monitored at decision block 420. The block diagram of FIG. 4 shows the steps followed by the present invention in response to five alternative user actions. Additional user actions may be allowed, however they have been omitted from the embodiment shown in FIG. 4 so as not to obscure that embodiment.

The five user actions that are monitored by decision block 420 in FIG. 4 are (in counterclockwise order from the top of decision block 420) "Scroll Screen", "Activate Analyze Tool", "Create Trigger", "Select Trigger", and "Activate Filter". It should be understood, however, that alternative or additional user actions may be allowed.

If a "Scroll Screen" action is initiated, (for example by "dragging and dropping" an elevator button, as described above), a new elevator bar position is determined at block 425. The corresponding screen to be displayed is determined at block 426. At derision block 427 it is determined if any filters have been activated. If a filter has been activated, any associated triggers found in the screen are identified at block 428. The corresponding document screen, with such triggers highlighted, is displayed in the main display window at block 430. The process then returns to decision block 420 to monitor subsequent user input.

If an "Activate Analyze Tool" action is initiated (for example by clicking on an appropriate button, as described above), an "Analyze" label is displayed on the screen to indicate that the analyze mode has been entered at block 435. The analyze mode is entered at block ,140, and the process is returned to the "Monitor User Input" state at decision block 420.

If a "Create Trigger" action is initiated (for example by moving a cursor onto the display screen and pressing and holding a mouse button, as described above), the cursor movement as the trigger is selected is recorded at block 445, and the area that is selected as the cursor moves is mirrored on the display screen at block 450. After the area for the trigger has been selected, the area making up the trigger is highlighted at block 455. The trigger may consist of a segment of a graphical event, test from a text event, or portions of other events, as appropriate.

If an "Activate Filter" action is initiated (for example by clicking on a filter button as described above), the invention determines which filter has been activated at block 460. The animation sequence for that filter button is displayed in the graphical display area of the filter button at block 461, and the filter button is highlighted at block 461. The portion of the event currently displayed in the main display window is determined at block 465, and the triggers associated with the filter that has been activated that are found on the currently displayed portion of the event are identified by reading a connection map at block 470. These triggers are highlighted by refreshing the display screen at block 475.

If a "Select Trigger" action is initiated (for example by double-clicking on a trigger as described above), a determination is made as to whether either of the modes "Analyze" or "Explore" are currently active at decision block 480. If the "Explore" mode is active, the event sequence connected to the trigger for the currently active filter is read from a "connection map" at block 488 and that sequence is initiated at block 490. If the "Analyze" mode is active, the media manager is activated at block 485.

Figure 5:
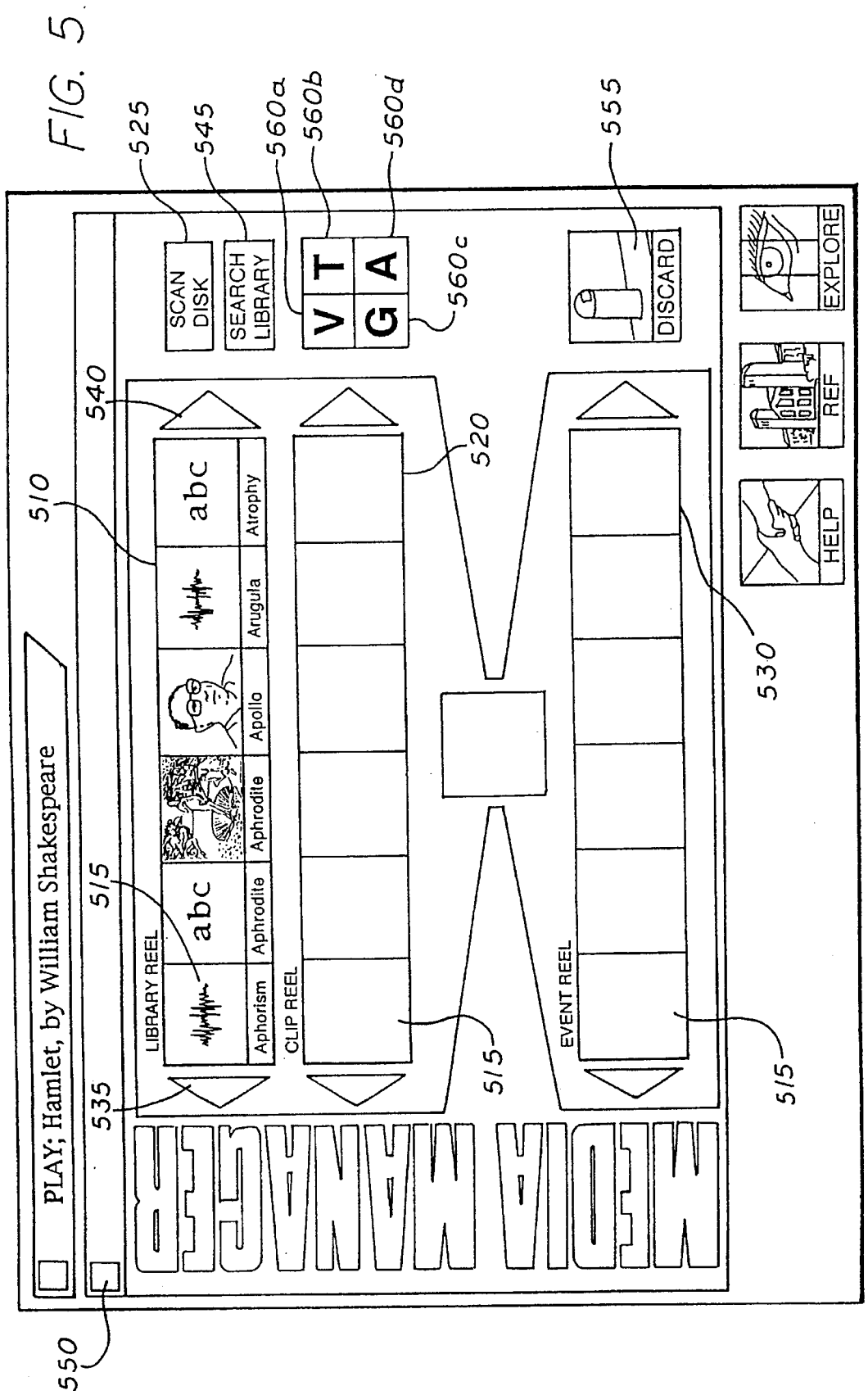
FIG. 5 illustrates one display screen of an embodiment of the media manager of the present invention.

A display screen that may be displayed in one embodiment of the invention when the media manager is activated is shown in FIG. 5. A feature of the display screen shown in FIG. 5 are three horizontal rectangular windows 510, 520, and 530. These windows are referred to herein as "reels". In the embodiment of the invention shown in FIG. 5, reel 510 is called a "Library Reel", reel 520 is called a "Clip Reel", and reel 530 is called an "Event Reel". These reels may represent storage areas in the computer's memory.

Each reel is divided into a number of different partitions, called "frames". In the embodiment shown in FIG. 5, each of the Library Reel, Clip Reel, and Event Reel are divided into six frames 515. The three reels 510, 520 and 530 provide for the selection and compilation of a sequence of events that will be connected to the trigger that was clicked on when the media manager was activate& Each of the individual frames 515 may be used to display icons representing events.

In the embodiment of the invention shown in FIG. 5, individual events are stored as "objects" in the computer's memory, which may include a hard disk. The term "object" as used here means that the event is stored in the computer's memory as a cohesive set of attributes. These attributes may include a regular name for the event, a computer file name for the event, an identifier identifying the type of media of the event, and a description of the content of the event. The content of the event may be described in different ways for different types of media. If the event is a text event, the text itself may be stored as an attribute of the object for the event. If the event is a graphic event, the bitmap, vector map, or other description of the event may be stored as an attribute of the object for the event. If the event is an audio or a video event, the audio or video data for the event may be stored in digital form on a CD-ROM disk or a video laserdisk, respectively. Because the data representing an audio or video event may require several megabytes of memory, this data is preferably not stored as an attribute of the object for the event. Instead, information about the location at which the audio or video event is stored is made an attribute of the object for the event. For example, such an attribute for a video event may specify that the video event encompasses frames 125 to 350 on Laserdisk "A". Similarly, an attribute for an audio event may specify that the audio event encompasses track 13 on CD-ROM "B".

The attributes of an object for an event may also include a "criteria field" in which key words about the event may be stored to facilitate identification and selection of an event, and an icon that may be used to represent the event on the display screen.

A multimedia work with which the present invention may be used may include thousands of events associated with it. The Library, Clip and Event Reels 510, 520 and 530, respectively, provide a means for identifying and selecting individual or groups of events from among the thousands that may be available, for inspecting them, modifying them or creating new events, and for assembling a sequence of events that may be connected to a trigger.

Library Reel 510 represents a source from which events may be selected for assembling into a sequence. Clip Reel 520 represents a storage area in which events selected from Library Reel 510 may be stored. Event Reel 520 is where the sequence of events being connected to the trigger are compiled.

To begin the process of creating a sequence of events by means of the Event Reel, events must first be loaded onto the Library Reel. Events may be loaded onto the Library Reel either by using a "Scan Disk" operation or by creating a new event using the invention's event editors.

In the embodiment shown in FIG. 5, the "Scan Disk" operation may be initiated by activating "Scan Disk" button 525. "Scan Disk" button 525 may be activated by clicking on it. The "Scan Disk" operation scans the computer's memory to locate all event objects that are available. These objects are then placed in a memory location that represents the content of Library Reel 510. Since the computer's storage media may contain several thousand objects for events, the "Scan Disk" operation may take several minutes. Since the "Scan Disk" operation would typically only need to be performed once during a media manager session, and because of the time it takes to perform the operation, a dialog box appears in one embodiment of the invention when the "Scan Disk" button is activated asking the user to confirm that the "Scan Disk" operation is indeed to be performed. A second dialog box may ask the user for a second confirmation.

After the "Scan Disk" operation is completed, all available events will have been loaded onto Library Reel 510. The events are represented by icons and associated event names that are displayed in frames 515 of Library Reel 510. In the embodiment shown in FIG. 5, six frames 515 are displayed for Library Reel 510. If Library Reel 510 contains more than six events, only six events at a time may be displayed. To display the other events, scroll arrows 535 or 540 may be clicked on to scroll frames 515 in one or the other direction, respectively. As shown in FIG. 5, the events may be displayed in alphabetical order of event names. Other orders may also be used.

If the Library Reel 510 contains a large number of events, it may be difficult to find particular events that may be desired for the event sequence being constructed. The "Search Library" operation provided by the embodiment shown in FIG. 5 may be used to reduce the number of events contained on Library Reel 510.

In the embodiment shown in FIG. 5, the "Search Library" operation may be initiated by clicking on "Search Library" button 545. When "Search Library" button 545 is activated, a dialog box appears in which search criteria for selection of events from Library Reel 510 may be specified. Search criteria that may be specified include the type of media (for example text, video, graphics, audio), the name of an event (if it is known to the user), and a list of key words that may help identify the content of the event.

After search criteria has been specified, the "Search Library" operation is executed. Those events that were contained on Library Reel 510 prior to begin of the "Search Library" operation that meet the criteria specified in the "Search Library" dialog box are identified, and only these selected events are displayed on Library Reel 510. The original content of Library Reel 510, though not displayed, is retained in the computer's memory. If the search criteria is changed in a subsequent "Search Library" operation, the full initial content of the original Library Reel 510 will be searched. If any event displayed on Library Reel 510 is considered by the user for potential use in the event sequence being assembled, it may be moved from the Library Reel 510 to Clip Reel 520.

An event may be moved from one reel to another by the "drag and drop" method, which is well known in the art. "Drag and drop" is a term used to describe the process of moving a cursor, usually with a mouse, over a displayed item. A mouse button is clicked, and while the mouse button is held down (thereby "grabbing" the underlying item), the cursor is moved to the target location (thereby "dragging" the item). When the target location for the item is reached, the mouse button may be released, and the item is redisplayed at the location where the mouse button is released (constituting the "drop" of the item).

Figure 6:
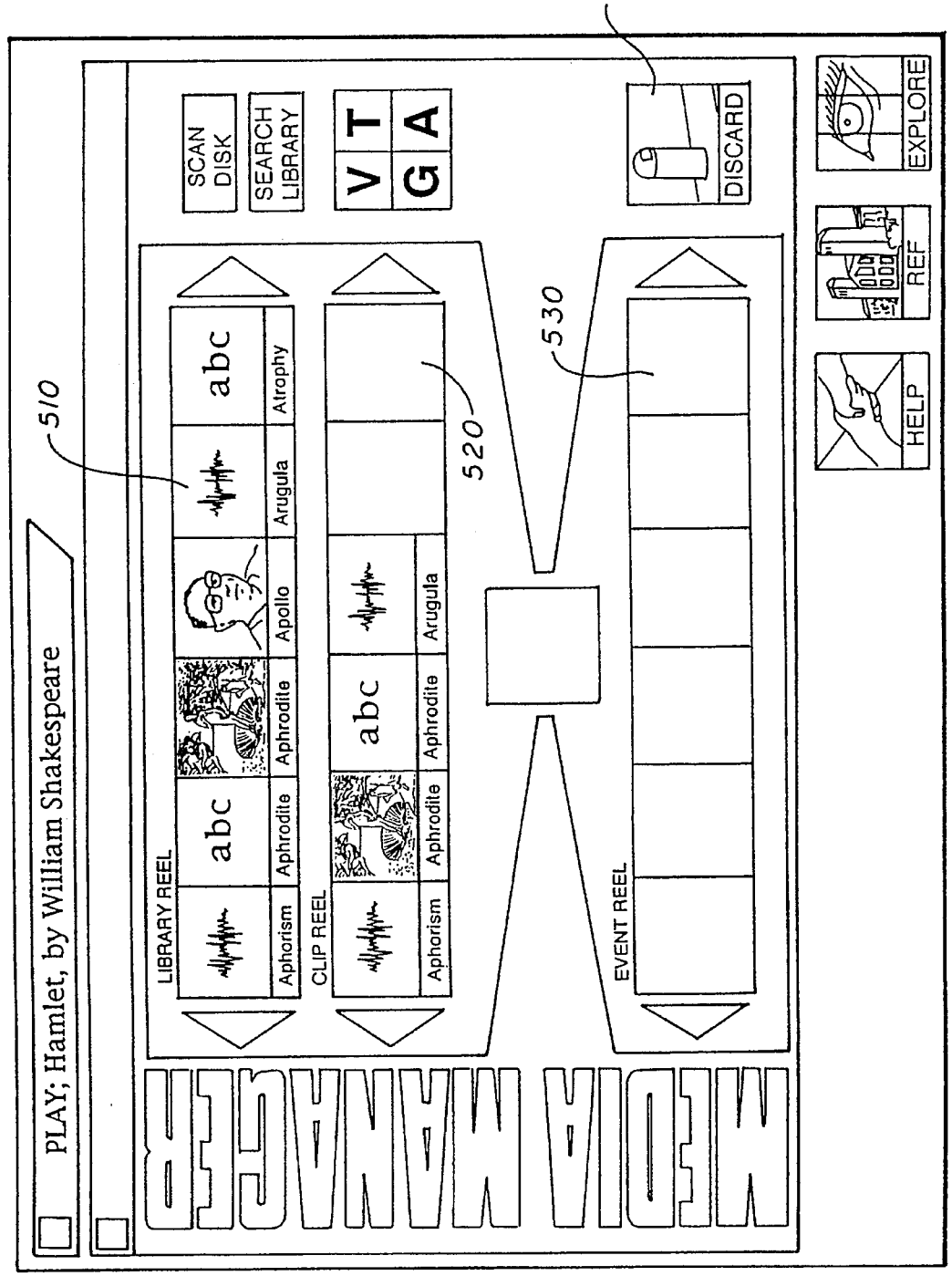
FIG. 6 illustrates a second display screen of an embodiment of the media manager of the present invention.

FIG. 6 shows the display screen of FIG. 5 after four events, entitled "Aphorism", "Aphrodite", "Aphrodite" and "Arugula", respectively have been moved from Library Reel 510 to Clip Reel 520. In the embodiment shown in FIG. 6, when an event is moved from Library Reel 510 to Clip Reel 520, a copy of the moved event remains on Library Reel 510.

If a new "Search Library" operation is initiated, the events on Library Reel 510 may change. Events that have been moved to Clip Reel 520 will however remain on Clip Reel 520 even if they are no longer displayed on Library Reel 510. Different search criteria may be used with the "Search Library" operation, and any potentially usable events from any search may be moved to Clip Reel 520 for potential inclusion in Event Reel 530. Events may also be moved directly from Library Reel 510 to Event Reel 530 and from Event Reel 530 to Clip Reel 520.

Figure 7:
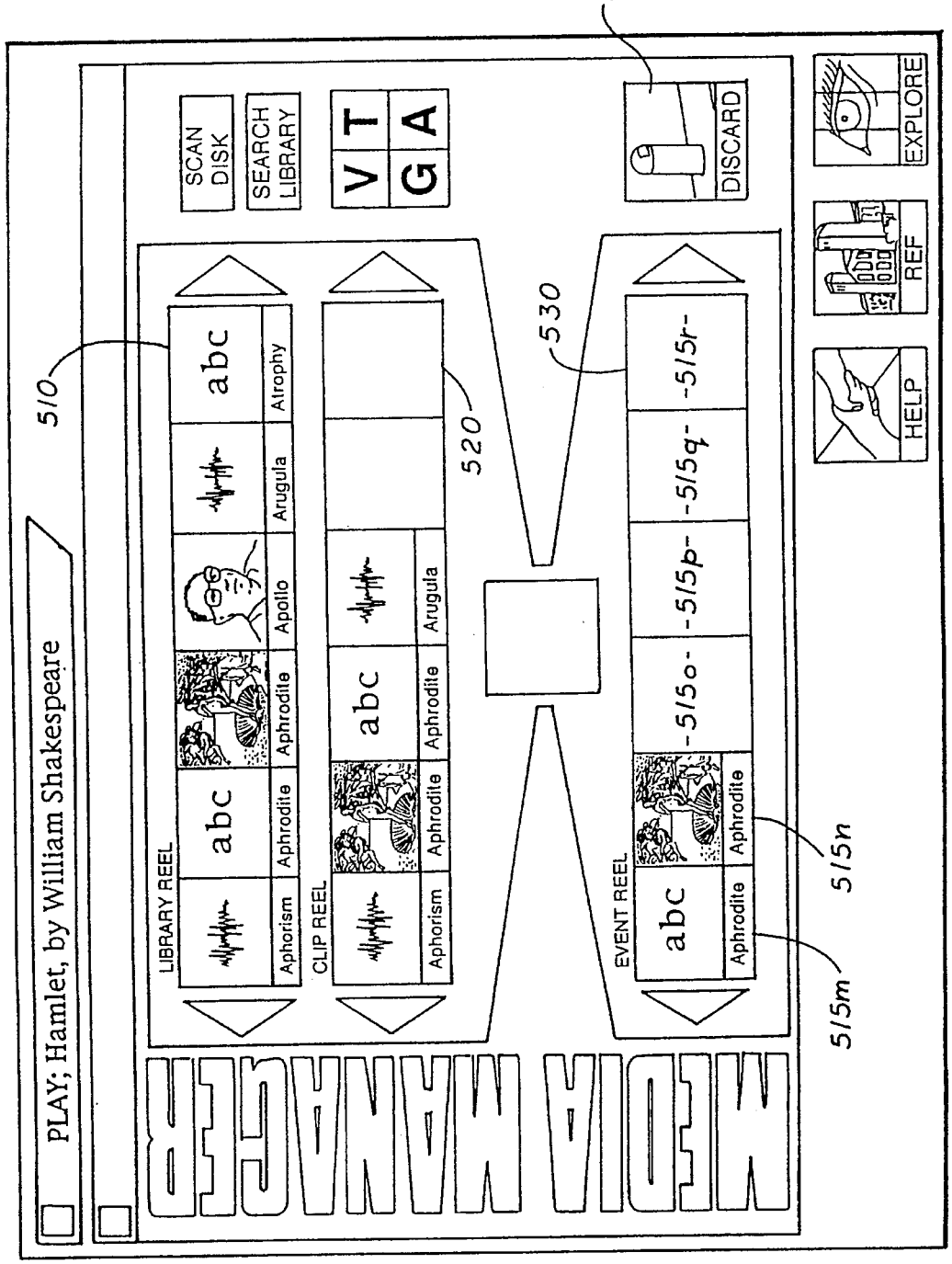
FIG. 7 illustrates a third display screen of an embodiment of the media manager of the present invention.

FIG. 7 shows the display screen of FIG. 6 after two events, both entitled "Aphrodite," respectively, have been moved from Clip Reel 520 to Event Reel 530. The events on Event Reel 530 constitute the events that will be activated, in the sequence in which they are displayed on Event Reel 530, when the trigger to which they are connected is activated in the "Explore" mode from the main screen shown in FIG. 1.

In the embodiment of the invention shown in FIG. 7, the events contained on any of the reels 510, 520 or 530 are left-justified, and there may be no blank frames to the left of any frame containing an event. If the "Arugula" event on Clip Reel 520 were to be dragged and dropped on either of frames 515p to 515r, it would automatically jump to frame 515o, the left-most empty frame, when the mouse button is released. If the event Arugula were to be dragged and dropped on a frame such as frame 515n that already contains an event, the event Arugula would replace the existing event in frame 515n. The event that previously occupied frame 515n would automatically move one frame to the right, to frame 515o. If frame 515o contained an event, that event would move one frame to the right, and so on for as many non-empty frames as exist.

An event may be removed from a reel by dragging and dropping the event on "Discard" button 555. If an event is dragged and dropped onto the discard button 555 from the Event Reel or the Clip Reel, it simply disappears from that reel. If an event is dragged and dropped onto discard button 555 from the Library Reel 510, however, the system interprets the user's action to mean that the object representing the event is to be deleted from the computer's hard disk or other storage media. When such action is taken, a dialog box appears, after the event has been dragged and dropped, prompting the user to confirm that the event is to be deleted from the disk. If the user confirms this choice of operation, the object representing the event is deleted from the computer's storage media.

The media manager also provides for the user creation of new events or editing of existing events. To create a new event, one of the editor buttons 560a to 560d shown in FIG. 5 must be activated, preferably by clicking on the appropriate button. In one embodiment, new events are automatically added to the Library Reel after they have been created, from where they can be moved to the Clip and the Event Reel. In other embodiments, the newly created event may be automatically added to other reels in addition to or instead of the Library Reel.

Figure 8:
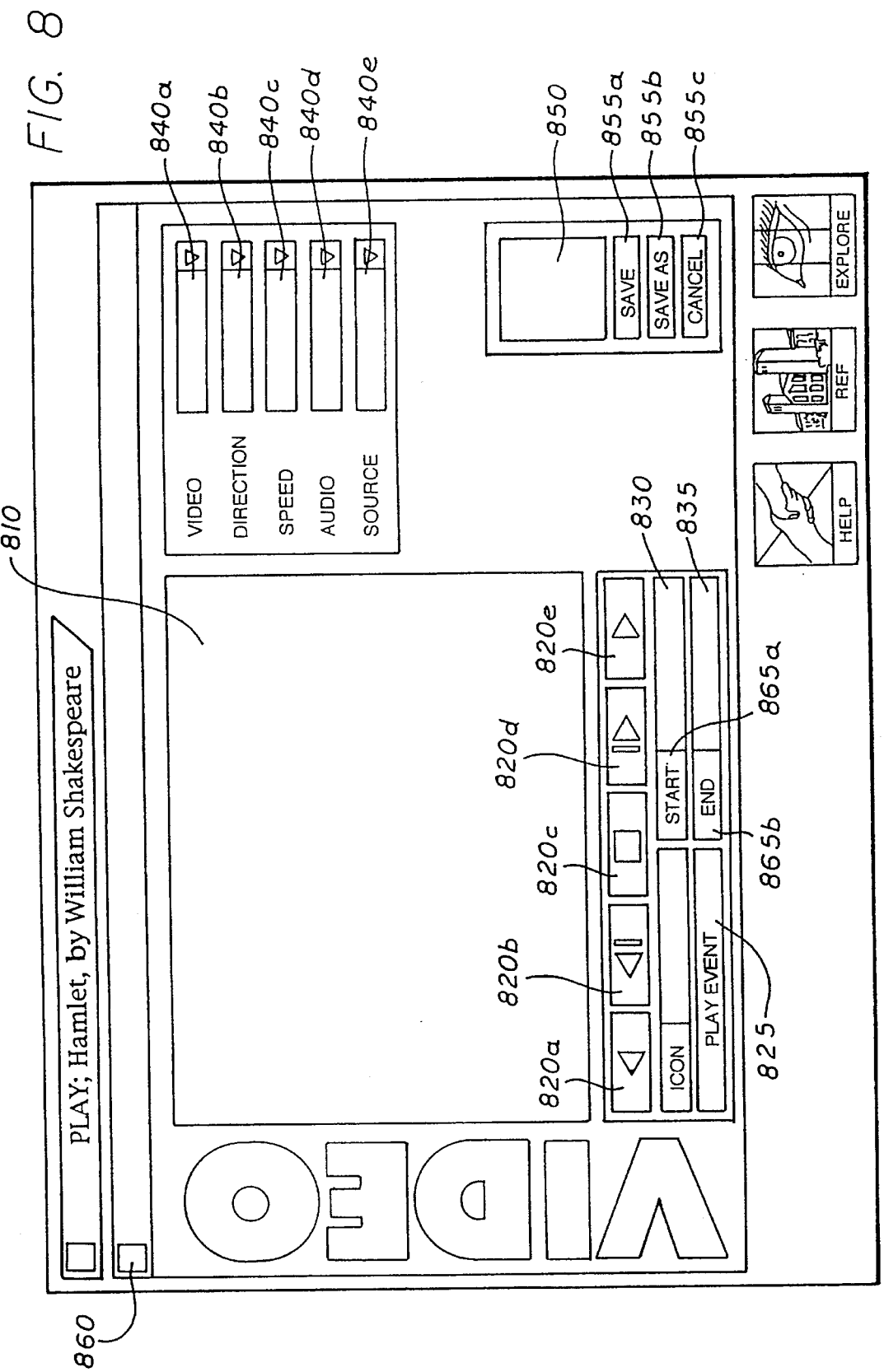
FIG. 8 illustrates a display screen of a video editor used with an embodiment of the present invention.

Clicking on editor button 560a activates the video editor and causes the video editor screen to be displayed. One embodiment of the video editor is shown in FIG. 8. The display screen for the video editor shown in FIG. 8 includes a video display area 810, configuration buttons 840a to 840e, play buttons 820a to 820e, start address display 830, end address display 835, play event button 825, icon button 850, and file buttons 855a to 855c.

The video editor may also be activated by double-clicking on any video event on any of the reels 510, 520 or 530. The event clicked on will be displayed on the video editor screen when the video editor is activated.

The video editor allows the user to create a video event by selecting a segment of video contained on the computer system's video storage media, which may be a video Laserdisk. The video editor allows the user to select a video segment, determine its playback configuration, and assign it a name, an icon, and key word search criteria.

Play buttons 820a to 820e allow the user to scan the video contained on the computer's video storage media and to select a segment as an event. Video is typically stored in a sequential fashion as a sequential series of frames. Play button 820e provides for normal and fast forward scanning of the video on the storage media. Clicking on play button 820e plays video at normal speed. Clicking on play button 820 and holding the button depressed plays video at a fast speed.

Play button 820a provides for the same operations as play button 820e, except that playback is in reverse. Play button 820c stops the playback. The frame that was being displayed in display area 810 when play button 820c is clicked on remains displayed. Clicking on play button 820d causes the video frame displayed in display area 810 to be advanced one frame at a time in the forward direction. Clicking on play button 820b causes the video frame displayed in display area 810 to be advanced one frame at a time in the reverse direction.

To select a video segment for the video event being created, the beginning and ending addresses for the segment must be specified in start and end address display areas 830 and 835, respectively. These start and end addresses may be typed in with a keyboard if they are known to the user, or they may be automatically be identified by the video editor by activating start and end mark buttons 865a and 865b, respectively, as the desired segment is being displayed in display area 810. Activating start mark button 865a by clicking on it when the beginning of the desired segment is displayed in display window 810 causes the address of the frame displayed when the button is clicked to be read and entered in start address display area 830. Activating end mark button 865b by clicking on it when the end of the desired segment is displayed in display window 810 causes the address of the frame displayed when the button is clicked to be read and entered in end address display area 835. The start and end addresses may at any time be changed by clicking on either of start and end mark buttons 830 and 835, respectively while other frames are being displayed.

Once a segment has been selected, clicking on play event button 825 plays back the selected segment.

Configuration buttons 840a to 840e allow the user to customize the playback of the video event being created. In the embodiment shown in FIG. 8, clicking on the arrow displayed at the right side of any of configuration buttons 840a to 840b causes a pulldown menu to be displayed listing the selections that are available for that particular configuration button.

The options available for "Video" configuration button 840a in the embodiment shown in FIG. 8 include "On" and "Off". Video tracks may consist of separate audio and video tracks. This configuration button allows the video track to be turned "On" or "Off".

The options available for "Direction" configuration button 840b in the embodiment shown in FIG. 8 include "Forward" and "Reverse". This configuration button allows the user to specify in which direction the video segment for the event will be played.

The options available for "Speed" configuration button 840c in the embodiment shown in FIG. 8 include "Normal", "Fast", "Faster", "Fastest", "Slow", "Slower", and "Slowest". This configuration button allows the user to specify the speed at which the video segment will be played back when the video event is activated.

The options available for the "Audio" configuration button 840d in the embodiment shown in FIG. 8 include "Stereo", "Mono", "Only Left", "Both Left", "Only Right", "Both Right", and "None". The audio track of a video segment may have left and right channels. The options listed above allow the user to play back audio in mono or stereo, to play back only the left or the right channels, to play both channels on the right channel or both on the right, or to turn off the audio track completely.

The options available for the "Source" configuration button 840e in the embodiment shown in FIG. 8 include "Full Screen", "Upper Left", "Upper Right", "Lower Right" and "Lower Left". These options allow the user to select whether all or only a portion, namely the indicated quadrant, of the video segment is to be displayed in the video event being created.

File buttons 855a to 855c allow the video event to be stored as an object in the non-volatile memory of the computer at any time during the creation process. The "Save" button 855a provides for saving the configuration of the event at the time the "Save" button 855a is clicked on under the file name currently specified for the event. If no file name has been specified, a dialog box appears prompting the user to enter a file name so the object for the event can be saved.

"Save As" button 855b allows the object for the event to be stored under a different filename than the current specified filename, if any, or under a new filename in none has yet been specified. After "Save As" button 855b has been activated by clicking on, a dialog box is provided prompting the user to specify the new filename under which the object for the event is to be stored.

Figure 9:
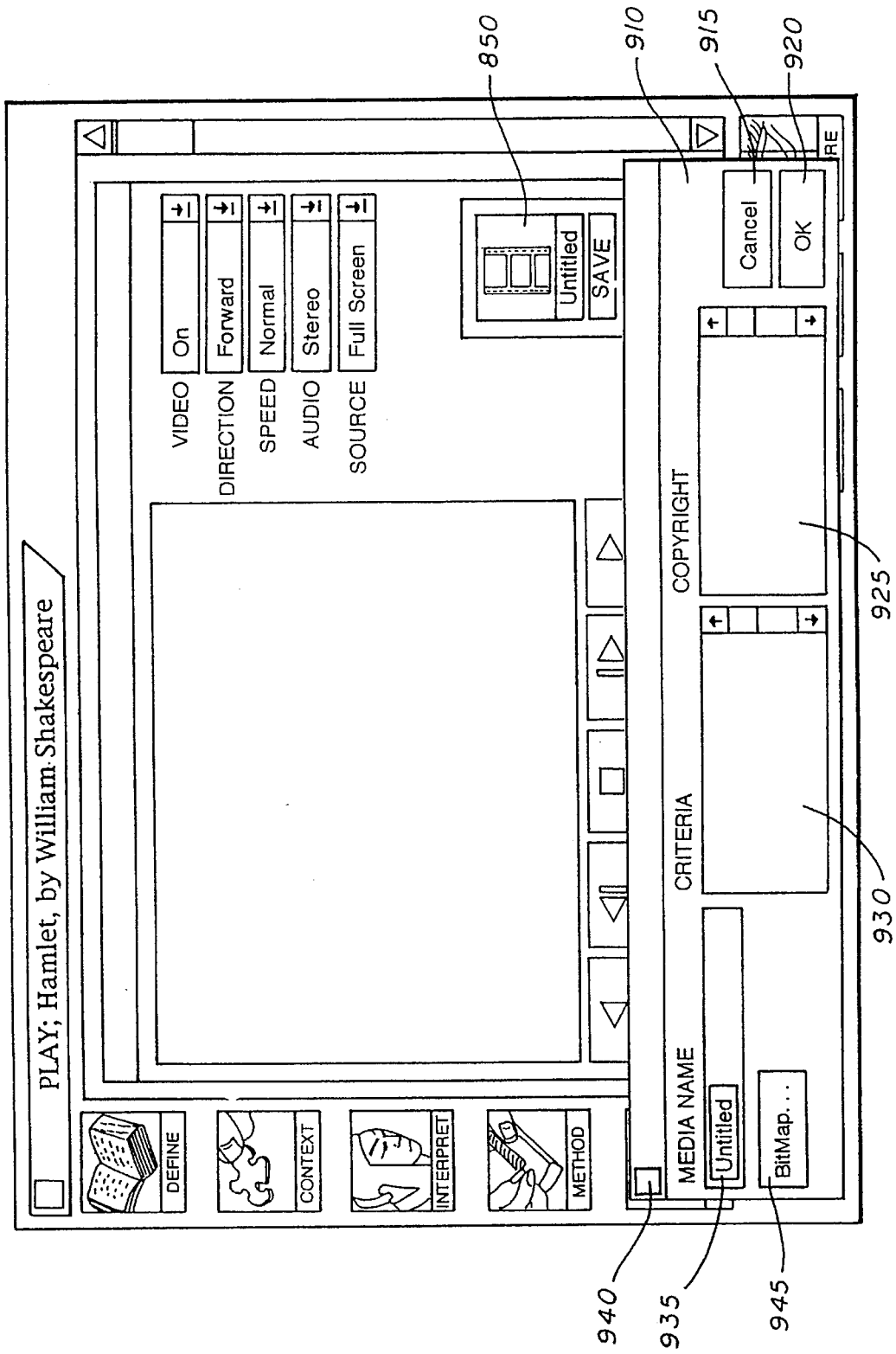
FIG. 9 illustrates a second display window of a video editor used with an embodiment of the present invention.

Icon button 850 provides for specifying of additional attributes of the object for the event when it is saved. Activating icon button 850 by double-clicking on it causes an object attribute dialog box 910 to be displayed, as shown in FIG. 9. If an existing event is being edited rather than a new event being created, the icon of the event will already have been displayed on icon button 850 when the editor is opened, and existing attributes will be displayed in object attribute dialog box 910 when it is displayed.

In the embodiment shown in FIG. 9, object attribute dialog box 910 includes a copyright information area 925, a key word criteria area 930, a title bar 935, a "Bitmap" button 945, a close button 940, a cancel button 915, and an accept button 920.

Copyright information area 925 and key word criteria area 930 are text entry areas that allow text to be entered when clicked on. In the embodiment shown in FIG. 9, each can hold approximately 32,000 characters. Text entered in copyright information area may consist of copyright notices for the video used in the event and for the event being created. This copyright information may be displayed whenever the event is edited.

Text entered in key word criteria area is data that is searched when a "search library" operation is performed from the main media editor screen.

Title bar 935 allows the user to enter a name for the event, which may be different from the filename under which the object for the event is filed when either of file buttons 855a or 855b are activated. If no name has yet been specified, the default name "Untitled" appears, as shown in FIG. 9.

Bitmap button 945 allows a bitmap to be selected to make up the icon for the event. Clicking on bitmap button 945 causes a dialog box to be displayed that allows the user to select a bitmap for the icon from bitmaps that are available on the computer's memory media.

Clicking on cancel button 915 or close button 940 closes object attribute window to be closed and any changes that were made to be abandoned. Clicking on accept button 920 closes object attribute window and causes changes that were made to be stored as attributes of the object for the event being created.

Activating "Cancel" file button 855c in FIG. 8 cancels any changes made since the last "save" operation was performed and closes the video editor. Activating close button 860 also closes the video editor, but first checks to see whether the final configuration of the video event being edited has been saved. If it has not, a dialog box appears providing the user the option to perform a save operation before the video editor is closed.

The display screens for the editors other than the video editor described above may also include an icon button 850, file buttons 855a to 855c, and close box 860. The operations of these will be generally the same as their operation described above.

The audio editor may be activated by clicking on editor button 560d shown in FIG. 5. The display screen for one embodiment of the audio editor is shown in FIG. 10.

Figure 10:
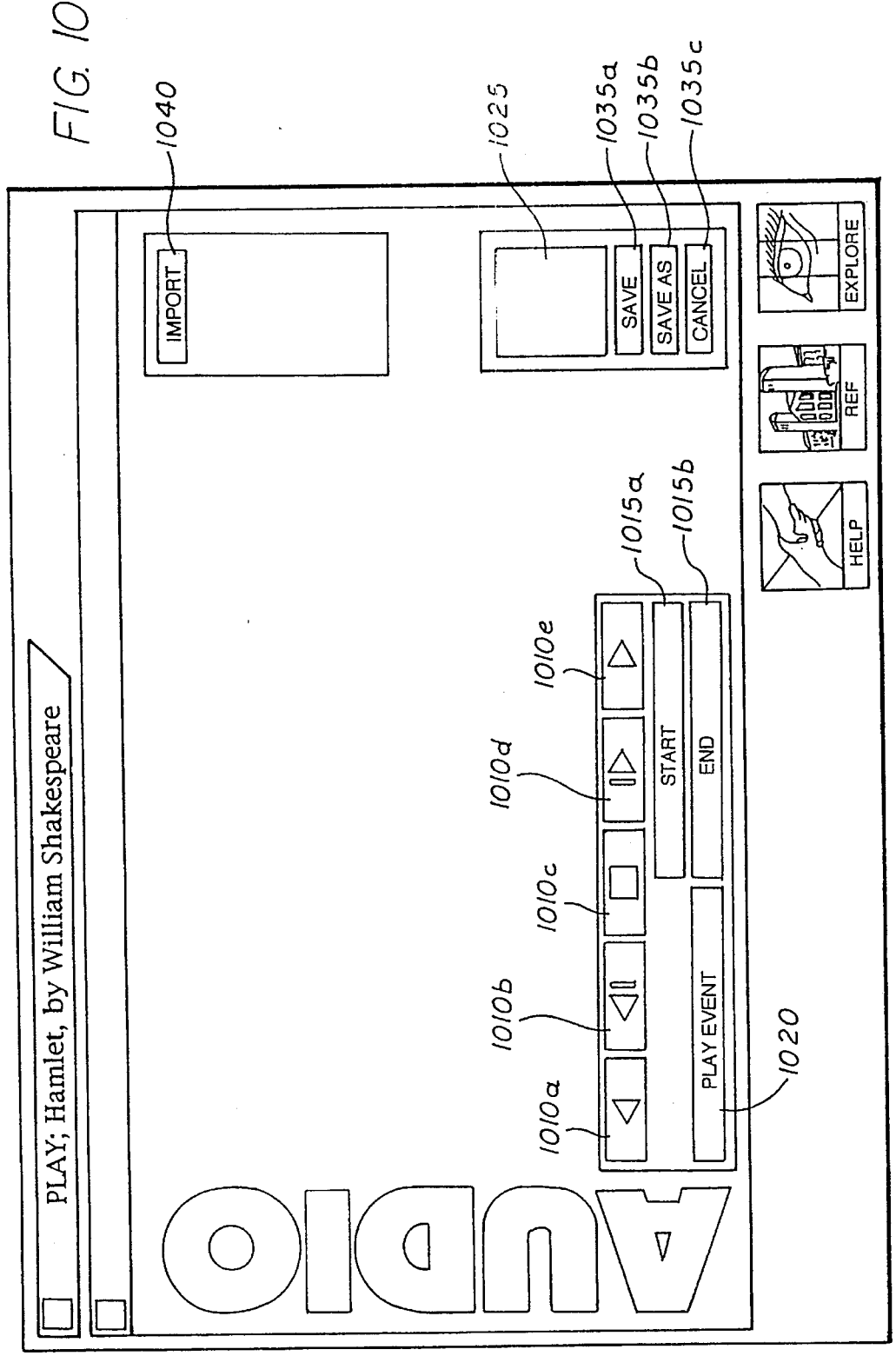
FIG. 10 illustrates a display screen of an audio editor used with an embodiment of the present invention.

The embodiment shown in FIG. 10 includes play buttons 1010a to 1010e (which correspond to and function like play buttons 820a to 820e of the video editor shown in FIG. 8), start mark and end mark buttons 1015a and 1015b, respectively (which correspond to and function like start mark and end mark buttons 865a and 865b, respectively, shown in FIG. 8), play event button 1020 (which corresponds to and functions like play event button 825 in FIG. 8), file buttons 1035a to 1035c (which correspond to and function like file buttons 855a to 855c shown in FIG. 8), icon button 1025 (which corresponds to and functions like icon button 850 in FIG. 8), and import button 1040.

The audio editor shown in FIG. 10 allows a new audio event to be created by selecting a segment from an already existing audio event. The existing event may be selected by clicking on import button 1040, which calls up a menu from which existing audio events may be selected. This audio event may be played by use of play buttons 1010a to 1010e, and an audio segment for the audio event being created may be selected as described above for selection of a video event with the video editor. The attributes of the object for the audio event being created may also be specified, the object saved, and the editor exited, all as described above for the video editor.

Figure 11:
FIG. 11 illustrates a display screen of a graphics editor used with an embodiment of the present invention.

The graphics editor may be activated by clicking on editor button 560c in FIG. 5. The display screen for the one embodiment of the graphics editor used with the present invention is shown in FIG. 11. The embodiment of the graphics editor shown in FIG. 11 includes an icon button 1135 and file buttons 1140a to 1140c that function like those of the video and audio editors described above. The graphics editor also includes a display area 1110 for displaying the bitmap to be used for the graphic event being created, elevator bars 1115 and 1120 that allow the display area to be scrolled to show other parts of the graphic being displayed, if it is larger than the display area, an import button 1125, and a paint program activation button 1130.

Clicking on paint program activation button 1130 activates a painting program that may be used to create a graphic bitmap that can then be imported into the graphics editor for incorporation into the graphic event being created. In the embodiment shown in FIG. 11, this painting program is the Microsoft Paintbrush program that is furnished as an accessory with Microsoft Windows.

A bitmap that has been created with the paint program described above or that already exists may be imported into the graphics editor by clicking on import button 1125 in FIG. 11. A menu is displayed showing the names of bitmaps that exist in the computer's memory media, an a desired bitmap may be selected. The graphic representing the bitmap may be displayed in display area 1110.

The embodiment of the graphics editor shown in FIG. 11 does not provide for changing the graphic bitmap shown in display area 1110. It only allows the bitmap to be incorporated in the graphic event being created as a whole.

After a desired graphic is displayed, criteria for the object for the graphic event being created may be specified, the object may be saved, and the editor exited, all as described with respect to the video editor above.

Graphic events may also be represented by vector maps or other graphic descriptions instead of or in addition to bitmaps.

Figure 12:
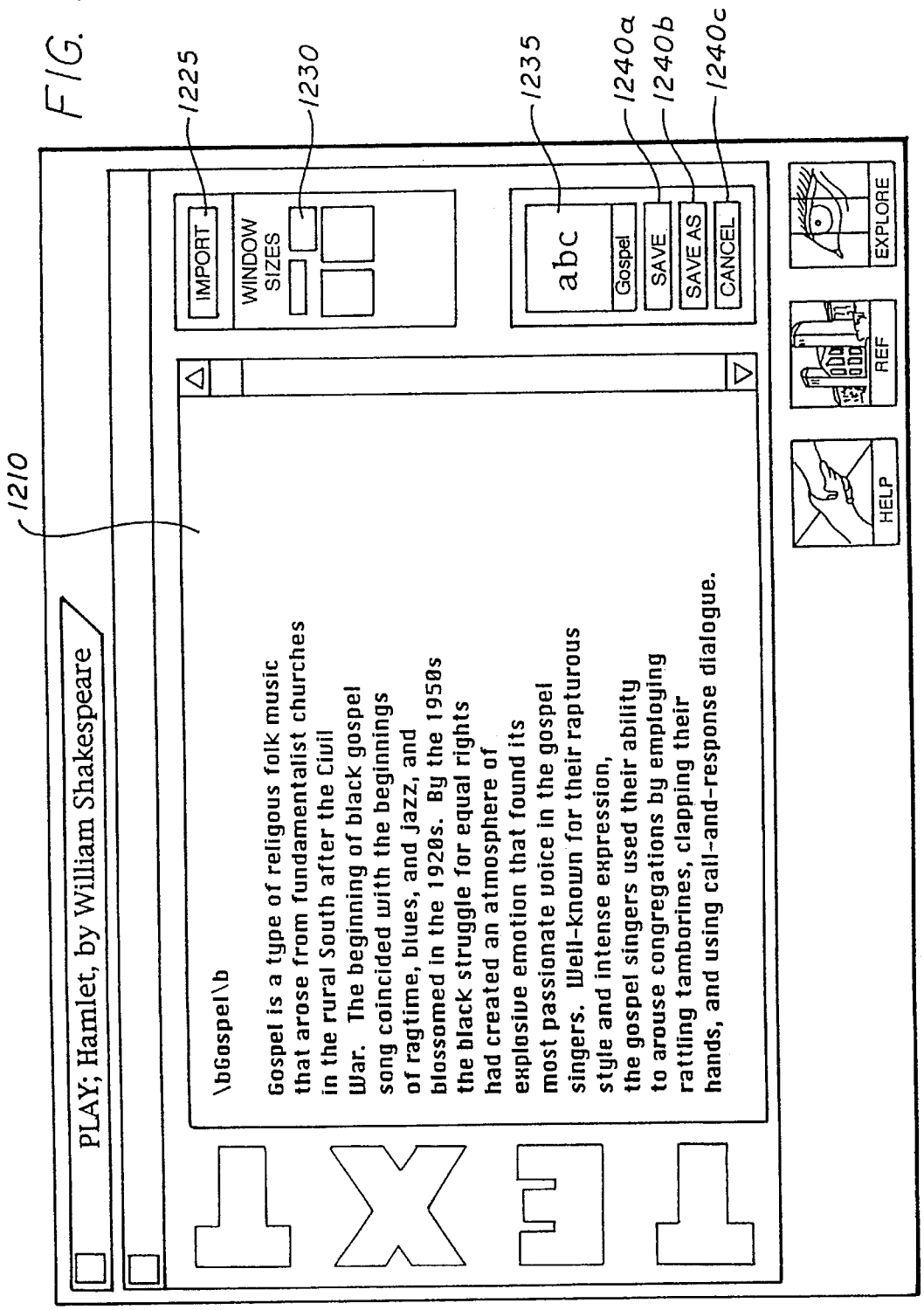
FIG. 12 illustrates a display screen of a text editor used with an embodiment of the present invention.

The text editor may be activated by clicking on editor button 560b in FIG. 5. The display screen for the one embodiment of the text editor used with the present invention is shown in FIG. 12. The embodiment of the text editor shown in FIG. 12 includes an icon button 1235 and file buttons 1240a to 1240c that function like those of the video, graphics and audio editors described above. The text editor also includes a display area 1210 for displaying the text to be used for the text event being created, an import button 1225, and a window size designation area 1230.

A number of different window sizes and shapes are displayed in window size designation area 1230. Clicking on a shape chooses that shape and relative size for the text window in which the text event will be displayed on the main display screen when the event sequence to which it belongs is initiated by clicking the trigger to which it is connected, as described above.

Text may be entered into display area 121.0 by clicking on the area (where upon a typing cursor appears at the location clicked on) and typing in characters with a keyboard, or text may be imported from an existing text file (which may be an ASCII text file) by activating import button 1225. Clicking on import button 1225 calls up a menu from which existing text files may be selected. The text of the text file will be entered into display window 1210, where it may be edited with the keyboard in a well known manner.

After a desired text is completed, criteria for the object for the event being created may be specified, the object may be saved, and the editor exited, all as described with respect to the video editor above.

Although certain specific embodiments for the text, video, audio, and graphics editors used with the present invention have been described above, it will be clear to those skilled in the art that other embodiments of the editors may be used without departing from the scope of the invention.

The media manager is exited by double-clicking on close button 550 in FIG. 5, whereupon the main screen of FIG. 1 is redisplayed. When the media manager is exited, the invention automatically stores the configuration of the Library Reel, Clip Reel and Event Reel that existed at the time the close button of the media manager is activated in a file in the computer's non-volatile storage media (typically a hard disk). In addition, the event sequence on the Event Reel, together with the trigger to which it is connected, is stored in a "connection map" in a file in the computer's non-volatile storage media.

In one embodiment of the invention, there is a connection map for each multimedia work. The connection map may consist of a sequential listing of all triggers for all filters together with any event sequence connected to each.

If no events are in the event reel when the media manager is closed, the trigger may be highlighted in a different manner from triggers that do have events connected to them when the main screen is redisplayed. In one embodiment, triggers that have event sequences connected to them are highlighted with a superimposed colored bar having the same color as the label of the currently active filter. Triggers that have no events connected to them are surrounded by an unshaded, rectangular border.

Figure 13:
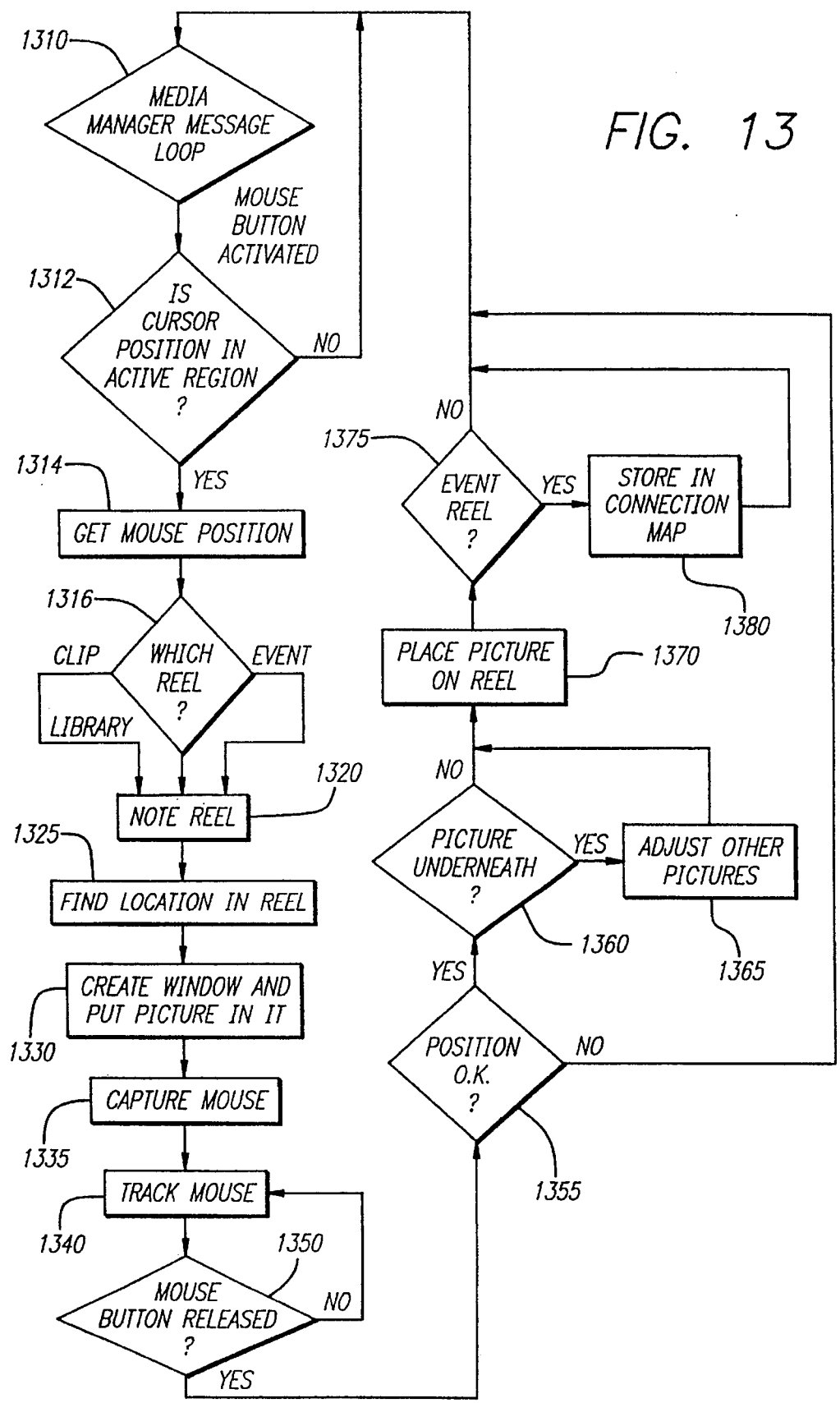
FIG. 13 is a block diagram of an embodiment of the event sequence assembly method of the present invention.

FIG. 13 shows a computer process for moving an event from one reel to another in one embodiment of the present invention.

User input is monitored by a message loop at decision block 1310, where messages about user input are received from the computer's operating system. If a message is received indicating that a mouse button has been activated and held, the cursor position where the button was pressed is tested at decision block 1312 to determine whether it is at an "active" location, that is, a location where a mouse-activated operation may be performed. If the location is not active, the process returns to the message loop at block 1310. If the location is active, the cursor position is determined at block 1314. The reel in which the cursor is positioned is determined at decision block 1316 and the identity of that reel is noted in the computer's memory at block 1320. The position of the cursor in this reel is determined at block 1325. A window is created and the picture or icon for the event being moved is placed in the window at block 1330. The mouse is "captured." by the window at 1335, and the window tracks the movement of the cursor at block 1340. Tracking continues until the mouse button is released at block 1350.

When the mouse button is released, the cursor position is tested to see whether it is at a valid location for pasting the event at decision block 1355. If the position is invalid, the process returns to decision block 1310. If the position is valid, the position is tested to see whether it is occupied by another picture at block 1360.

If another picture is in the intended position, that picture is moved, and other pictures that need to be moved are moved, at block 1365. The picture being moved is placed in position at block 1370. At decision block 1375, it is checked whether the reel in which the picture has been placed is the Event Reel. If it is not, the process returns to decision block 1310. If the reel is the Event Reel, a connection map in the computer's memory is first updated to reflect that the event represented by the picture has been added to the event sequence on the Event Reel.

Figure 14:
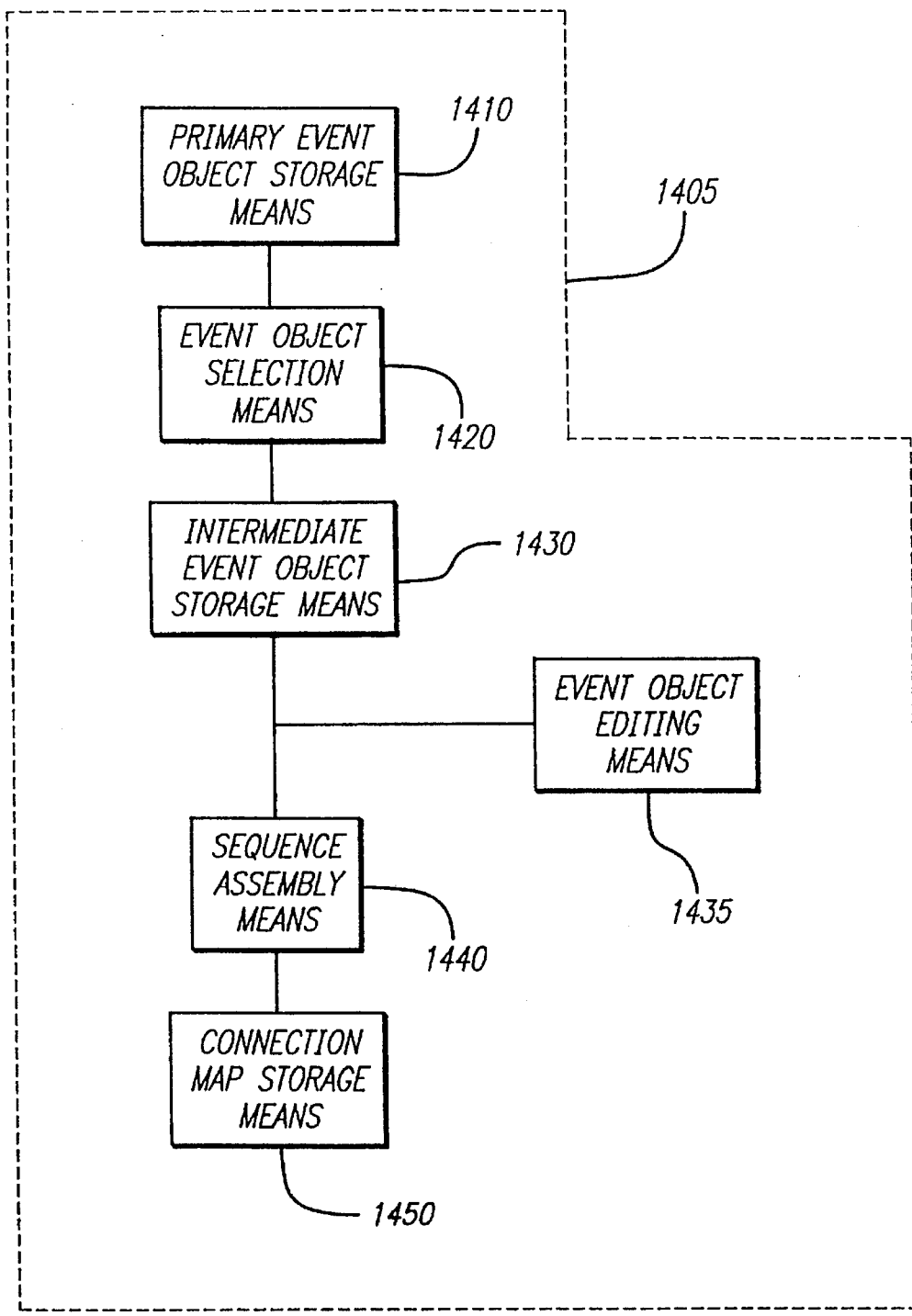
FIG. 14 is a block diagram of an embodiment of the annotation apparatus of the present invention.

FIG. 14 shows a schematic diagram of an embodiment of the media annotation apparatus of the present invention. As shown in FIG. 14, the apparatus 1405 comprises primary event object storage means 1410 for storing a selection of event objects, an event object selection means 1410 for selecting objects from the primary event object storage means 1410, intermediate event object storage means 1430 for storing events selected by event object selection means 1430, event object editing means 1435, sequence assembly means 1440 for compiling a sequence of events, and connection map storage means 1450 for connecting the sequence created by sequence assembly means 1440 to a trigger.

Computer source code for an embodiment of the media management system of the present invention is attached as appendix A. Computer source code for an embodiment of the media editors used with the present invention is attached as appendix B.

APPENDIX A

Media Manager Source Code (C++)

```
/*******************************************************************

Copyright AND Communications, Inc. 1991.  All rights reserved

*******************************************************************/ include "main.h"

/*******************************************************************

Project:            Multi-Media Text Processor (MTP)

*******************************************************************/

/*******************************************************************

Media Manager

The Media Manager is a floating window which can be dragged
        around the screen. It displays the library reel and the
        trigger reel for the library ID specified by the childID.

*******************************************************************/ define maxMediaManagerPushes           30 int mediaManagerTracking = mediaManagerTrackingNone;
POINT mediaManagerTrackingOffset;
int mediaManagerLeft = mediaManagerDefaultLeft;
int mediaManagerTop = mediaManagerDefaultTop;
HBITMAP hMediaMgrBitMap = NULL, hMediaInfoBitMap = NULL, hCriteriaBitMap = NULL,
    hDiagramTriggerBitMap = NULL, hTextTriggerBitMap = NULL;
int mediaManagerTriggerType = NULL;
long mediaManagerTriggerID = NULL;
HWND hMediaManagerWnd = NULL, hCloseWnd = NULL, hScanDiskWnd = NULL, hInfoWnd = NULL,
    hDeleteWnd = NULL, hLibraryListWnd = NULL, hClipListWnd = NULL, hTriggerListWnd = NULL,
    hTrashWnd = NULL;
char mediaManagerTriggerName[64];
int mediaManagerTrackingList = NULL;
int nMediaManagerPushes = 0;
int mediaManagerPushTriggerType[maxMediaManagerPushes];
long mediaManagerPushTriggerID[maxMediaManagerPushes];

// Given a name and a trigger library ID, this routine will open up
// the media manager for that trigger and allow the user to manipulate
// the trigger library.  When the media manager is closed, the library
// must be translated back to the originating trigger.  This is done
// by you supplying a call-back routine.  You must pass the return
// value from the MakeProcInstance function to this function. The
// FreeProcInstance is automatically called when the media manager is
// closed.  This call-back routine is called when the media manager
// is closing to allow you to copy the contents of the trigger library
// into your data structure for the trigger.

void openMediaManager(long triggerID, int triggerType)
{
    int libraryID;
    mediaLibraryType mediaLibrary;
```

```
        // Set the wait cursor.
        SetCursor(LoadCursor(NULL, IDC_WAIT));

// See if the media manager is already open.
        if (hMediaManagerWnd) closeMediaManager();

// Remember the trigger ID.
        mediaManagerTriggerID = triggerID;

// Remember the call-back routine
        mediaManagerTriggerType = triggerType;

// Set up the Main library.
        media.setMainLibrary();

// Get the trigger library ID, empty the library.
        libraryID = media.getTriggerLibrary(&mediaLibrary);
        if (libraryID != -1) {
                media.clearLibrary(&mediaLibrary);
                media.setTriggerLibrary(&mediaLibrary);
        }

// Open the call-back routine.
        if (!mediaManagerCallBackRtn(mediaManagerTriggerID, mmCallBackOpen, libraryID, NULL))
return;

// Tell the call-back routine to fill the library with the trigger.
        mediaManagerCallBackRtn(mediaManagerTriggerID, mmCallBackTriggerToLibrary, libraryID,
NULL);

// Get the trigger name.
        mediaManagerTriggerName[0] = 0;
        mediaManagerCallBackRtn(mediaManagerTriggerID, mmCallBackGetTriggerName, libraryID,
(LPSTR) mediaManagerTriggerName);

// Open the media manager and set its childID to the libraryID of
        // the trigger library.
        hMediaManagerWnd = CreateWindow("mediaManagerWClass", NULL,
            WS_CHILD | WS_VISIBLE | WS_CLIPSIBLINGS,
            mediaManagerLeft, mediaManagerTop, mediaManagerDefaultWidth, mediaManagerDefaultHeight,
            hMainWnd, libraryID, hInst, NULL);

// Bring the window to the top.
        BringWindowToTop(hMediaManagerWnd);
}

// Calling this routine will push the media manager and close it
// so that it can be reopened by popping it. This keeps the numbers
// of opens windows to a minimum. Normally, only the media editors
// will call these to push the media manager when they open and
// pop the media manager when they close. This also allows the media
// manager to be used for different triggers in a progression. For
// instance you double click on a word in your text (bringing up the
// media manager for that trigger word) and you want to edit a diagram.
// So, you double click on that diagram (opening the diagram editor
// and pushing the media manager for your trigger word). Next you
// double click on a button on the diagram (bringing up the media
// manager again, but this time for the button) to change the media
// associated with the button. After closing the media manager,
// followed by closing the diagram editor, the media manager returns
// (popped for the original trigger word).

void pushMediaManager()
{
        if (hMediaManagerWnd) {
                if (nMediaManagerPushes < maxMediaManagerPushes-1) {
                        mediaManagerPushTriggerType[nMediaManagerPushes] =
mediaManagerTriggerType;
```

```
                    mediaManagerPushTriggerID[nMediaManagerPushes] = mediaManagerTriggerID;
                    nMediaManagerPushes++;

closeMediaManager();
            }
        }
    }

// See the pushMediaManager function above.

void popMediaManager()
{
        if (nMediaManagerPushes > 0) {
                nMediaManagerPushes--;
                mediaManagerTriggerType = mediaManagerPushTriggerType[nMediaManagerPushes];
                mediaManagerTriggerID = mediaManagerPushTriggerID[nMediaManagerPushes];

openMediaManager(mediaManagerTriggerID, mediaManagerTriggerType);
        }
}

// With this routine, you can force the media manager to be closed.

void closeMediaManager()
{
        if (hMediaManagerWnd) DestroyWindow(hMediaManagerWnd);
}

// This function will make the appropriate call back call so that
// the specific media type can handle the message.

long mediaManagerCallBackRtn(long triggerID, int message, long libraryID, LPSTR ptr)
{
        switch (mediaManagerTriggerType) {
                case mediaTypeNone: return(TRUE); break;
                case mediaTypeDocument: return(connectMediaMessageRtn(triggerID, message,
    libraryID, ptr)); break;
                case mediaTypeDiagram: return(diagramButtonMessageRtn(triggerID, message, libraryID,
    ptr)); break;
        } return(NULL);
} void loadM();   // jay try to save memory.
void freeM();   // jay try to save memory.

extern "C" long FAR PASCAL _export MediaManagerWndProc(HWND hWnd, unsigned message, WORD
wParam, LONG lParam)
{
        RECT rect;

GetClientRect(hWnd, &rect);

switch (message) {
                case WM_CREATE:
                {
//                              loadM();
                                int clipListID;
                                mediaLibraryType mediaLibrary;

// Search through all the libraries for the Clip Reel.
                                if (media.getLibraryByName("Clip Reel", &mediaLibrary) == -1) {
                                        clipListID = media.addLibrary("Clip Reel", libraryTypeSub);
                                } else {
                                        clipListID = mediaLibrary.ID;
                                }
```

```
                    hLibraryListWnd = CreateWindow("mediaListWClass", NULL,
                        WS_CHILD | WS_VISIBLE | WS_CLIPSIBLINGS,
                        rect.left+mediaManagerLibraryLeft,
    rect.top+mediaManagerLibraryTop, mediaManagerLibraryNIcons*(mediaListIconWidth+mediaListIconBorder*2)+2*mediaListArrowWidth,
    mediaListIconHeight+2*mediaListIconBorder,
                        hWnd, media.getMainLibrary(NULL), hInst, NULL);
                    hClipListWnd = CreateWindow("mediaListWClass", NULL,
                        WS_CHILD | WS_VISIBLE | WS_CLIPSIBLINGS,
                        rect.left+mediaManagerLibraryLeft,
    rect.top+mediaManagerClipReelTop, mediaManagerLibraryNIcons*(mediaListIconWidth+mediaListIconBorder*2)+2*mediaListArrowWidth,
    mediaListIconHeight+2*mediaListIconBorder,
                        hWnd, clipListID, hInst, NULL);
                    hTriggerListWnd = CreateWindow("mediaListWClass", NULL,
                        WS_CHILD | WS_VISIBLE | WS_CLIPSIBLINGS,
                        rect.left+mediaManagerLibraryLeft,
    rect.top+mediaManagerTriggerReelTop, mediaManagerLibraryNIcons*(mediaListIconWidth+mediaListIconBorder*2)+2*mediaListArrowWidth,
    mediaListIconHeight+2*mediaListIconBorder,
                        hWnd, GetWindowWord(hWnd, GWW_ID), hInst, NULL);
                    CreateWindow("mediaButtonWClass", NULL,
                        WS_CHILD | WS_VISIBLE | WS_CLIPSIBLINGS,
                        mediaManagerWorldLeft, mediaManagerWorldTop,
    mediaManagerWorldWidth, mediaManagerWorldHeight,
                        hWnd, mediaManagerWorld, hInst, NULL);
                    hTrashWnd = CreateWindow("mediaButtonWClass", NULL,
                        WS_CHILD | WS_VISIBLE | WS_CLIPSIBLINGS,
                        mediaManagerTrashLeft, mediaManagerTrashTop,
    mediaManagerTrashWidth, mediaManagerTrashHeight,
                        hWnd, mediaManagerTrash, hInst, NULL);
                    hInfoWnd = CreateWindow("mediaButtonWClass", NULL,
                        WS_CHILD | WS_VISIBLE | WS_CLIPSIBLINGS,
                        mediaManagerInfoBoxLeft, mediaManagerInfoBoxTop,
    mediaManagerInfoBoxWidth, mediaManagerInfoBoxHeight,
                        hWnd, mediaManagerInfo, hInst, NULL);
                    hDeleteWnd = CreateWindow("mediaButtonWClass", NULL,
                        WS_CHILD | WS_VISIBLE | WS_CLIPSIBLINGS,
                        mediaManagerDeleteBoxLeft, mediaManagerDeleteBoxTop,
    mediaManagerDeleteBoxWidth, mediaManagerDeleteBoxHeight,
                        hWnd, mediaManagerDelete, hInst, NULL);
                    hCloseWnd = CreateWindow("mediaButtonWClass", NULL,
                        WS_CHILD | WS_VISIBLE | WS_CLIPSIBLINGS,
                        mediaManagerCloseBoxLeft, mediaManagerCloseBoxTop,
    mediaManagerCloseBoxWidth, mediaManagerCloseBoxHeight,
                        hWnd, mediaManagerClose, hInst, NULL);
                    hScanDiskWnd = CreateWindow("mediaButtonWClass", NULL,
                        WS_CHILD | WS_VISIBLE | WS_CLIPSIBLINGS,
                        mediaManagerScanDiskLeft, mediaManagerScanDiskTop,
    mediaManagerScanDiskWidth, mediaManagerScanDiskHeight,
                        hWnd, mediaManagerScanDisk, hInst, NULL);
                    CreateWindow("mediaButtonWClass", NULL,
                        WS_CHILD | WS_VISIBLE | WS_CLIPSIBLINGS,
                        mediaManagerSearchLeft, mediaManagerSearchTop,
    mediaManagerSearchWidth, mediaManagerSearchHeight,
                        hWnd, mediaManagerSearch, hInst, NULL);

SetFocus(hLibraryListWnd);
                }
                break;

case WM_COMMAND:
                {
                    RECT rect;
                    POINT point;
```

```
                            // Determine the current mouse location.
                            point.x = LOWORD(lParam);
                            point.y = HIWORD(lParam);
                            ClientToScreen(hWnd, &point);

// If in the trigger list, then tell the trigger list
                            // to add the entry to itself, or reorder it.
                            GetWindowRect(hTriggerListWnd, &rect);
                            if (PtInRect(&rect, point)) {
                                    ScreenToClient(hTriggerListWnd, &point);
                                    SendMessage(hTriggerListWnd, WM_COMMAND, wParam,
MAKELONG(point.x, point.y));
                            }

// If in the clip list, then tell the clip list
                            // to add the entry to itself, or reorder it.
                            GetWindowRect(hClipListWnd, &rect);
                            if (PtInRect(&rect, point)) {
                                    ScreenToClient(hClipListWnd, &point);
                                    SendMessage(hClipListWnd, WM_COMMAND, wParam,
MAKELONG(point.x, point.y));
                            }

// If in the trash can, then remove the entry from
                            // the list.
                            GetWindowRect(hTrashWnd, &rect);
                            if (PtInRect(&rect, point)) {
                                    if (mediaManagerTrackingList ==
GetWindowWord(hTriggerListWnd, GWW_ID)) {
                                            SendMessage(hTriggerListWnd, WM_COMMAND, -
wParam, NULL);

} else if (mediaManagerTrackingList ==
GetWindowWord(hClipListWnd, GWW_ID)) {
                                            SendMessage(hClipListWnd, WM_COMMAND, -
wParam, NULL);

} else if (mediaManagerTrackingList ==
GetWindowWord(hLibraryListWnd, GWW_ID)) {
                                            SendMessage(hLibraryListWnd, WM_COMMAND, -
wParam, NULL);

// Redraw the other two lists.
                                    GetClientRect(hClipListWnd, &rect);
                                    InvalidateRect(hClipListWnd, &rect, FALSE);
                                    GetClientRect(hTriggerListWnd, &rect);
                                    InvalidateRect(hTriggerListWnd, &rect, FALSE);
                                    }
                            }
                            break;

case WM_LBUTTONDOWN:
            /*
                            BringWindowToTop(hWnd);
                            if (HIWORD(lParam) < rect.top+mediaManagerDragBarHeight) {
                                    mediaManagerTracking = mediaManagerTrackingMove;
                                    mediaManagerTrackingOffset.x = LOWORD(lParam)-rect.left;
                                    mediaManagerTrackingOffset.y = HIWORD(lParam)-rect.top;

SetCapture(hWnd);
                            }
            */
                            break;

case WM_MOUSEMOVE:
                            SetFocus(hLibraryListWnd);

if (mediaManagerTracking == mediaManagerTrackingMove) {
```

```
                            mediaManagerLeft += LOWORD(lParam)-rect.left-
        mediaManagerTrackingOffset.x;
                            mediaManagerTop += HIWORD(lParam)-rect.top-
        mediaManagerTrackingOffset.y;

// Move the media manager.
                            MoveWindow(hWnd, mediaManagerLeft,
                                mediaManagerTop, rect.right-rect.left,
                                rect.bottom-rect.top, TRUE);

// Redraw the media manager as well as the main window.
                            UpdateWindow(hWnd);
                            UpdateWindow(GetParent(hWnd));
                        }
                        break;

case WM_LBUTTONUP:
                        if (mediaManagerTracking) {
                            ReleaseCapture();
                            mediaManagerTracking = mediaManagerTrackingNone;
                        }
                        break;

case WM_PAINT:
                        {
                            HDC hDC;
                            PAINTSTRUCT ps;

hDC = BeginPaint(hWnd, &ps);
                            if (hMediaMgrBitMap) hBitMapBlt(hDC, hMediaMgrBitMap, FALSE,
        SRCCOPY, rect.left, rect.top, rect.right-rect.left, rect.bottom-rect.top, 0, 0, 0, 0);
                            EndPaint(hWnd, &ps);
                        }
                        break;

case WM_DESTROY:
                        mediaManagerCallBackRtn(mediaManagerTriggerID,
        mmCallBackLibraryToTrigger, GetWindowWord(hWnd, GWW_ID), NULL);
                        mediaManagerCallBackRtn(mediaManagerTriggerID, mmCallBackClose,
        GetWindowWord(hWnd, GWW_ID), NULL);
                        media.removeLibraryByID(GetWindowWord(hWnd, GWW_ID));
                        hMediaManagerWnd = NULL;
        //                  freeM();
                        break;

default:
                        return(DefWindowProc(hWnd, message, wParam, lParam));
                        break;
                }
            return(NULL);
        } int mediaListTracking = mediaListTrackingNone;
POINT mediaListTrackingOffset;
int mediaListTrackingEntryNum, mediaListTrackingEntryID;
HWND mediaListTrackingWnd;
char mediaListKeyboardSearch[32] = {0};
double mediaListKeyboardTime = 0;

extern "C" long FAR PASCAL _export MediaListWndProc(HWND hWnd, unsigned message, WORD
wParam, LONG lParam)
{
        RECT rect, iconRect;
        HWND hParentWnd;
        int libraryID;
        mediaLibraryType mediaLibrary;

GetClientRect(hWnd, &rect);
```

```
                    hParentWnd = GetParent(hWnd);
                    libraryID = GetWindowWord(hWnd, GWW_ID);
                    libraryID = media.getLibraryByID(libraryID, &mediaLibrary);
                    if (libraryID != -1) libraryID = mediaLibrary.ID;

switch (message) {
                        case WM_CREATE:
                            if (libraryID != -1) {
                                int selectedItemNum;
                                int entryNum, entryID;
                                mediaMapEntryType mediaMapEntry;

if (libraryID != media.getMainLibrary(NULL)) {
                                    for (entryNum = 0; entryNum < mediaLibrary.nLibraryEntries;
entryNum++) {
                                        entryID = media.getLibraryEntry(entryNum,
&mediaLibrary);
                                        if (media.getEntryByID(entryID, &mediaMapEntry)
== -1) {
                                            media.removeLibraryEntryByID(entryID,
&mediaLibrary);
                                            media.setLibraryByID(libraryID,
&mediaLibrary);
                                        }
                                    } mediaLibrary.mediaList.startListItem = 0;
                                }
                                mediaLibrary.mediaList.nListItems = rect.right-rect.left-
mediaListArrowWidth*2;
                                mediaLibrary.mediaList.nListItems /=
mediaListIconWidth+mediaListIconBorder*2;
                                for (selectedItemNum = 0; selectedItemNum <
maxMediaListSelectedItems; selectedItemNum++) {
                                    mediaLibrary.mediaList.selectedItems[selectedItemNum] = 0;
                                }
                                media.setLibraryByID(libraryID, &mediaLibrary);
                            }
                            break;

case WM_SETFOCUS:
                            mediaListKeyboardTime = 0;
                            mediaListKeyboardSearch[0] = 0;
                            break;

case WM_KEYDOWN:
                            if (libraryID != -1) {
                                int entryNum, selectedItemNum;
                                mediaMapEntryType mediaMapEntry;

if (wParam == VK_PRIOR || wParam == VK_NEXT || wParam ==
VK_UP || wParam == VK_HOME || wParam == VK_DOWN || wParam == VK_END || (wParam >= 'A'
&& wParam <= 'Z') || (wParam >= '0' && wParam <= '9')) {
                                    for (entryNum = mediaLibrary.mediaList.startListItem;
entryNum < mediaLibrary.mediaList.startListItem+mediaLibrary.mediaList.nListItems; entryNum++) {
                                        selectedItemNum = media.getLibraryEntry(entryNum,
&mediaLibrary);
                                        selectedItemNum =
media.getEntryByID(selectedItemNum, &mediaMapEntry);
                                        if (selectedItemNum != -1 &&
mediaMapEntry.bitMapHdl) {
                                            GlobalFree(mediaMapEntry.bitMapHdl);
                                            mediaMapEntry.bitMapHdl = NULL;
                                            mediaMapEntry.bitMapSize = 0;
                                            media.setEntryByID(mediaMapEntry.ID,
&mediaMapEntry);
                                        }
                                    }
                                }
                            }
```

```
                    if (wParam == VK_LEFT && mediaLibrary.mediaList.startListItem > 0) {
                        selectedItemNum =
media.getLibraryEntry(mediaLibrary.mediaList.startListItem+mediaLibrary.mediaList.nListItems-1,
&mediaLibrary);
                        selectedItemNum = media.getEntryByID(selectedItemNum,
&mediaMapEntry);
                        if (selectedItemNum != -1 && mediaMapEntry.bitMapHdl) {
                            GlobalFree(mediaMapEntry.bitMapHdl);
                            mediaMapEntry.bitMapHdl = NULL;
                            mediaMapEntry.bitMapSize = 0;
                            media.setEntryByID(mediaMapEntry.ID,
&mediaMapEntry);
                        } mediaLibrary.mediaList.startListItem--;
                        media.setLibraryByID(libraryID, &mediaLibrary);
                        InvalidateRect(hWnd, &rect, FALSE);
                        mediaListKeyboardSearch[0] = 0;

} else if (wParam == VK_RIGHT &&
mediaLibrary.mediaList.startListItem < mediaLibrary.nLibraryEntries-1) {
                        selectedItemNum =
media.getLibraryEntry(mediaLibrary.mediaList.startListItem, &mediaLibrary);
                        selectedItemNum = media.getEntryByID(selectedItemNum,
&mediaMapEntry);
                        if (selectedItemNum != -1 && mediaMapEntry.bitMapHdl) {
                            GlobalFree(mediaMapEntry.bitMapHdl);
                            mediaMapEntry.bitMapHdl = NULL;
                            mediaMapEntry.bitMapSize = 0;
                            media.setEntryByID(mediaMapEntry.ID,
&mediaMapEntry);
                        } mediaLibrary.mediaList.startListItem++;
                        media.setLibraryByID(libraryID, &mediaLibrary);
                        InvalidateRect(hWnd, &rect, FALSE);
                        mediaListKeyboardSearch[0] = 0;

} else if (wParam == VK_PRIOR) {
                        mediaLibrary.mediaList.startListItem -=
mediaLibrary.mediaList.nListItems;
                        if (mediaLibrary.mediaList.startListItem < 0)
mediaLibrary.mediaList.startListItem = 0;
                        media.setLibraryByID(libraryID, &mediaLibrary);
                        InvalidateRect(hWnd, &rect, FALSE);
                        mediaListKeyboardSearch[0] = 0;

} else if (wParam == VK_NEXT) {
                        mediaLibrary.mediaList.startListItem +=
mediaLibrary.mediaList.nListItems;
                        if (mediaLibrary.mediaList.startListItem >
mediaLibrary.nLibraryEntries-1) mediaLibrary.mediaList.startListItem = mediaLibrary.nLibraryEntries-1;
                        media.setLibraryByID(libraryID, &mediaLibrary);
                        InvalidateRect(hWnd, &rect, FALSE);
                        mediaListKeyboardSearch[0] = 0;

} else if (wParam == VK_UP || wParam == VK_HOME) {
                        mediaLibrary.mediaList.startListItem = 0;
                        media.setLibraryByID(libraryID, &mediaLibrary);
                        InvalidateRect(hWnd, &rect, FALSE);
                        mediaListKeyboardSearch[0] = 0;

} else if (wParam == VK_DOWN || wParam == VK_END) {
                        mediaLibrary.mediaList.startListItem =
mediaLibrary.nLibraryEntries-1;
                        media.setLibraryByID(libraryID, &mediaLibrary);
                        InvalidateRect(hWnd, &rect, FALSE);
                        mediaListKeyboardSearch[0] = 0;
```

```
                                            } else if ((wParam >= 'A' && wParam <= 'Z') || (wParam >= '0' &&
wParam <= '9')) {
                                                    int entryNum, entryID;
                                                    mediaMapEntryType mediaMapEntry;
                                                    double time;
                                                    int len;
                                                    char search[32];

// Advance the time counter for the keyboard searching.
                                                    time = getSecs();
                                                    if (mediaListKeyboardTime+1 < time)
            mediaListKeyboardSearch[0] = 0;
                                                    mediaListKeyboardTime = time;

// Add this character to the keyboard search string.
                                                    len = strlen(mediaListKeyboardSearch);
                                                    if (len < 32) {
                                                            mediaListKeyboardSearch[len] = wParam;
                                                            mediaListKeyboardSearch[len+1] = 0;
                                                    }

// Find the best fit media map entry and scroll the
                                                    // list to it.
                                                    mediaLibrary.mediaList.startListItem = -1;
                                                    for (entryNum = 0; entryNum < mediaLibrary.nLibraryEntries;
entryNum++) {
                                                            entryID = media.getLibraryEntry(entryNum,
&mediaLibrary);
                                                            if (media.getEntryByID(entryID, &mediaMapEntry)
!= -1) {
                                                                    sprintf(search, "%s", mediaMapEntry.name);
                                                                    strupr(search);
                                                                    if (strcmp(search, mediaListKeyboardSearch)
>= 0) {
            mediaLibrary.mediaList.startListItem = entryNum;
                                                                            break;
                                                                    }
                                                            }
                                                    }
                                                    if (mediaLibrary.mediaList.startListItem == -1)
            mediaLibrary.mediaList.startListItem = mediaLibrary.nLibraryEntries-1;
                                                    media.setLibraryByID(libraryID, &mediaLibrary);
                                                    InvalidateRect(hWnd, &rect, FALSE);
                                            }
                                    }
                                    break;

case WM_COMMAND:
                            {
                                    POINT point;

point.x = LOWORD(lParam);
                                    point.y = HIWORD(lParam);

if ((int) wParam < 0) {
                                            mediaMapEntryType mediaMapEntry;

mediaMapEntry.ID = -((int) wParam);
                                            media.getEntryByID(mediaMapEntry.ID, &mediaMapEntry);
                                            if (libraryID == media.getMainLibrary(NULL)) {
                                                    int libraryNum;
                                                    mediaLibraryType removeLibrary;

if
(header.havePermission(&mediaMapEntry.permission)) { media.removeBitMapFromFile(&mediaMapEntry);
```

```
                    media.removeEntryByID(mediaMapEntry.ID);

media.openRemoveEntry(mediaMapEntry.filename);

for (libraryNum = 0; libraryNum <
    media.nLibraries(); libraryNum++) {
                            media.getLibrary(libraryNum,
    &removeLibrary);

media.removeLibraryEntryByID(mediaMapEntry.ID, &removeLibrary);

media.setLibraryByID(removeLibrary.ID, &removeLibrary);
                    }

} else {
                    MessageBox(GetFocus(), "You do not have
    permission to delete this media...", "MTP", MB_OK);
                }

} else {
                media.removeLibraryEntryByID(mediaMapEntry.ID,
    &mediaLibrary);
                media.setLibraryByID(libraryID, &mediaLibrary);
            } documentChanged = TRUE;
            InvalidateRect(hWnd, &rect, FALSE);

} else {
            int foundEntry;
            int entryNum;

foundEntry = FALSE;

for (entryNum = 0; entryNum < mediaLibrary.nLibraryEntries;
    entryNum++) {
                if (media.getLibraryEntry(entryNum, &mediaLibrary)
    == wParam) {
                    foundEntry = TRUE;
                    break;
                }
            } if (!foundEntry) {
                int itemNum;

itemNum = LOWORD(lParam)-rect.left-
    mediaListArrowWidth;
                itemNum /=
    mediaListIconWidth+mediaListIconBorder*2;

itemNum += mediaLibrary.mediaList.startListItem;

media.insertLibraryEntry(wParam, itemNum,
    &mediaLibrary);

media.setLibraryByID(libraryID, &mediaLibrary);

documentChanged = TRUE;
                InvalidateRect(hWnd, &rect, FALSE);
            }
        }
        break;

case WM_TIMER:
        KillTimer(hWnd, 4);
        SetTimer(hWnd, 4, 10, NULL);

if (mediaListTracking == mediaListTrackingDownArrowInside) {
```

```
                    if (mediaLibrary.mediaList.startListItem > 0) {
                        int selectedItemNum;
                        mediaMapEntryType mediaMapEntry;

selectedItemNum =
media.getLibraryEntry(mediaLibrary.mediaList.startListItem+mediaLibrary.mediaList.nListItems-1,
&mediaLibrary);
                        selectedItemNum = media.getEntryByID(selectedItemNum,
&mediaMapEntry);

if (selectedItemNum != -1 && mediaMapEntry.bitMapHdl) {
                            GlobalFree(mediaMapEntry.bitMapHdl);
                            mediaMapEntry.bitMapHdl = NULL;
                            mediaMapEntry.bitMapSize = 0;
                            media.setEntryByID(mediaMapEntry.ID,
&mediaMapEntry);
                        } mediaLibrary.mediaList.startListItem--;
                        media.setLibraryByID(libraryID, &mediaLibrary);
                        InvalidateRect(hWnd, &rect, FALSE);
                    }

} else if (mediaListTracking == mediaListTrackingUpArrowInside) {
                    if (mediaLibrary.mediaList.startListItem <
mediaLibrary.nLibraryEntries-1) {
                        int selectedItemNum;
                        mediaMapEntryType mediaMapEntry;

selectedItemNum =
media.getLibraryEntry(mediaLibrary.mediaList.startListItem, &mediaLibrary);
                        selectedItemNum = media.getEntryByID(selectedItemNum,
&mediaMapEntry);

if (selectedItemNum != -1 && mediaMapEntry.bitMapHdl) {
                            GlobalFree(mediaMapEntry.bitMapHdl);
                            mediaMapEntry.bitMapHdl = NULL;
                            mediaMapEntry.bitMapSize = 0;
                            media.setEntryByID(mediaMapEntry.ID,
&mediaMapEntry);
                        } mediaLibrary.mediaList.startListItem++;
                        media.setLibraryByID(libraryID, &mediaLibrary);
                        InvalidateRect(hWnd, &rect, FALSE);
                    }
                }
                break;

case WM_LBUTTONDOWN:
                if (libraryID != -1) {
                    if (LOWORD(lParam) < rect.left+mediaListArrowWidth) {
                        if (mediaLibrary.mediaList.startListItem > 0) {
                            mediaListTracking =
mediaListTrackingDownArrowInside;
                            SendMessage(hWnd, WM_TIMER, NULL, NULL);
                            SetCapture(hWnd);
                            SetTimer(hWnd, 4, 250, NULL);
                        }

} else if (LOWORD(lParam) > rect.right-mediaListArrowWidth) {
                        if (mediaLibrary.mediaList.startListItem <
mediaLibrary.nLibraryEntries-1) {
                            mediaListTracking =
mediaListTrackingUpArrowInside;
                            SendMessage(hWnd, WM_TIMER, NULL, NULL);
                            SetCapture(hWnd);
                            SetTimer(hWnd, 4, 250, NULL);
                        }

} else {
                        RECT wndRect, mainWndRect;
```

```
                                            mediaListTrackingEntryNum = LOWORD(lParam)-rect.left-
        mediaListArrowWidth;
                                            mediaListTrackingEntryNum /=
        mediaListIconWidth+mediaListIconBorder*2;
                                            mediaListTrackingEntryNum +=
        mediaLibrary.mediaList.startListItem;

iconRect.left =
        rect.left+mediaListArrowWidth+(mediaListIconWidth+mediaListIconBorder*2)*(mediaListTrackingEntryNu
        m-mediaLibrary.mediaList.startListItem)+mediaListIconBorder;
                                            iconRect.top = rect.top+mediaListIconBorder;
                                            iconRect.right = iconRect.left+mediaListIconWidth;
                                            iconRect.bottom = iconRect.bottom+mediaListIconBorder;

GetWindowRect(hWnd, &wndRect);
                                            GetWindowRect(hMainWnd, &mainWndRect);

mediaListTrackingOffset.x = LOWORD(lParam)-iconRect.left-
        (wndRect.left-mainWndRect.left);
                                            mediaListTrackingOffset.y = HIWORD(lParam)-iconRect.top-
        (wndRect.top-mainWndRect.top);

if (mediaListTrackingEntryNum <
        mediaLibrary.nLibraryEntries) {
                                                mediaListTracking = mediaListTrackingIconClick;
                                                mediaListTrackingEntryID =
        media.getLibraryEntry(mediaListTrackingEntryNum, &mediaLibrary);
                                                SetCapture(hWnd);
                                            }
                                        }
                                    }
                                    break;

case WM_LBUTTONDBLCLK:
                        if (libraryID != -1) {
                            if (LOWORD(lParam) >= rect.left+mediaListArrowWidth &&
        LOWORD(lParam) <= rect.right-mediaListArrowWidth) {
                                int selectedItemNum;

selectedItemNum = LOWORD(lParam)-rect.left-
        mediaListArrowWidth;
                                selectedItemNum /=
        mediaListIconWidth+mediaListIconBorder*2;
                                selectedItemNum += mediaLibrary.mediaList.startListItem;

if (selectedItemNum < mediaLibrary.nLibraryEntries) { openMediaEditor(media.getLibraryEntry(selectedItemNum, &mediaLibrary), NULL);
                                }
                            }
                        }
                        break;

case WM_MOUSEMOVE:
                        if (mediaListTracking && libraryID != -1) {
                            if (mediaListTracking == mediaListTrackingIconClick) {
                                iconRect.left =
        rect.left+mediaListArrowWidth+(mediaListIconWidth+mediaListIconBorder*2)*(mediaListTrackingEntryNu
        m-mediaLibrary.mediaList.startListItem)+mediaListIconBorder;
                                iconRect.top = rect.top+mediaListIconBorder;
                                iconRect.right = iconRect.left+mediaListIconWidth;
                                iconRect.bottom = iconRect.top+mediaListIconHeight;

mediaListTracking = mediaListTrackingIconMove;
                                mediaManagerTrackingList = GetWindowWord(hWnd,
        GWW_ID);

mediaListTrackingWnd =
        CreateWindow("mediaButtonWClass", NULL,
```

```
                                WS_CHILD | WS_VISIBLE | WS_CLIPSIBLINGS,
                                LOWORD(lParam)-mediaListTrackingOffset.x,
        HIWORD(lParam)-mediaListTrackingOffset.y, iconRect.right-iconRect.left, iconRect.bottom-iconRect.top,
                                hMainWnd, mediaListTrackingEntryID, hInst, NULL);
                                BringWindowToTop(mediaListTrackingWnd);

} else if (mediaListTracking == mediaListTrackingIconMove) {
                                MoveWindow(mediaListTrackingWnd, LOWORD(lParam)-
mediaListTrackingOffset.x,
                                HIWORD(lParam)-mediaListTrackingOffset.y,
mediaListIconWidth,
                                mediaListIconHeight, TRUE);

UpdateWindow(hParentWnd);
                                UpdateWindow(hWnd);
                                UpdateWindow(hMainWnd);
                                UpdateWindow(mediaListTrackingWnd);
                        }
                    }
                    break;

case WM_LBUTTONUP:
                    if (mediaListTracking && libraryID != -1) {
                        if (mediaListTracking == mediaListTrackingIconClick) {
/*
                                int selectedItemNum, selectedBitNum;
                                WORD selectedBit;

if (!(wParam & MK_SHIFT) && !(wParam &
MK_CONTROL)) {
                                        for (selectedItemNum = 0; selectedItemNum <
maxMediaListSelectedItems; selectedItemNum++) { mediaLibrary.mediaList.selectedItems[selectedItemNum] = 0;
                                        }
                                        media.setLibraryByID(libraryID, &mediaLibrary);

iconRect.left = rect.left+mediaListArrowWidth;
                                        iconRect.top = rect.top;
                                        iconRect.right = iconRect.right-
mediaListArrowWidth;
                                        iconRect.bottom = iconRect.bottom;
                                        InvalidateRect(hWnd, &iconRect, FALSE);
                                } selectedItemNum = LOWORD(lParam)-rect.left-
mediaListArrowWidth;
                                selectedItemNum /=
mediaListIconWidth+mediaListIconBorder*2;
                                selectedItemNum += mediaLibrary.mediaList.startListItem;

if (selectedItemNum < mediaLibrary.nLibraryEntries) {
                                        selectedBitNum = selectedItemNum & 0x000f;
                                        selectedBit = 1 << selectedBitNum;

mediaLibrary.mediaList.selectedItems[selectedItemNum/16] ^= selectedBit;
                                        media.setLibraryByID(libraryID, &mediaLibrary);

iconRect.left =
rect.left+mediaListArrowWidth+(mediaListIconWidth+mediaListIconBorder*2)*(selectedItemNum-
mediaLibrary.mediaList.startListItem);
                                        iconRect.top = rect.top;
                                        iconRect.right =
iconRect.left+mediaListIconWidth+mediaListIconBorder*2;
                                        iconRect.bottom = iconRect.bottom;
                                        InvalidateRect(hWnd, &iconRect, FALSE);
                                        UpdateWindow(hWnd);
                                }
*/
```

```
                        } else if (mediaListTracking == mediaListTrackingDownArrowInside ||
    mediaListTracking == mediaListTrackingUpArrowInside) {
                                KillTimer(hWnd, 4);

} else if (mediaListTracking == mediaListTrackingIconMove) {
                                POINT point;

point.x = LOWORD(lParam);
                                point.y = HIWORD(lParam);

if (!PtInRect(&rect, point)) {
                                        ClientToScreen(hWnd, &point);
                                        ScreenToClient(hParentWnd, &point);
                                        SendMessage(hParentWnd, WM_COMMAND,
    mediaListTrackingEntryID, MAKELONG(point.x, point.y));

} else if (libraryID != media.getMainLibrary(NULL)) {
                                        int itemNum;

itemNum = LOWORD(lParam)-rect.left-
    mediaListArrowWidth;
                                        itemNum /=
    mediaListIconWidth+mediaListIconBorder*2;
                                        itemNum += mediaLibrary.mediaList.startListItem;

if (itemNum < mediaListTrackingEntryNum ||
    itemNum > mediaListTrackingEntryNum) { media.removeLibraryEntryByID(mediaListTrackingEntryID, &mediaLibrary);

media.insertLibraryEntry(mediaListTrackingEntryID, itemNum, &mediaLibrary);
                                                media.setLibraryByID(libraryID,
    &mediaLibrary);
                                                InvalidateRect(hWnd, &rect, FALSE);
                                                UpdateWindow(hWnd);
                                        }
                                }

DestroyWindow(mediaListTrackingWnd);
                        } mediaListTracking = mediaListTrackingNone;
                        ReleaseCapture();
                }
                break;

case WM_PAINT:
                if (libraryID != -1) {
                        HDC hDC;
                        PAINTSTRUCT ps;
                        char huge *ptr;
                        HBRUSH hBrush, hSaveBrush;
                        HPEN hNullPen, hBlackPen, hWhitePen, hSavePen;
                        int listItemNum;
                        mediaMapEntryType mediaMapEntry;
                        int selectedItemNum, selectedBitNum;
                        WORD selectedBit;
                        int entryNum;

hDC = BeginPaint(hWnd, &ps);

hBrush = GetStockObject(GRAY_BRUSH);
                        hBlackPen = GetStockObject(BLACK_PEN);
                        hWhitePen = GetStockObject(WHITE_PEN);
                        hNullPen = GetStockObject(NULL_PEN);

hSavePen = SelectObject(hDC, hNullPen);
                        hSaveBrush = SelectObject(hDC, hBrush);
```

```
                        if (mediaLibrary.nLibraryEntries &&
    mediaLibrary.mediaList.startListItem > mediaLibrary.nLibraryEntries-1) {
                                    mediaLibrary.mediaList.startListItem =
    mediaLibrary.nLibraryEntries-1;
                                    media.setLibraryByID(libraryID, &mediaLibrary);

} else if (mediaLibrary.nLibraryEntries == 0) {
                                    mediaLibrary.mediaList.startListItem = 0;
                                    media.setLibraryByID(libraryID, &mediaLibrary);
                        } for (listItemNum = 0; listItemNum <
    mediaLibrary.mediaList.nListItems; listItemNum++) {
                                    iconRect.left =
    rect.left+mediaListArrowWidth+(mediaListIconWidth+mediaListIconBorder*2)*listItemNum+mediaListIcon
    Border;
                                    iconRect.top = rect.top+mediaListIconBorder;
                                    iconRect.right = iconRect.left+mediaListIconWidth;
                                    iconRect.bottom = iconRect.top+mediaListIconHeight;

selectedItemNum =
    listItemNum+mediaLibrary.mediaList.startListItem;
                                    if (selectedItemNum < mediaLibrary.nLibraryEntries) {
                                                selectedItemNum =
    media.getLibraryEntry(selectedItemNum, &mediaLibrary);
                                                selectedItemNum =
    media.getEntryByID(selectedItemNum, &mediaMapEntry);

if (!mediaMapEntry.bitMapHdl)
    media.restoreBitMapFromFile(&mediaMapEntry);

if (selectedItemNum != -1 &&
    mediaMapEntry.bitMapHdl) {
                                                            char huge *ptr;

ptr = (char huge *)
    GlobalWire(mediaMapEntry.bitMapHdl);
                                                            bitMapBlt(hDC, ptr, TRUE, SRCCOPY,
    iconRect.left, iconRect.top, iconRect.right-iconRect.left, iconRect.bottom-iconRect.top, 0, 0, 0, 0);
                                                            GlobalUnWire(mediaMapEntry.bitMapHdl);

} else {
                                                            SelectObject(hDC, hNullPen);
                                                            Rectangle(hDC, iconRect.left, iconRect.top,
    iconRect.right, iconRect.bottom);

SelectObject(hDC, hBlackPen);
                                                            MoveTo(hDC, iconRect.left,
    iconRect.bottom-1);
                                                            LineTo(hDC, iconRect.right-1,
    iconRect.bottom-1);
                                                            LineTo(hDC, iconRect.right-1,
    iconRect.top);

SelectObject(hDC, hWhitePen);
                                                            MoveTo(hDC, iconRect.left,
    iconRect.bottom-1);

LineTo(hDC, iconRect.left, iconRect.top);
                                                            LineTo(hDC, iconRect.right-1,
    iconRect.top);
                                                } media.setEntryByID(mediaMapEntry.ID,
    &mediaMapEntry);

selectedBitNum = selectedItemNum & 0x000f;
                                                selectedBit = 1 << selectedBitNum;
                                                if
    (mediaLibrary.mediaList.selectedItems[selectedItemNum/16] & selectedBit) {
                                                            InvertRect(hDC, &iconRect);
                                                }
```

```
                            } else {
                                    SelectObject(hDC, hNullPen);
                                    Rectangle(hDC, iconRect.left, iconRect.top,
         iconRect.right, iconRect.bottom);
                                    SelectObject(hDC, hBlackPen);
                                    MoveTo(hDC, iconRect.left, iconRect.bottom-1);
                                    LineTo(hDC, iconRect.right-1, iconRect.bottom-1);
                                    LineTo(hDC, iconRect.right-1, iconRect.top);
                                    SelectObject(hDC, hWhitePen);
                                    MoveTo(hDC, iconRect.left, iconRect.bottom-1);
                                    LineTo(hDC, iconRect.left, iconRect.top);
                                    LineTo(hDC, iconRect.right-1, iconRect.top);
                            }
                    }
                    SelectObject(hDC, hSaveBrush);
                    SelectObject(hDC, hSavePen);

DeleteObject(hBrush);
                    DeleteObject(hBlackPen);
                    DeleteObject(hWhitePen);
                    DeleteObject(hNullPen);

EndPaint(hWnd, &ps);
            }
            break;

case WM_DESTROY:
                    if (libraryID == media.getMainLibrary(NULL)) {
                            int entryNum;
                            mediaMapEntryType mediaMapEntry;

for (entryNum = 0; entryNum < media.nMediaEntries; entryNum++) {
                                    if (media.getEntry(entryNum, &mediaMapEntry) != -1) {
                                            if (mediaMapEntry.bitMapHdl) {
                                                    GlobalFree(mediaMapEntry.bitMapHdl);
                                                    mediaMapEntry.bitMapHdl = NULL;
                                                    mediaMapEntry.bitMapSize = 0;
                                                    media.setEntryByID(mediaMapEntry.ID,
         &mediaMapEntry);
                                            }
                                    }
                            }
                    }
                    break;

default:
                    return(DefWindowProc(hWnd, message, wParam, lParam));
                    break;
        } return(NULL);
} extern "C" HANDLE FAR PASCAL _export CriteriaDialog(HWND hDlg, unsigned message, WORD
wParam, LONG lParam)
{
        static HBRUSH hBrush=0;
        HWND hWnd;

switch (message) {
                case WM_LBUTTONDOWN:
                        {
                                POINT point;
                                RECT rect;

point.x = LOWORD(lParam);
                                point.y = HIWORD(lParam);
```

```
                                SetRect(&rect, 2, 2, 18, 18);
                                if (PtInRect(&rect, point)) SendMessage(hDlg, WM_COMMAND,
IDCANCEL, NULL);
                        }
                        break;

case WM_PAINT:
                        {
                                PAINTSTRUCT ps;
                                HDC hDC;
                                RECT rect;

hDC = BeginPaint(hDlg, &ps);
                                ExcludeClipRect(hDC, 7, 89, 7+254, 89+130);
                                GetClientRect(hDlg, &rect);
                                hBitMapBlt(hDC, hCriteriaBitMap, FALSE, SRCCOPY, rect.left,
rect.top, rect.right-rect.left, rect.bottom-rect.top, 0, 0, 0, 0);
                                EndPaint(hDlg, &ps);
                        }
                        break;

case WM_CTLCOLOR:
                        if (HIWORD(lParam) == CTLCOLOR_BTN) {
                                LOGBRUSH logBrush;
                                HWND hWnd;
                                long style;

hWnd = (HWND) LOWORD(lParam);
                                style = GetWindowLong(hWnd, GWL_STYLE);

if (style & BS_CHECKBOX) {
                                        SetTextColor((HDC) wParam, RGB(0,255,255));
                                        SetBkColor((HDC) wParam, RGB(101,101,101));

logBrush.lbStyle = BS_SOLID;
                                        logBrush.lbColor = RGB(101,101,101);

if (hBrush)
                                        {
                                                DeleteObject(hBrush);
                                                hBrush=0;
                                        }
                                        hBrush = CreateBrushIndirect(&logBrush);

return(hBrush);
                                }
                        }
                        break;
                case WM_DESTROY:
                        if (hBrush)
                        {
                                DeleteObject(hBrush);
                                hBrush=0;
                        }
                        return TRUE;

case WM_COMMAND:
                        switch (wParam) {
                                case 102:
                                {
                                        char criteria[64];

GetDlgItemText(hDlg, 101, criteria, 64);
                                        if (criteria[0]) SendDlgItemMessage(hDlg, 103,
LB_ADDSTRING, NULL, (long) criteria);
                                }
                                break;

case 104:
                                {
```

```
                    LB_GETCURSEL, NULL, NULL);
                    103, LB_DELETESTRING, index, NULL);
                        }
                        break;
            case IDOK:
                {

LB_GETCOUNT, NULL, NULL);
                    nLibraryCriteria = maxLibraryCriteria;

criteriaNum++) {
                    LB_GETTEXT, criteriaNum, (long) libraryCriteria[criteriaNum].criteria);

IsDlgButtonChecked(hDlg, 105);

IsDlgButtonChecked(hDlg, 106);

IsDlgButtonChecked(hDlg, 107);

IsDlgButtonChecked(hDlg, 108);

} int index;

index = SendDlgItemMessage(hDlg, 103, if (index != LB_ERR) SendDlgItemMessage(hDlg, }
                        break;

int criteriaNum;
                        RECT rect;

GetDlgItemText(hDlg, 110, criteriaName, 32);

nLibraryCriteria = SendDlgItemMessage(hDlg, 103, if (nLibraryCriteria > maxLibraryCriteria)

for (criteriaNum = 0; criteriaNum < nLibraryCriteria;
                            SendDlgItemMessage(hDlg, 103,
                        } libraryCriteriaTypes[mediaTypeVideo] = libraryCriteriaTypes[mediaTypeDiagram] = libraryCriteriaTypes[mediaTypeAudio] = libraryCriteriaTypes[mediaTypeText] = media.setMainLibrary();

GetClientRect(hLibraryListWnd, &rect);
                        InvalidateRect(hLibraryListWnd, &rect, FALSE);

EndDialog(hDlg, TRUE);
                        return(TRUE);
                        break;

case IDCANCEL:
                        EndDialog(hDlg, NULL);
                        return(FALSE);
                        break;
                    }
                    break;

case WM_INITDIALOG:
                    SetDlgItemText(hDlg, 101, "");

SetDlgItemText(hDlg, 110, criteriaName);

CheckDlgButton(hDlg, 105, libraryCriteriaTypes[mediaTypeVideo]);
                    CheckDlgButton(hDlg, 106, libraryCriteriaTypes[mediaTypeDiagram]);
                    CheckDlgButton(hDlg, 107, libraryCriteriaTypes[mediaTypeAudio]);
                    CheckDlgButton(hDlg, 108, libraryCriteriaTypes[mediaTypeText]);

SendDlgItemMessage(hDlg, 103, LB_RESETCONTENT, NULL, NULL);

{
                        int criteriaNum;

for (criteriaNum = 0; criteriaNum < nLibraryCriteria; criteriaNum++) {
                            SendDlgItemMessage(hDlg, 103, LB_ADDSTRING, NULL,
                    (long) libraryCriteria[criteriaNum].criteria);
```

```
                                }
                        }
                        SendDlgItemMessage(hDlg, 103, LB_SETCURSEL, -1, NULL);
                        SetFocus(GetDlgItem(hDlg, 110));
                        break;
                }
        return(FALSE);
}
```

APPENDIX B

Media Editors Source Code (C++)

```
/******************************************************************

Copyright AND Communications, Inc. 1991. All rights reserved

******************************************************************/ include "main.h"
include "wolves.hxx"
#include "objects.h"
extern "C" {
        #include "audio.h"
};

extern HWND hLibraryListWnd, hClipListWnd, hTriggerListWnd;
extern long mediaManagerTriggerID;
extern char mediaManagerTriggerName[64];
extern Wolves wolves;

/******************************************************************

Media Editors

Each of these managers creates and/or edits media map entries
        and their associated media files. The file extensions for the
        various media files are as follows:

Text            .tex
                Video           .vid
                Audio           .aud
                Animation       .ani
                Diagram                 .dgm
                Targa           .tga
                Bitmap          .bmp
                SubMenu                 .smu

******************************************************************/ define maxMediaEditorPushes             30 mediaMapEntryType editMediaMapEntry;
int mediaButtonTracking = FALSE;
int mediaEditorOriginalID[maxMediaEditorPushes];
int mediaEditorTempID[maxMediaEditorPushes];
int nMediaEditorPushes = 0;
int mediaEditorPushMediaType[maxMediaEditorPushes];
int mediaEditorPushMediaID[maxMediaEditorPushes];
HWND mediaEditorPushHWnd[maxMediaEditorPushes];

void openMediaEditor(int mediaID, int mediaType)
{
        HWND hWnd;
        mediaMapEntryType mediaMapEntry;
        HANDLE hdl;
        int mediaEditorPushes;

// Make sure there isn't already an editor open for this one.
        for (mediaEditorPushes = 0; mediaEditorPushes < nMediaEditorPushes; mediaEditorPushes++) {
                if (mediaEditorPushMediaID[mediaEditorPushes] == mediaID) {
```

```
                         MessageBox(GetFocus(), "This media is already being edited...", "MTP",
     MB_OK);
                         popMediaManager();
                         return;
 5              }
        }

// Push this editor onto the editor stack.
        if (nMediaEditorPushes < maxMediaEditorPushes-1) {
10              mediaEditorPushMediaType[nMediaEditorPushes] = mediaType;
                mediaEditorPushMediaID[nMediaEditorPushes] = mediaID;
                nMediaEditorPushes++;
        } else {
                MessageBox(GetFocus(), "No more editors may be open...", "MTP", MB_OK);
15              popMediaManager();
                return;
        }

// Set the wait cursor.
20      SetCursor(LoadCursor(NULL, IDC_WAIT));

// This type is not allowed.
        if (mediaType == mediaTypeNew) return;

25      // If a media ID was passed in, then make sure that requested
        // media entry exists.
        if (mediaID) {
                if (media.getEntryByID(mediaID, &mediaMapEntry) == -1) return;
        }
30
        // If a media ID was passed in, then get that media entry.
        if (mediaID) {
                mediaEditorOriginalID[nMediaEditorPushes-1] = mediaID;
                media.getEntryByID(mediaID, &mediaMapEntry);
35              mediaMapEntry.bitMapHdl = NULL;
                mediaMapEntry.bitMapSize = 0;
                media.copyEntry(&mediaMapEntry);
                media.restoreBitMapFromFile(&mediaMapEntry);

40      // Otherwise, prepare a new one.
        } else {
                mediaEditorOriginalID[nMediaEditorPushes-1] = -1;
                zeroMem((char huge *) &mediaMapEntry, sizeof(mediaMapEntryType));
                sprintf(mediaMapEntry.name, "Untitled");
45              mediaMapEntry.filename[0] = 0;
                mediaMapEntry.type = mediaType;
                mediaMapEntry.copyRightSize = 0;
                mediaMapEntry.copyRightHdl = NULL;
                mediaMapEntry.subjectSize = 0;
50              mediaMapEntry.subjectHdl = NULL;
                mediaMapEntry.dataSize = 0;
                mediaMapEntry.dataHdl = NULL;
                mediaMapEntry.bitMapSize = 0;
                mediaMapEntry.bitMapHdl = NULL;
55              SetRect(&mediaMapEntry.rect, 0,0,0,0);
                mediaMapEntry.ID = media.uniqueID();
                media.removeBitMapFromFile(&mediaMapEntry);
                media.setGenericBitMap(&mediaMapEntry);
                header.setPermission(&mediaMapEntry.permission);
60      }

// Load the media file into the media entry data handle.
        if (!mediaMapEntry.dataHdl) media.loadEntry(&mediaMapEntry);
        if (!mediaMapEntry.dataHdl) {
65              mediaMapEntry.dataSize = 0;
                mediaMapEntry.dataHdl = GlobalAlloc(GMEM_MOVEABLE, mediaMapEntry.dataSize);
        }

// Mark the media object as not open.
70      mediaMapEntry.hWnd = NULL;
```

```
        // Mark this entry as an editor one.
        mediaMapEntry.type -= 1000;

// Save the media object.
        mediaEditorTempID[nMediaEditorPushes-1] = media.uniqueID();
        mediaMapEntry.ID = mediaEditorTempID[nMediaEditorPushes-1];
        media.unloadBitMapToFile(&mediaMapEntry);
        media.addEntry(&mediaMapEntry);

// Make sure the entry was added to the media map.
        if (media.getEntryByID(mediaMapEntry.ID, &mediaMapEntry) == -1) {
                if (mediaMapEntry.bitMapHdl) GlobalFree(mediaMapEntry.bitMapHdl);
                if (mediaMapEntry.copyRightHdl) GlobalFree(mediaMapEntry.copyRightHdl);
                if (mediaMapEntry.subjectHdl) GlobalFree(mediaMapEntry.subjectHdl);
                if (mediaMapEntry.dataHdl) GlobalFree(mediaMapEntry.dataHdl);
                media.removeBitMapFromFile(&mediaMapEntry);

MessageBox(GetFocus(), "Could not open media editor...", "MTP", MB_OK);
                return;
        }

// Open the correct editor and place the window handle in hWnd.
        hWnd = NULL;
        switch (mediaMapEntry.type+1000) {
                default:
                        MessageBox(GetFocus(), "No editor available for this media type...", "MTP", MB_OK);
                        break;

case mediaTypeText:
                        hWnd = CreateWindow("textEditorWClass", NULL,
                                WS_CHILD | WS_VISIBLE | WS_CLIPSIBLINGS,
                                mediaEditorLeft, mediaEditorTop, mediaEditorWidth, mediaEditorHeight,
                                hMainWnd, mediaEditorTempID[nMediaEditorPushes-1], hInst, NULL);
                        break;

case mediaTypeVideo:
                        hWnd = CreateWindow("videoEditorWClass", NULL,
                                WS_CHILD | WS_VISIBLE | WS_CLIPSIBLINGS,
                                mediaEditorLeft, mediaEditorTop, mediaEditorWidth, mediaEditorHeight,
                                hMainWnd, mediaEditorTempID[nMediaEditorPushes-1], hInst, NULL);
                        break;

case mediaTypeAudio:
                        hWnd = CreateWindow("audioEditorWClass", NULL,
                                WS_CHILD | WS_VISIBLE | WS_CLIPSIBLINGS,
                                mediaEditorLeft, mediaEditorTop, mediaEditorWidth, mediaEditorHeight,
                                hMainWnd, mediaEditorTempID[nMediaEditorPushes-1], hInst, NULL);
                        break;

case mediaTypeDiagram:
                        hWnd = CreateWindow("diagramEditorWClass", NULL,
                                WS_CHILD | WS_VISIBLE | WS_CLIPSIBLINGS,
                                mediaEditorLeft, mediaEditorTop, mediaEditorWidth, mediaEditorHeight,
                                hMainWnd, mediaEditorTempID[nMediaEditorPushes-1], hInst, NULL);
                        break;
        }

// If an editor was opened, then place the editor buttons on it.
        if (hWnd) {
                BringWindowToTop(hWnd);
                pushMediaManager();

mediaEditorPushHWnd[nMediaEditorPushes-1] = hWnd;

BringWindowToTop(CreateWindow("mediaButtonWClass", NULL,
                        WS_CHILD | WS_VISIBLE | WS_CLIPSIBLINGS,
                        mediaEditorIconLeft, mediaEditorIconTop, mediaEditorIconWidth,
mediaEditorIconHeight,
```

```
                    hWnd, mediaEditorTempID[nMediaEditorPushes-1], hInst, NULL));

BringWindowToTop(CreateWindow("mediaButtonWClass", "Cancel",
                    WS_CHILD | WS_VISIBLE | WS_CLIPSIBLINGS,
                    mediaEditorDoneLeft,
mediaEditorDoneTop+2*(mediaEditorDoneSep+mediaEditorDoneHeight), mediaEditorDoneWidth,
mediaEditorDoneHeight,
                    hWnd, mediaEditorCancel, hInst, NULL));

BringWindowToTop(CreateWindow("mediaButtonWClass", "Cancel",
                    WS_CHILD | WS_VISIBLE | WS_CLIPSIBLINGS,
                    mediaManagerCloseBoxLeft, mediaManagerCloseBoxTop,
mediaManagerCloseBoxWidth, mediaManagerCloseBoxHeight,
                    hWnd, mediaEditorClose, hInst, NULL));

BringWindowToTop(CreateWindow("mediaButtonWClass", "Save As...",
                    WS_CHILD | WS_VISIBLE | WS_CLIPSIBLINGS,
                    mediaEditorDoneLeft,
mediaEditorDoneTop+(mediaEditorDoneSep+mediaEditorDoneHeight), mediaEditorDoneWidth,
mediaEditorDoneHeight,
                    hWnd, mediaEditorSaveAs, hInst, NULL));

BringWindowToTop(CreateWindow("mediaButtonWClass", "Save",
                    WS_CHILD | WS_VISIBLE | WS_CLIPSIBLINGS,
                    mediaEditorDoneLeft, mediaEditorDoneTop, mediaEditorDoneWidth,
mediaEditorDoneHeight,
                    hWnd, mediaEditorSave, hInst, NULL));
    }
}

// When a media editor is being closed, this function can be called to
// save the media object which is being editted. If the saveAsCopy
// is FALSE, then this function will save over the old media object
// (or save it as new if the media object is new). If the saveAsCopy
// is TRUE, then the media object will always be saved as new. A
// TRUE is returned if everything was alright and the media editor
// can close. If a FALSE is returned, then something went wrong and
// the media editor should not close (the user will be notified).

int saveMediaEditor(HWND hEditorWnd, int saveType)
{
    mediaMapEntryType mediaMapEntry;
    mediaLibraryType mediaLibrary;
    RECT rect;
    char filename[15], c;
    int charNum;

media.getEntryByID(mediaEditorTempID[nMediaEditorPushes-1], &mediaMapEntry);

// If this is a save as, then ask the user if they want to save the
    // media with the given name.
    if (saveType == saveEditorSaveAs) {
        char str[32];

sprintf(str, "Save media object as \"%s\"?", mediaMapEntry.name);

if (MessageBox(GetFocus(), str, "MTP", MB_YESNO) == IDNO) return(FALSE);
    }

// Make sure none of the media procs set the dataSize negative.
    if (mediaMapEntry.mediaChanged) {
        mediaMapEntry.mediaChanged = FALSE;
        media.setEntryByID(mediaMapEntry.ID, &mediaMapEntry);
    }

// Unmark this entry from being an editor one.
    mediaMapEntry.type += 1000;

// If cancel then only destroy memory and return.
```

```
        if (saveType == saveEditorCancel) {
                media.removeBitMapFromFile(&mediaMapEntry);
                media.removeEntryByID(mediaEditorTempID[nMediaEditorPushes-1]);
                nMediaEditorPushes--;
                return(TRUE);
        }

// Make sure that a new media object has its needed data info (such
        // as an icon, name, etc.).
        if (mediaEditorOriginalID[nMediaEditorPushes-1] == -1) {
                MessageBox(GetFocus(), "You must set the data information for this media...", "MTP", MB_OK);
                return(FALSE);
        }

// On a Save, make sure the user has permission to save over the original.
        if (saveType == saveEditorSave) {
                if (!header.havePermission(&mediaMapEntry.permission)) {
                        MessageBox(GetFocus(), "You do not have permission to save over media...", "MTP", MB_OK);
                        return(FALSE);
                }
        }

// Set the wait cursor.
        SetCursor(LoadCursor(NULL, IDC_WAIT));

// On a SaveAs, set the permission to the current user's permission.
        if (saveType == saveEditorSaveAs) header.setPermission(&mediaMapEntry.permission);

// Update the media entry with the editor data.
        media.setEntryByID(mediaEditorTempID[nMediaEditorPushes-1], &mediaMapEntry);
        if (hEditorWnd) SendMessage(hEditorWnd, WM_COMMAND, 0, NULL);
        media.getEntryByID(mediaEditorTempID[nMediaEditorPushes-1], &mediaMapEntry);

// Remove the original file on a save.
//      if(saveType == saveEditorSave) media.openRemoveEntry(mediaMapEntry.filename);

// Make a new file name from the media entry name.
        switch (mediaMapEntry.type) {
                case mediaTypeText: sprintf(filename, "%-8.8s.tex", mediaMapEntry.name); break;
                case mediaTypeVideo: sprintf(filename, "%-8.8s.vid", mediaMapEntry.name); break;
                case mediaTypeAudio: sprintf(filename, "%-8.8s.aud", mediaMapEntry.name); break;
                case mediaTypeDiagram: sprintf(filename, "%-8.8s.dgm", mediaMapEntry.name); break;
                case mediaTypeBitMap: sprintf(filename, "%-8.8s.bmp", mediaMapEntry.name); break;
                default: sprintf(filename, "%-8.8s.???", mediaMapEntry.name); break;
        }

// Replace any spaces with underscores.
        for (charNum = 0; charNum < 8; charNum++) {
                if (filename[charNum] == ' ') filename[charNum] = '_';
        }

// Determine a unique version of that name if this is for a new
        // media file.
        if (saveType == saveEditorSaveAs || mediaMapEntry.filename[0] == 0) {
                while (access(filename, 0) == 0) {
                        charNum = 7;
                        while (charNum) {
                                c = filename[charNum];
                                if (c == '9') {
                                        filename[charNum] = '0';
                                        charNum--;

} else if (c >= '0' && c <= '8') {
                                        filename[charNum]++;
                                        charNum = 0;

} else {
                                        filename[charNum] = '1';
```

```
                                charNum = 0;
                        }
                }
        }
        sprintf(mediaMapEntry.filename, "%s", filename);
}

// Save this file name in the media map entry.
media.setEntryByID(mediaMapEntry.ID, &mediaMapEntry);

// Save the data into the media file.
media.saveEntry(&mediaMapEntry);

// Initialize the media object as not executing.
if (mediaMapEntry.dataHdl) GlobalFree(mediaMapEntry.dataHdl);
mediaMapEntry.dataHdl = NULL;
mediaMapEntry.dataSize = 0;
mediaMapEntry.hWnd = NULL;
media.setEntryByID(mediaMapEntry.ID, &mediaMapEntry);

// If the media object was being edited and not being saved as a
// copy then simply put the media object back into the media map.
if (mediaEditorOriginalID[nMediaEditorPushes-1] > 0 && saveType == saveEditorSave) {
        media.removeEntryByID(mediaEditorOriginalID[nMediaEditorPushes-1]);
        media.restoreBitMapFromFile(&mediaMapEntry);
        media.removeBitMapFromFile(&mediaMapEntry);
        mediaMapEntry.ID = mediaEditorOriginalID[nMediaEditorPushes-1];
        media.unloadBitMapToFile(&mediaMapEntry);
        media.setEntryByID(mediaEditorTempID[nMediaEditorPushes-1], &mediaMapEntry);
        mediaEditorTempID[nMediaEditorPushes-1] = mediaMapEntry.ID;

// Otherwise, add the media object as new to the media map.
} else {
        media.setEntryByID(mediaEditorTempID[nMediaEditorPushes-1], &mediaMapEntry);
}

// Remove the entry and re-add in order to insert it
// alphabetically by name.
media.copyEntry(&mediaMapEntry);
media.removeEntryByID(mediaEditorTempID[nMediaEditorPushes-1]);
media.addEntry(&mediaMapEntry);

// Set the main library to be scrolled to this new entry.
media.getMainLibrary(&mediaLibrary);
mediaLibrary.mediaList.startListItem =
   media.getEntryByID(mediaEditorTempID[nMediaEditorPushes-1], &mediaMapEntry);
media.setLibraryByID(mediaLibrary.ID, &mediaLibrary);

// Mark the document as changed.
documentChanged = TRUE;

nMediaEditorPushes--;
return(TRUE);
} extern "C" long FAR PASCAL _export MediaButtonWndProc(HWND hWnd, unsigned message, WORD
wParam, LONG lParam)
{
        HDC hDC;
        int button;
        HWND hParentWnd;
        RECT rect;

button = GetWindowWord(hWnd, GWW_ID);
        hParentWnd = GetParent(hWnd);
        GetClientRect(hWnd, &rect);

switch (message) {
                case WM_CREATE:
```

```
                    break;

case WM_LBUTTONDOWN:
                    mediaButtonTracking = TRUE;
                    if (button != mediaEditorClose && button != mediaManagerClose) {
                            hDC = GetDC(hWnd);
                            InvertRect(hDC, &rect);
                            ReleaseDC(hWnd, hDC);
                    }
                    SetCapture(hWnd);
                    break;

case WM_LBUTTONDBLCLK:
                    switch (button) {
                            case mediaEditorClose: if (saveMediaEditor(hParentWnd,
saveEditorCancel)) {DestroyWindow(hParentWnd); popMediaManager();} break;
                            case mediaManagerClose: DestroyWindow(GetParent(hWnd)); break;
                            case mediaManagerInfo:
                            {
                                    mediaLibraryType mediaLibrary;

// Copy the library to the trigger and tell the
                                    // trigger to get info.
                                    mediaManagerCallBackRtn(mediaManagerTriggerID,
    mmCallBackLibraryToTrigger, GetWindowWord(GetParent(hWnd), GWW_ID), NULL);
                                    mediaManagerCallBackRtn(mediaManagerTriggerID,
    mmCallBackInfoTrigger, GetWindowWord(GetParent(hWnd), GWW_ID), NULL);
                                    mediaManagerCallBackRtn(mediaManagerTriggerID,
    mmCallBackGetTriggerName, GetWindowWord(GetParent(hWnd), GWW_ID), (LPSTR)
    mediaManagerTriggerName);

// Reset the trigger library incase the trigger
                                    // has changed.
                                    if
    (media.getLibraryByID(GetWindowWord(GetParent(hWnd), GWW_ID), &mediaLibrary) != -1) {
                                            media.clearLibrary(&mediaLibrary);

media.setLibraryByID(GetWindowWord(GetParent(hWnd), GWW_ID), &mediaLibrary);

mediaManagerCallBackRtn(mediaManagerTriggerID, mmCallBackTriggerToLibrary,
    GetWindowWord(GetParent(hWnd), GWW_ID), (LPSTR) mediaManagerTriggerName);
                                    }

// Redraw the media manager.
                                    GetClientRect(GetParent(hWnd), &rect);
                                    InvalidateRect(GetParent(hWnd), &rect, FALSE);
                                    UpdateWindow(GetParent(hWnd));
                            }
                            break;

default:
                                    if (button > 0) {
                                            mediaMapEntryType mediaMapEntry;

// Mark the entry as having data base info.
                                            if (mediaEditorOriginalID[nMediaEditorPushes-1] == -
1) mediaEditorOriginalID[nMediaEditorPushes-1] = 0;

// Get the media entry.
                                            media.getEntryByID(button, &mediaMapEntry);

// Display a dialog to get info from user.
                                            {
                                                    FARPROC lpDialog;

editMediaMapEntry = mediaMapEntry;

lpDialog = MakeProcInstance((FARPROC)
    MediaInfoDialog, hInst);
```

```
                        hMainWnd, lpDialog);                                    DialogBox(hInst, "mediaInfoDialog",
                                                                                FreeProcInstance(lpDialog);

mediaMapEntry = editMediaMapEntry;
                                                                        }

// Set the wait cursor.
                                                                        SetCursor(LoadCursor(NULL, IDC_WAIT));

// Set the entry's bitmap and put the
                                                                        // entry back in the media map.
                                                                        media.setGenericBitMap(&mediaMapEntry);
                                                                        media.unloadBitMapToFile(&mediaMapEntry);
                                                                        media.setEntryByID(button, &mediaMapEntry);

InvalidateRect(hWnd, &rect, FALSE);
                                                                }
                                                                break;
                                        }
                                        break;

case WM_LBUTTONUP:
                                        if (mediaButtonTracking) {
                                                if (button != mediaEditorClose && button != mediaManagerClose) {
                                                        hDC = GetDC(hWnd);
                                                        InvertRect(hDC, &rect);
                                                        ReleaseDC(hWnd, hDC);
                                                } mediaButtonTracking = FALSE;
                                                ReleaseCapture();

switch (button) {
                                                        case mediaEditorCancel: if (saveMediaEditor(hParentWnd,
saveEditorCancel)) {DestroyWindow(hParentWnd); popMediaManager();} break;
                                                        case mediaEditorSaveAs: if (saveMediaEditor(hParentWnd,
saveEditorSaveAs)) {DestroyWindow(hParentWnd); popMediaManager();} break;
                                                        case mediaEditorSave: if (saveMediaEditor(hParentWnd,
saveEditorSave)) {DestroyWindow(hParentWnd); popMediaManager();} break;
                                                        case mediaManagerWorld:
                                                                if (LOWORD(lParam) <=
rect.left+mediaManagerWorldWidth/2 && HIWORD(lParam) <= rect.top+mediaManagerWorldHeight/2) {
                                                                        openMediaEditor(0, mediaTypeVideo);
                                                                } else if (LOWORD(lParam) >
rect.left+mediaManagerWorldWidth/2 && HIWORD(lParam) <= rect.top+mediaManagerWorldHeight/2) {
                                                                        openMediaEditor(0, mediaTypeText);
                                                                } else if (LOWORD(lParam) <=
rect.left+mediaManagerWorldWidth/2 && HIWORD(lParam) > rect.top+mediaManagerWorldHeight/2) {
                                                                        openMediaEditor(0, mediaTypeDiagram);
                                                                } else if (LOWORD(lParam) >
rect.left+mediaManagerWorldWidth/2 && HIWORD(lParam) > rect.top+mediaManagerWorldHeight/2) {
                                                                        openMediaEditor(0, mediaTypeAudio);
                                                                }
                                                                break;

case mediaManagerScanDisk:
                                                        {
                                                                int entryNum;
                                                                mediaMapEntryType mediaMapEntry;

// Scan the disk and reset the main library.
                                                                media.scanDiskForEntries();
                                                                media.setMainLibrary();

// Destroy all the bitmaps in memory.
                                                                for (entryNum = 0; entryNum <
media.nMediaEntries; entryNum++) {
                                                                        if (media.getEntry(entryNum,
&mediaMapEntry) != -1) {
```

```
        (mediaMapEntry.bitMapHdl) {
                GlobalFree(mediaMapEntry.bitMapHdl);
                mediaMapEntry.bitMapHdl = NULL;
                mediaMapEntry.bitMapSize = 0;
                media.setEntryByID(mediaMapEntry.ID, &mediaMapEntry);
                        }
                    }
                }
                                                        // Redraw the library list.
                                                        GetClientRect(hLibraryListWnd, &rect);
                                                        InvalidateRect(hLibraryListWnd, &rect, FALSE);
                                                        GetClientRect(hClipListWnd, &rect);
                                                        InvalidateRect(hClipListWnd, &rect, FALSE);
                                                        GetClientRect(hTriggerListWnd, &rect);
                                                        InvalidateRect(hTriggerListWnd, &rect, FALSE);
                                                }
                                                break;

case mediaManagerSearch:
                                                {
                                                        FARPROC lpDialog;

lpDialog = MakeProcInstance((FARPROC)CriteriaDialog, hInst);
                                                        DialogBox(hInst, "criteriaDialog", hMainWnd, lpDialog);
                                                        FreeProcInstance(lpDialog);
                                                }
                                                break;

case mediaManagerDelete:
                                                // Tell the trigger to delete itself.
                                                if (mediaManagerCallBackRtn(mediaManagerTriggerID, mmCallBackDeleteTrigger,
                                                        GetWindowWord(GetParent(hWnd), GWW_ID), NULL)) {
                                                        // Then close the media manager since there is no
                                                        // trigger for it anymore.
                                                        DestroyWindow(GetParent(hWnd));
                                                }
                                                break;

case audioEditorLoad:
                                        case textEditorLoad:
                                        case diagramEditorLoad: SendMessage(GetParent(hWnd), WM_COMMAND, 1, NULL); break;
                                        }
                                }
                                break;
                        case WM_PAINT:
                                {
                                        PAINTSTRUCT ps;

hDC = BeginPaint(hWnd, &ps);

switch (button) {
                                                case mediaManagerInfo:
                                                        {
                                                                HFONT hFont, hSaveFont;
```

```
                                                    LOGFONT logFont;
                                                    DWORD saveTextColor;

hFont =
 5      GetStockObject(ANSI_VAR_FONT);
                                                    GetObject(hFont, sizeof(LOGFONT),
        (LPSTR) &logFont);
                                                    DeleteObject(hFont);
                                                    logFont.lfHeight = 15;
10                                                  logFont.lfWidth = 0;
                                                    sprintf((char *) logFont.lfFaceName, "Tms
        Rmn");
                                                    hFont = CreateFontIndirect(&logFont);

15                                                  hSaveFont = SelectObject(hDC, hFont);
                                                    InflateRect(&rect, -3,-3);
                                                    saveTextColor = SetTextColor(hDC,
        RGB(0,255,255));
                                                    work.drawText(hDC, (char huge *)
20      mediaManagerTriggerName, &rect, NULL, 16, 0, NULL, 0,0);
                                                    SetTextColor(hDC, saveTextColor);
                                                    InflateRect(&rect, 3,3);
                                                    SelectObject(hDC, hSaveFont);

25                                                  DeleteObject(hFont);
                                                 }
                                                 break;

default:
30                                               if (button > 0) {
                                                    mediaMapEntryType mediaMapEntry;

media.getEntryByID(button,
        &mediaMapEntry);
35
                                                    if (!mediaMapEntry.bitMapHdl)
        media.restoreBitMapFromFile(&mediaMapEntry);

if (mediaMapEntry.bitMapHdl) {
                                                       char huge *ptr;
40                                                     int width, height;

// Draw the icon.
                                                       if (ptr = (char huge *)
        GlobalWire(mediaMapEntry.bitMapHdl)) {
45                                                        bitMapDim(ptr, &width,
        &height);
                                                          bitMapBlt(hDC, ptr,
        TRUE, SRCCOPY, rect.left, rect.top, rect.right-rect.left, rect.bottom-rect.top, 0, 0, width, height);

50              GlobalUnWire(mediaMapEntry.bitMapHdl);
                                                       }
                                                    }
                                                 }
                                                 break;
55                              }
                                EndPaint(hWnd, &ps);
                             }
                             break;
60                       default:
                             return(DefWindowProc(hWnd, message, wParam, lParam));
                             break;
                      }
65       return(NULL);
        }
```

```
HWND hVideoEditorScreenWnd = NULL, hVideoEditorStartTextWnd, hVideoEditorEndTextWnd,
hVideoEditorVideoWnd, hVideoEditorDirectionWnd, hVideoEditorSpeedWnd, hVideoEditorAudioWnd,
hVideoEditorSourceWnd;

extern "C" long FAR PASCAL _export VideoEditorWndProc(HWND hWnd, unsigned message, WORD
wParam, LONG lParam)
{
        HDC hDC;
        RECT rect;
        char huge *ptr;
        char str[32];
        int mediaID;
        mediaMapEntryType mediaMapEntry;
        videoAudioType videoAudio;
        HANDLE reAllocHdl;
    if(message == WM_DESTROY) hVideoEditorScreenWnd = NULL;
        mediaID = GetWindowWord(hWnd, GWW_ID);
        if (media.getEntryByID(mediaID, &mediaMapEntry) == -1) return(DefWindowProc(hWnd,
message, wParam, lParam));
        if (!mediaMapEntry.dataHdl) return(DefWindowProc(hWnd, message, wParam, lParam));

if (mediaMapEntry.dataSize != 0) {
                ptr = (char huge *) GlobalLock(mediaMapEntry.dataHdl);
                memCpy((char huge *) &videoAudio, ptr, sizeof(videoAudioType));
                GlobalUnlock(mediaMapEntry.dataHdl);
        } else {
                zeroMem((char huge *) &videoAudio, sizeof(videoAudioType));
                videoAudio.type = videoAudioTypeVideo;
                videoAudio.startFrame = 1;
                videoAudio.endFrame = 1;
                videoAudio.direction = videoAudioDirectionForward;
                videoAudio.speed = videoAudioSpeedNormal;
                videoAudio.audio = videoAudioAudioStereo;
                videoAudio.source = videoAudioSourceLaserDisk;

if (reAllocHdl = GlobalReAlloc(mediaMapEntry.dataHdl, sizeof(videoAudioType),
NULL)) {
                        mediaMapEntry.dataHdl = reAllocHdl;
                        mediaMapEntry.dataSize = sizeof(videoAudioType);
                        media.setEntryByID(mediaID, &mediaMapEntry);

ptr = (char huge *) GlobalLock(mediaMapEntry.dataHdl);
                        memCpy(ptr, (char huge *) &videoAudio, sizeof(videoAudioType));
                        GlobalUnlock(mediaMapEntry.dataHdl);
                }
        }

GetClientRect(hWnd, &rect);

switch (message) {
                case WM_CREATE:
                        hVideoEditorScreenWnd = CreateWindow("videoWClass", NULL,
                            WS_CHILD | WS_VISIBLE,
                            videoEditorScreenLeft, videoEditorScreenTop, videoEditorScreenWidth,
videoEditorScreenHeight,
                            hWnd, 0, hInst, NULL);

CreateWindow("videoControlWClass", NULL,
                            WS_CHILD | WS_VISIBLE,
                            videoEditorReverseLeft, videoEditorControlTop, videoEditorReverseWidth,
videoEditorControlHeight,
                            hWnd, 1, hInst, NULL);

CreateWindow("videoControlWClass", NULL,
                            WS_CHILD | WS_VISIBLE,
                            videoEditorReverseFrameLeft, videoEditorControlTop,
videoEditorReverseFrameWidth, videoEditorControlHeight,
                            hWnd, 2, hInst, NULL);

CreateWindow("videoControlWClass", NULL,
```

```
                    WS_CHILD | WS_VISIBLE,
                    videoEditorPauseLeft, videoEditorControlTop, videoEditorPauseWidth,
    videoEditorControlHeight,
                    hWnd, 3, hInst, NULL);

CreateWindow("videoControlWClass", NULL,
                    WS_CHILD | WS_VISIBLE,
                    videoEditorForwardFrameLeft, videoEditorControlTop,
    videoEditorForwardFrameWidth, videoEditorControlHeight,
                    hWnd, 4, hInst, NULL);

CreateWindow("videoControlWClass", NULL,
                    WS_CHILD | WS_VISIBLE,
                    videoEditorForwardLeft, videoEditorControlTop, videoEditorForwardWidth,
    videoEditorControlHeight,
                    hWnd, 5, hInst, NULL);

CreateWindow("videoControlWClass", NULL,
                    WS_CHILD | WS_VISIBLE,
                    videoEditorStartLeft, videoEditorFrameTop, videoEditorStartWidth,
    videoEditorFrameHeight,
                    hWnd, 6, hInst, NULL);

CreateWindow("videoControlWClass", NULL,
                    WS_CHILD | WS_VISIBLE,
                    videoEditorEndLeft, videoEditorFrameTop, videoEditorEndWidth,
    videoEditorFrameHeight,
                    hWnd, 7, hInst, NULL);

CreateWindow("videoControlWClass", NULL,
                    WS_CHILD | WS_VISIBLE,
                    videoEditorPlayLeft, videoEditorPlayTop, videoEditorPlayWidth,
    videoEditorPlayHeight,
                    hWnd, 8, hInst, NULL);

hVideoEditorStartTextWnd = CreateWindow("edit", NULL,
                    WS_CHILD | WS_VISIBLE | ES_AUTOHSCROLL,
                    videoEditorStartTextLeft, videoEditorFrameTextTop,
    videoEditorStartTextWidth, videoEditorFrameTextHeight,
                    hWnd, NULL, hInst, NULL);

hVideoEditorEndTextWnd = CreateWindow("edit", NULL,
                    WS_CHILD | WS_VISIBLE | ES_AUTOHSCROLL,
                    videoEditorEndTextLeft, videoEditorFrameTextTop, videoEditorEndTextWidth,
    videoEditorFrameTextHeight,
                    hWnd, NULL, hInst, NULL);

hVideoEditorVideoWnd = CreateWindow("combobox", NULL,
                    WS_CHILD | WS_VISIBLE | CBS_DROPDOWNLIST |
    CBS_HASSTRINGS,
                    videoEditorOptionsLeft, videoEditorVideoTop, videoEditorOptionsWidth,
    videoEditorOptionsHeight+2*videoEditorOptionsSingle,
                    hWnd, NULL, hInst, NULL);

hVideoEditorDirectionWnd = CreateWindow("combobox", NULL,
                    WS_CHILD | WS_VISIBLE | CBS_DROPDOWNLIST |
    CBS_HASSTRINGS,
                    videoEditorOptionsLeft, videoEditorDirectionTop, videoEditorOptionsWidth,
    videoEditorOptionsHeight+2*videoEditorOptionsSingle,
                    hWnd, NULL, hInst, NULL);

hVideoEditorSpeedWnd = CreateWindow("combobox", NULL,
                    WS_CHILD | WS_VISIBLE | CBS_DROPDOWNLIST |
    CBS_HASSTRINGS,
                    videoEditorOptionsLeft, videoEditorSpeedTop, videoEditorOptionsWidth,
    videoEditorOptionsHeight+7*videoEditorOptionsSingle,
                    hWnd, NULL, hInst, NULL);

hVideoEditorAudioWnd = CreateWindow("combobox", NULL,
```

```
                        WS_CHILD | WS_VISIBLE | CBS_DROPDOWNLIST |
CBS_HASSTRINGS,
                        videoEditorOptionsLeft, videoEditorAudioTop, videoEditorOptionsWidth,
        videoEditorOptionsHeight+7*videoEditorOptionsSingle,
                        hWnd, NULL, hInst, NULL);

hVideoEditorSourceWnd = CreateWindow("combobox", NULL,
                                WS_CHILD | WS_VISIBLE | CBS_DROPDOWNLIST |
CBS_HASSTRINGS,
                        videoEditorOptionsLeft, videoEditorSourceTop, videoEditorOptionsWidth,
        videoEditorOptionsHeight+5*videoEditorOptionsSingle,
                        hWnd, NULL, hInst, NULL);

PDisplayControl(1);
                        PPause();
                        if (videoAudio.startFrame != videoAudio.endFrame)
        PSeek(videoAudio.startFrame);
                        PostMessage(hWnd, WM_COMMAND, 1999, NULL);
                        break;

case WM_PAINT:
                        {
                        PAINTSTRUCT ps;
                        HANDLE hLibrary;

//                      if (!hVideoEditorBitMap) {
//                              chdir(homePath);
                                hLibrary = LoadLibrary("video.dll");
                                hVideoEditorBitMap = LoadBitmap(hLibrary, "videoeditor");
                                FreeLibrary(hLibrary);
//                              chdir(currentDocumentPath);
//                      } hDC = BeginPaint(hWnd, &ps);
                        hBitMapBlt(hDC, hVideoEditorBitMap, FALSE, SRCCOPY, rect.left,
        rect.top, rect.right-rect.left, rect.bottom-rect.top, 0, 0, 0, 0);
                        DeleteObject(hVideoEditorBitMap);
                        EndPaint(hWnd, &ps);
                        }
                        break;

case WM_COMMAND:
                        if (wParam == 1999) {
                                sprintf(str, "%ld", videoAudio.startFrame);
                                SetWindowText(hVideoEditorStartTextWnd, str);
                                SetFocus(hVideoEditorStartTextWnd);
                                sprintf(str, "%ld", videoAudio.endFrame);
                                SetWindowText(hVideoEditorEndTextWnd, str);
                                SendMessage(hVideoEditorVideoWnd, CB_ADDSTRING, NULL,
        (long) "On");
                                SendMessage(hVideoEditorVideoWnd, CB_ADDSTRING, NULL,
        (long) "Off");
                                SendMessage(hVideoEditorVideoWnd, CB_SETCURSEL,
        videoAudio.type, NULL);
                                SendMessage(hVideoEditorDirectionWnd, CB_ADDSTRING, NULL,
        (long) "Forward");
                                SendMessage(hVideoEditorDirectionWnd, CB_ADDSTRING, NULL,
        (long) "Reverse");
                                SendMessage(hVideoEditorDirectionWnd, CB_SETCURSEL,
        videoAudio.direction, NULL);
                                SendMessage(hVideoEditorSpeedWnd, CB_ADDSTRING, NULL,
        (long) "Normal");
                                SendMessage(hVideoEditorSpeedWnd, CB_ADDSTRING, NULL,
        (long) "Fast");
                                SendMessage(hVideoEditorSpeedWnd, CB_ADDSTRING, NULL,
        (long) "Faster");
                                SendMessage(hVideoEditorSpeedWnd, CB_ADDSTRING, NULL,
        (long) "Fastest");
                                SendMessage(hVideoEditorSpeedWnd, CB_ADDSTRING, NULL,
        (long) "Slow");
```

```
            (long) "Slower");                SendMessage(hVideoEditorSpeedWnd, CB_ADDSTRING, NULL,
                                             SendMessage(hVideoEditorSpeedWnd, CB_ADDSTRING, NULL,
            (long) "Slowest");
                                             SendMessage(hVideoEditorSpeedWnd, CB_SETCURSEL,
            videoAudio.speed, NULL);
                                             SendMessage(hVideoEditorAudioWnd, CB_ADDSTRING, NULL,
            (long) "Stereo");
                                             SendMessage(hVideoEditorAudioWnd, CB_ADDSTRING, NULL,
            (long) "Mono");
                                             SendMessage(hVideoEditorAudioWnd, CB_ADDSTRING, NULL,
            (long) "Only Left");
                                             SendMessage(hVideoEditorAudioWnd, CB_ADDSTRING, NULL,
            (long) "Both Left");
                                             SendMessage(hVideoEditorAudioWnd, CB_ADDSTRING, NULL,
            (long) "Only Right");
                                             SendMessage(hVideoEditorAudioWnd, CB_ADDSTRING, NULL,
            (long) "Both Right");
                                             SendMessage(hVideoEditorAudioWnd, CB_ADDSTRING, NULL,
            (long) "None");
                                             SendMessage(hVideoEditorAudioWnd, CB_SETCURSEL,
            videoAudio.audio, NULL);
                                             SendMessage(hVideoEditorSourceWnd, CB_ADDSTRING, NULL,
            (long) "Full Screen");
                                             SendMessage(hVideoEditorSourceWnd, CB_ADDSTRING, NULL,
            (long) "Upper Left");
                                             SendMessage(hVideoEditorSourceWnd, CB_ADDSTRING, NULL,
            (long) "Upper Right");
                                             SendMessage(hVideoEditorSourceWnd, CB_ADDSTRING, NULL,
            (long) "Lower Right");
                                             SendMessage(hVideoEditorSourceWnd, CB_ADDSTRING, NULL,
            (long) "Lower Left");
                                             SendMessage(hVideoEditorSourceWnd, CB_SETCURSEL,
            videoAudio.source, NULL);

} else if (wParam == 0) {
                GetWindowText(hVideoEditorStartTextWnd, str, 32);
                sscanf(str, "%ld", &videoAudio.startFrame);
                GetWindowText(hVideoEditorEndTextWnd, str, 32);
                sscanf(str, "%ld", &videoAudio.endFrame);
                videoAudio.type = SendMessage(hVideoEditorVideoWnd,
        CB_GETCURSEL, NULL, NULL);
                videoAudio.direction = SendMessage(hVideoEditorDirectionWnd,
        CB_GETCURSEL, NULL, NULL);
                videoAudio.speed = SendMessage(hVideoEditorSpeedWnd,
        CB_GETCURSEL, NULL, NULL);
                videoAudio.audio = SendMessage(hVideoEditorAudioWnd,
        CB_GETCURSEL, NULL, NULL);
                videoAudio.source = SendMessage(hVideoEditorSourceWnd,
        CB_GETCURSEL, NULL, NULL);

if (reAllocHdl = GlobalReAlloc(mediaMapEntry.dataHdl,
        sizeof(videoAudioType), NULL)) {
                        mediaMapEntry.dataHdl = reAllocHdl;
                        mediaMapEntry.dataSize = sizeof(videoAudioType);
                        media.setEntryByID(mediaID, &mediaMapEntry);

ptr = (char huge *) GlobalLock(mediaMapEntry.dataHdl);
                        memCpy(ptr, (char huge *) &videoAudio,
        sizeof(videoAudioType));
                        GlobalUnlock(mediaMapEntry.dataHdl);
                }
        }
        break;

case WM_DESTROY:
        hVideoEditorScreenWnd = NULL;
        PDisplayControl(0);
        break;
```

```
                    default:
                            return(DefWindowProc(hWnd, message, wParam, lParam));
                            break;
            }
            return(NULL);
    } char audioFileName[128] = {0};

extern "C" long FAR PASCAL _export VideoControlWndProc(HWND hWnd, unsigned message, WORD
    wParam, LONG lParam)
    {
            HDC hDC;
            int button;
            RECT rect;

button = GetWindowWord(hWnd, GWW_ID);

GetClientRect(hWnd, &rect);

switch (message) {
                    case WM_LBUTTONDOWN:
                    case WM_RBUTTONDOWN:
                            hDC = GetDC(hWnd);
                            InvertRect(hDC, &rect);
                            ReleaseDC(hWnd, hDC);
                            SetCapture(hWnd);
                            SetTimer(hWnd, 2, 300, NULL);
                            break;

case WM_TIMER:
                            KillTimer(hWnd, 2);
                            switch (button) {
                                    case 1: SetTimer(hWnd, 2, 100, NULL); PScanReverse(); break;
                                    case 2: PMSR(20); break;
                                    case 4: PMSF(20); break;
                                    case 5: SetTimer(hWnd, 2, 100, NULL); PScanForward(); break;
                                    case 11: SetTimer(hWnd, 2, 100, NULL); /*MARK: scan backward*/;
    break;
                                    case 12: AStepBackward();       /*MARK: slow backward*/; break;
                                    case 14: AResume();             /*MARK: slow forward*/;
    break;
                                    case 15: SetTimer(hWnd, 2, 100, NULL); /*MARK: scan forward*/;
    break;
                            }
                            break;

case WM_LBUTTONUP:
                            if (hVideoEditorScreenWnd) {
                                    PDisplayControl(1);
                                    wolves.setSrcSize(0,0,640,480);
                                    wolves.grab(hVideoEditorScreenWnd);
                                    SetWindowWord(hVideoEditorScreenWnd, GWW_ID, NULL);
                            }
                            KillTimer(hWnd, 2);
                            hDC = GetDC(hWnd);
                            InvertRect(hDC, &rect);
                            ReleaseDC(hWnd, hDC);
                            ReleaseCapture();
                            switch (button) {
                                    case 1: PMSR(60); break;
                                    case 2: PStepReverse(); break;
                                    case 3: PPause(); break;
                                    case 4: PStepForward(); break;
                                    case 5: PPlay_mode(); break;

case 6:
                                            {
```

```
                        long frameNum;
                        char str[32];

frameNum = PCurFrame();
                        sprintf(str, "%ld", frameNum);
                        SetWindowText(hVideoEditorStartTextWnd, str);
                    }
                    break;
            case 7:
                    {
                        long frameNum;
                        char str[32];

frameNum = PCurFrame();
                        sprintf(str, "%ld", frameNum);

SetWindowText(hVideoEditorEndTextWnd, str);
                    }
                    break;

case 8:
                    if (hVideoEditorScreenWnd) {
                        SetWindowWord(hVideoEditorScreenWnd, GWW_ID,
            GetWindowWord(GetParent(hWnd), GWW_ID) | 0x8000);
                        SendMessage(GetParent(hWnd), WM_COMMAND,
            0, NULL);
                        SendMessage(hVideoEditorScreenWnd,
            WM_CREATE, NULL, NULL);
                        InvalidateRect(hVideoEditorScreenWnd, NULL,
            FALSE);
                    }
                    break;

case 11: ARewind();              /*MARK: fast reverse*/; break;
            case 12: AStepBackward();        /*MARK: step reverse*/; break;
            case 13: APause();               /*MARK: pause*/; break;
            case 14: AStepForward();  /*MARK: step forward*/; break;
            case 15: AResume();              /*MARK: play*/; break;

/*case 100: recordWaveFile(); break;
            case 102:
                    openWaveFile(audioFileName);
                    playWaveFile();
                    closeWaveFile();
                    break;

case 101:
                    stopWaveFile();
                    saveWaveFile(audioFileName);
                    break;*/
            }
            break;
    case WM_RBUTTONUP:
            KillTimer(hWnd, 2);
            hDC = GetDC(hWnd);
            InvertRect(hDC, &rect);
            ReleaseDC(hWnd, hDC);
            ReleaseCapture();
            switch (button) {
                    case 6:
                    {
                        long frameNum;
                        char str[32];

GetWindowText(hVideoEditorStartTextWnd, str, 32);
                        sscanf(str, "%ld", &frameNum);
```

```
                                        PPause();
                                        PSeek(frameNum);
                                }
                                break;
                        case 7:
                        {
                                long frameNum;
                                char str[32];

GetWindowText(hVideoEditorEndTextWnd, str, 32);
                                sscanf(str, "%ld", &frameNum);

PPause();
                                PSeek(frameNum);
                        }
                        break;
                }
                break;
        case WM_PAINT:
        {
                PAINTSTRUCT ps;

hDC = BeginPaint(hWnd, &ps);
                EndPaint(hWnd, &ps);
        }
        break;
        default:
                return(DefWindowProc(hWnd, message, wParam, lParam));
                break;
        }
        return(NULL);
} extern "C" long FAR PASCAL _export AudioEditorWndProc(HWND hWnd, unsigned message, WORD
wParam, LONG lParam)
{
        HDC hDC;
        RECT rect;
        char huge *ptr;
        char str[32];
        int mediaID;
        mediaMapEntryType mediaMapEntry;
        videoAudioType videoAudio;
        HANDLE reAllocHdl;

mediaID = GetWindowWord(hWnd, GWW_ID);
        if (media.getEntryByID(mediaID, &mediaMapEntry) == -1) return(DefWindowProc(hWnd,
message, wParam, lParam));
        if (!mediaMapEntry.dataHdl) return(DefWindowProc(hWnd, message, wParam, lParam));

if (mediaMapEntry.dataSize != 0) {
                ptr = (char huge *) GlobalLock(mediaMapEntry.dataHdl);
                memCpy((char huge *) &videoAudio, ptr, sizeof(videoAudioType));
                GlobalUnlock(mediaMapEntry.dataHdl);
                strcpy(audioFileName, videoAudio.audioFilename);
        } else {
                zeroMem((char huge *) &videoAudio, sizeof(videoAudioType));
                videoAudio.type = videoAudioTypeAudio;
                videoAudio.audio = videoAudioAudioStereo;
                videoAudio.audioLocation = sizeof(videoAudioType);
                videoAudio.audioSize = 0;
                videoAudio.rate = 22050;
                videoAudio.source = videoAudioSourceLineStereo;
                videoAudio.audioFilename[0] = 0;
```

```
                    if (reAllocHdl = GlobalReAlloc(mediaMapEntry.dataHdl, sizeof(videoAudioType),
       NULL)) {
                            mediaMapEntry.dataHdl = reAllocHdl;
                            mediaMapEntry.dataSize = sizeof(videoAudioType);
                            media.setEntryByID(mediaID, &mediaMapEntry);

ptr = (char huge *) GlobalLock(mediaMapEntry.dataHdl);
                            memCpy(ptr, (char huge *) &videoAudio, sizeof(videoAudioType));
                            GlobalUnlock(mediaMapEntry.dataHdl);
                    }
            }

GetClientRect(hWnd, &rect);

switch (message) {
                    case WM_CREATE:
                            BringWindowToTop(CreateWindow("mediaButtonWClass", "Load...",
                                    WS_CHILD | WS_VISIBLE | WS_CLIPSIBLINGS,
                                    audioEditorLoadLeft, audioEditorLoadTop, audioEditorLoadWidth,
       audioEditorLoadHeight,
                                    hWnd, audioEditorLoad, hInst, NULL));

/*
                            CreateWindow("videoControlWClass", NULL,
                                    WS_CHILD | WS_VISIBLE,
                                    videoEditorStartLeft, videoEditorFrameTop, videoEditorStartWidth,
       videoEditorFrameHeight,
                                    hWnd, 100, hInst, NULL);

CreateWindow("videoControlWClass", NULL,
                                    WS_CHILD | WS_VISIBLE,
                                    videoEditorEndLeft, videoEditorFrameTop, videoEditorEndWidth,
       videoEditorFrameHeight,
                                    hWnd, 101, hInst, NULL);

CreateWindow("videoControlWClass", NULL,
                                    WS_CHILD | WS_VISIBLE,
                                    videoEditorPlayLeft, videoEditorPlayTop, videoEditorPlayWidth,
       videoEditorPlayHeight,
                                    hWnd, 102, hInst, NULL);
       */ strcpy(audioFileName, videoAudio.audioFilename);
                            break;
                    case WM_COMMAND:
                            if (wParam == 0) {
                                    HANDLE audioHdl;
                                    char huge *ptr;
                                    char huge *audioPtr;
                                    long audioSize;

videoAudio.type = videoAudioTypeAudio;
                                    videoAudio.audio = videoAudioAudioStereo;
                                    videoAudio.audioLocation = sizeof(videoAudioType);
                                    videoAudio.audioSize = 0;
                                    videoAudio.rate = 22050;
                                    videoAudio.source = videoAudioSourceLineStereo;

if (audioFileName[0]) {
                                            SetCursor(LoadCursor(NULL, IDC_WAIT));
                                            audioHdl = loadFile(audioFileName, &audioSize);

if (reAllocHdl = GlobalReAlloc(mediaMapEntry.dataHdl,
       sizeof(videoAudioType)+audioSize, GMEM_ZEROINIT)) {
                                                    videoAudio.audioSize = audioSize;
                                                    mediaMapEntry.dataHdl = reAllocHdl;
                                                    mediaMapEntry.dataSize =
       sizeof(videoAudioType)+videoAudio.audioSize;
                                                    media.setEntryByID(mediaID, &mediaMapEntry);
```

```
                GlobalLock(mediaMapEntry.dataHdl);
                                                        ptr = (char huge *)
                                                        audioPtr = (char huge *) GlobalLock(audioHdl);
                                                        memCpy(ptr, (char huge *) &videoAudio,
        sizeof(videoAudioType));
                                                        memCpy(ptr+sizeof(videoAudioType), audioPtr,
        videoAudio.audioSize);
                                                        GlobalUnlock(audioHdl);
                                                        GlobalUnlock(mediaMapEntry.dataHdl);
                                                }
                                                GlobalFree(audioHdl);
                                        }
                                } else if (wParam == 1) {
                                        getOpenFileName("._au", videoAudio.audioFilename);
                                        chdir(currentDocumentPath);
                                        strcpy(audioFileName, videoAudio.audioFilename);
                                        ptr = (char huge *) GlobalLock(mediaMapEntry.dataHdl);
                                        memCpy(ptr, (char huge *) &videoAudio, sizeof(videoAudioType));
                                        GlobalUnlock(mediaMapEntry.dataHdl);
                                }
                                break;
                        case WM_PAINT:
                                {
                                        PAINTSTRUCT ps;
                                        HANDLE hLibrary;
        //                              if (!hAudioEditorBitMap) {
        //                                      chdir(homePath);
                                                hLibrary = LoadLibrary("audio.dll");
                                                hAudioEditorBitMap = LoadBitmap(hLibrary, "audioeditor");
                                                FreeLibrary(hLibrary);
        //                                      chdir(currentDocumentPath);
        //                              }
                                        hDC = BeginPaint(hWnd, &ps);
                                        hBitMapBlt(hDC, hAudioEditorBitMap, FALSE, SRCCOPY, rect.left,
        rect.top, rect.right-rect.left, rect.bottom-rect.top, 0, 0, 0, 0);
                                        DeleteObject(hAudioEditorBitMap);
                                        EndPaint(hWnd, &ps);
                                }
                                break;
                        default:
                                return(DefWindowProc(hWnd, message, wParam, lParam));
                                break;
                }
                return(NULL);
        } extern "C" long FAR PASCAL _export TextEditorWndProc(HWND hWnd, unsigned message, WORD
        wParam, LONG lParam)
        {
                HDC hDC;
                RECT rect;
                char huge *ptr;
                int mediaID;
                mediaMapEntryType mediaMapEntry;
                textType text;
                HANDLE reAllocHdl;
        /*
                if (text.connections.connectMapHdl)
                        GlobalFree(text.connections.connectMapHdl);
                text.connections.connectMapHdl=0;
        */
```

```
        mediaID = GetWindowWord(hWnd, GWW_ID);
        if (media.getEntryByID(mediaID, &mediaMapEntry) == -1) return(DefWindowProc(hWnd,
message, wParam, lParam));
        if (!mediaMapEntry.dataHdl) return(DefWindowProc(hWnd, message, wParam, lParam));

if (mediaMapEntry.dataSize != 0) {
                ptr = (char huge *) GlobalLock(mediaMapEntry.dataHdl);
                memCpy((char huge *) &text, ptr, sizeof(textType));
                GlobalUnlock(mediaMapEntry.dataHdl);
                text.connections.nConnectionEntries = 0;
        } else {
                long size;

zeroMem((char huge *) &text, sizeof(textType));
                text.filename[0] = 0;
                text.connections.nConnectionEntries = 0;
                text.display = 0;

if (reAllocHdl = GlobalReAlloc(mediaMapEntry.dataHdl,
sizeof(textType)+sizeof(long)+1+sizeof(long), NULL)) {
                        mediaMapEntry.dataHdl = reAllocHdl;
                        mediaMapEntry.dataSize = sizeof(textType)+sizeof(long)+1+sizeof(long);
                        media.setEntryByID(mediaID, &mediaMapEntry);

ptr = (char huge *) GlobalLock(mediaMapEntry.dataHdl);
                        memCpy(ptr, (char huge *) &text, sizeof(textType));
                        size = 0;
                        memCpy(ptr+sizeof(textType), (char huge *) &size, sizeof(long));
                        memCpy(ptr+sizeof(textType)+sizeof(long), (char huge *) &size, 1);
                        memCpy(ptr+sizeof(textType)+sizeof(long)+1, (char huge *) &size,
sizeof(long));
                        GlobalUnlock(mediaMapEntry.dataHdl);
                }
        }

GetClientRect(hWnd, &rect);

switch (message) {
                case WM_CREATE:
                        mediaMapEntry.hChildWnd[0] = CreateWindow("edit", NULL,
                                WS_CHILD | WS_VISIBLE | WS_BORDER | WS_VSCROLL |
ES_AUTOVSCROLL | ES_MULTILINE | ES_LEFT,
                                textEditorTextLeft, textEditorTextTop, textEditorTextWidth,
textEditorTextHeight,
                                hWnd, NULL, hInst, NULL);
                        media.setEntryByID(mediaID, &mediaMapEntry);

BringWindowToTop(CreateWindow("mediaButtonWClass", "Load...",
                                WS_CHILD | WS_VISIBLE | WS_CLIPSIBLINGS,
                                textEditorLoadLeft, textEditorLoadTop, textEditorLoadWidth,
textEditorLoadHeight,
                                hWnd, textEditorLoad, hInst, NULL));

ptr = (char huge *) GlobalLock(mediaMapEntry.dataHdl);
                        SetWindowText(mediaMapEntry.hChildWnd[0],
ptr+sizeof(textType)+sizeof(long));
                        GlobalUnlock(mediaMapEntry.dataHdl);

PostMessage(hWnd, WM_COMMAND, 1999, 0);
                        break;

case WM_LBUTTONDOWN:
                        {
                                RECT clickRect;
                                POINT point;
                                int display;

point.x = LOWORD(lParam);
                                point.y = HIWORD(lParam);
```

```
                    display = text.display;

SetRect(&clickRect, 427,70,452,86);
                    if (PtInRect(&clickRect, point)) text.display = 0;

SetRect(&clickRect, 427,93,452,128);
                    if (PtInRect(&clickRect, point)) text.display = 1;

SetRect(&clickRect, 462,70,497,80);
                    if (PtInRect(&clickRect, point)) text.display = 2;

SetRect(&clickRect, 462,87,497,122);
                    if (PtInRect(&clickRect, point)) text.display = 3;

if (text.display != display) {
                            ptr = (char huge *) GlobalLock(mediaMapEntry.dataHdl);
                            memCpy(ptr, (char huge *) &text, sizeof(textType));
                            GlobalUnlock(mediaMapEntry.dataHdl);
                            SetRect(&mediaMapEntry.rect, 0,0,0,0);
                            media.setEntryByID(mediaID, &mediaMapEntry);
                            SetRect(&rect, 427,70,497,128);
                            InflateRect(&rect, 3,3);
                            InvalidateRect(hWnd, &rect, FALSE);
                    }
            }
            break;

case WM_COMMAND:
            if (wParam == 1999) {
                    SetFocus(mediaMapEntry.hChildWnd[0]);

} else if (wParam == 0) {
                    long textSize, connectSize;

textSize = GetWindowTextLength(mediaMapEntry.hChildWnd[0])+1;
                    connectSize = 0;

if (reAllocHdl = GlobalReAlloc(mediaMapEntry.dataHdl,
sizeof(textType)+sizeof(long)+textSize+sizeof(long)+connectSize, NULL)) {
                            mediaMapEntry.dataHdl = reAllocHdl;
                            mediaMapEntry.dataSize =
sizeof(textType)+sizeof(long)+textSize+sizeof(long)+connectSize;
                            media.setEntryByID(mediaID, &mediaMapEntry);

ptr = (char huge *) GlobalLock(mediaMapEntry.dataHdl);
                            memCpy(ptr, (char huge *) &text, sizeof(textType));
                            memCpy(ptr+sizeof(textType), (char huge *) &textSize,
sizeof(long));
                            GetWindowText(mediaMapEntry.hChildWnd[0],
ptr+sizeof(textType)+sizeof(long), textSize);
                            *(ptr+sizeof(textType)+sizeof(long)+textSize-1) = 0;
                            memCpy(ptr+sizeof(textType)+sizeof(long)+textSize, (char
huge *) &connectSize, sizeof(long));
                            GlobalUnlock(mediaMapEntry.dataHdl);
                    }

} else if (wParam == 1) {
                    char ext[5], fileName[128];
                    HANDLE hdl;

sprintf(ext, ".txt");
                    if (getOpenFileName(ext, fileName)) {
                            SetCursor(LoadCursor(NULL, IDC_WAIT));
                            hdl = loadFile(fileName, NULL);
                            ptr = (char huge *) GlobalLock(hdl);
                            SetWindowText(mediaMapEntry.hChildWnd[0], ptr);
                            GlobalUnlock(hdl);
                            GlobalFree(hdl);
                    }
                    chdir(currentDocumentPath);
```

```
                                }
                                break;

case WM_PAINT:
                                {
                                        PAINTSTRUCT ps;
                                        HANDLE hLibrary;
                                        RECT drawRect;
                                        HBRUSH hBrush;

//                                      if (!hTextEditorBitMap) {
//                                              chdir(homePath);
                                                hLibrary = LoadLibrary("text.dll");
                                                hTextEditorBitMap = LoadBitmap(hLibrary, "texteditor");
                                                FreeLibrary(hLibrary);
//                                              chdir(currentDocumentPath);
//                                      } hDC = BeginPaint(hWnd, &ps);
                                        ExcludeClipRect(hDC, textEditorTextLeft, textEditorTextTop,
        textEditorTextLeft+textEditorTextWidth, textEditorTextTop+textEditorTextHeight);
                                        hBitMapBlt(hDC, hTextEditorBitMap, FALSE, SRCCOPY, rect.left,
        rect.top, rect.right-rect.left, rect.bottom-rect.top, 0, 0, 0, 0);
                                        DeleteObject(hTextEditorBitMap);

switch (text.display) {
                                                case 0: SetRect(&drawRect, 427,70,452,86); break;
                                                case 1: SetRect(&drawRect, 427,93,452,128); break;
                                                case 2: SetRect(&drawRect, 462,70,497,80); break;
                                                case 3: SetRect(&drawRect, 462,87,497,122); break;
                                        }
                                        hBrush = GetStockObject(WHITE_BRUSH);
                                        InflateRect(&drawRect, 3,3);
                                        FrameRect(hDC, &drawRect, hBrush);
                                        DeleteObject(hBrush);

EndPaint(hWnd, &ps);
                                }
                                break;

case WM_DESTROY:
                                break;

default:
/*
                                text.connections.connectMapHdl=0;
*/
                                return(DefWindowProc(hWnd, message, wParam, lParam));
                                break;
                }

/*
                text.connections.connectMapHdl=0;
*/
                return(NULL);
        } extern "C" long FAR PASCAL _export DiagramEditorWndProc(HWND hWnd, unsigned message, WORD
        wParam, LONG lParam)
        {
                HDC hDC;
                RECT rect;
                char huge *ptr;
                WORD mediaID;
                mediaMapEntryType mediaMapEntry;
                diagramType diagram;
                HANDLE reAllocHdl;

mediaID = GetWindowWord(hWnd, GWW_ID);
```

```
            if (media.getEntryByID(mediaID, &mediaMapEntry) == -1) return(DefWindowProc(hWnd,
    message, wParam, lParam));
            if (!mediaMapEntry.dataHdl) return(DefWindowProc(hWnd, message, wParam, lParam));

if (mediaMapEntry.dataSize != 0) {
                    ptr = (char huge *) GlobalLock(mediaMapEntry.dataHdl);
                    memCpy((char huge *) &diagram, ptr, sizeof(diagramType));
                    GlobalUnlock(mediaMapEntry.dataHdl);
            } else {
                    zeroMem((char huge *) &diagram, sizeof(diagramType));
                    diagram.filename[0] = 0;
                    diagram.flags = diagramUseBitMapSize;
                    diagram.bitMapSize = 0;
                    diagram.nDiagramButtons = 0;

if (reAllocHdl = GlobalReAlloc(mediaMapEntry.dataHdl, sizeof(diagramType), NULL)) {
                            mediaMapEntry.dataHdl = reAllocHdl;
                            mediaMapEntry.dataSize = sizeof(diagramType);
                            media.setEntryByID(mediaID, &mediaMapEntry);

ptr = (char huge *) GlobalLock(mediaMapEntry.dataHdl);
                            memCpy(ptr, (char huge *) &diagram, sizeof(diagramType));
                            GlobalUnlock(mediaMapEntry.dataHdl);
                    }
            }

GetClientRect(hWnd, &rect);

switch (message) {
                    case WM_CREATE:
                    {
                            HWND hChildWnd;

hChildWnd = CreateWindow("diagramWClass", NULL,
                                    WS_CHILD | WS_VISIBLE | WS_CLIPSIBLINGS |
    WS_VSCROLL | WS_HSCROLL,
                                    diagramEditorDiagramLeft, diagramEditorDiagramTop,
    diagramEditorDiagramWidth, diagramEditorDiagramHeight,
                                    hWnd, mediaID | 0x8000, hInst, NULL);
                            media.getEntryByID(mediaID, &mediaMapEntry);
                            mediaMapEntry.hChildWnd[0] = hChildWnd;
                            media.setEntryByID(mediaID, &mediaMapEntry);

BringWindowToTop(CreateWindow("mediaButtonWClass", "Load...",
                                    WS_CHILD | WS_VISIBLE | WS_CLIPSIBLINGS,
                                    diagramEditorLoadLeft, diagramEditorLoadTop,
    diagramEditorLoadWidth, diagramEditorLoadHeight,
                                    hWnd, diagramEditorLoad, hInst, NULL));
                    }
                    break;

case WM_COMMAND:
                            if (wParam == 1) {
                                    char ext[5], fileName[13];
                                    long bitMapSize;
                                    HANDLE bitMapHdl;

// Set the wait cursor.
                                    SetCursor(LoadCursor(NULL, IDC_WAIT));

// Load and prepare the bitmap for the diagram.
                                    sprintf(ext, ".bmp");
                                    if (getOpenFileName(ext, fileName)) {
                                            SetCursor(LoadCursor(NULL, IDC_WAIT));
                                            if (bitMapHdl = loadFile(fileName, &bitMapSize)) {
                                                    GlobalFree(bitMapHdl);
                                                    if (reAllocHdl =
    GlobalReAlloc(mediaMapEntry.dataHdl, sizeof(diagramType)+bitMapSize, NULL)) {
                                                            mediaMapEntry.dataHdl = reAllocHdl;
```

```
                sizeof(diagramType)+bitMapSize;

&mediaMapEntry);

GlobalLock(mediaMapEntry.dataHdl);

sizeof(diagramType));

ptr+sizeof(diagramType), NULL);

SendMessage(mediaMapEntry.hChildWnd[0], WM_CREATE, NULL, NULL);

GetClientRect(mediaMapEntry.hChildWnd[0], &rect);

InvalidateRect(mediaMapEntry.hChildWnd[0], &rect, FALSE);
                                        }
                        } else {
                                MessageBox(GetFocus(), "Could not load the bitmap
file.", "MTP", MB_ICONSTOP | MB_OK);
                        }
                        chdir(currentDocumentPath);
                }
                break;

case WM_PAINT:
                {
                        PAINTSTRUCT ps;
                        HANDLE hLibrary;

//                      if (!hDiagramEditorBitMap) {
//                              chdir(homePath);
                                hLibrary = LoadLibrary("diagram.dll");
                                hDiagramEditorBitMap = LoadBitmap(hLibrary,
"diagrameditor");
                                FreeLibrary(hLibrary);
//                              chdir(currentDocumentPath);
//                      } hDC = BeginPaint(hWnd, &ps);
                        ExcludeClipRect(hDC, diagramEditorDiagramLeft,
diagramEditorDiagramTop, diagramEditorDiagramLeft+diagramEditorDiagramWidth,
diagramEditorDiagramTop+diagramEditorDiagramHeight);
                        hBitMapBlt(hDC, hDiagramEditorBitMap, FALSE, SRCCOPY,
rect.left, rect.top, rect.right-rect.left, rect.bottom-rect.top, 0, 0, 0, 0);
                        DeleteObject(hDiagramEditorBitMap);
                        IntersectClipRect(hDC, diagramEditorDiagramLeft,
diagramEditorDiagramTop, diagramEditorDiagramLeft+diagramEditorDiagramWidth,
diagramEditorDiagramTop+diagramEditorDiagramHeight);
                        EndPaint(hWnd, &ps);
                }
                break;

case WM_DESTROY:
                break;

default:
                return(DefWindowProc(hWnd, message, wParam, lParam));
                break;
        }
```

```
                mediaMapEntry.dataSize =

SetRect(&mediaMapEntry.rect, 0,0,0,0);
                media.setEntryByID(mediaID, ptr = (char huge *)

diagram.flags |= diagramHasBitMap;
                diagram.bitMapSize = bitMapSize;
                memCpy(ptr, (char huge *) &diagram, loadFileAt(fileName, GlobalUnlock(mediaMapEntry.dataHdl);
```

```
            return(NULL);
    }
```

We claim:

1. A method for displaying a sequence of graphics, text, video and audio events, the method comprising the steps of:

displaying a plurality of filter icons, each of said plurality of filter icons representing a respective one of a plurality of filters;

displaying a first plurality of triggers in response to a user selecting one of said plurality of filter icons;

receiving a user input selecting one of said first plurality of triggers;

displaying a sequence of graphics, text, video and audio events connected to a selected trigger and a selected filter icon;

wherein each of said plurality of filters designates a unique characteristic of events in said sequence of graphics, text, video and audio events connected to said selected trigger, and wherein each of said respective one of said plurality of filters is linked to a designated plurality of triggers and said selected trigger is linked to a designated plurality of filters.

2. The method of claim 1 wherein said respective one of said plurality of filters is a define filter.

3. The method of claim 2 wherein said define filter provides a definition for said selected trigger.

4. The method of claim 1 wherein said respective one of said plurality of filters is a context filter.

5. The method of claim 4 wherein said context filter provides a context for said selected trigger.

6. The method of claim 1 wherein said respective one of said plurality of filters is an interpret filter.

7. The method of claim 6 wherein said interpret filter provides a definition for said selected trigger information relating to an interpretation for said selected trigger.

8. The method of claim 1 wherein said respective one of said plurality of filters is a method filter.

9. The method of claim 8 wherein said method filter provides information relating to a literary or poetic method represented by said selected trigger.

10. The method of claim 1 wherein said selected trigger is a word or phrase in a text event.

11. The method of claim 10 wherein said sequence of graphics, text, video and audio events includes a second plurality of triggers.

12. The method of claim 1 wherein said selected trigger is a section of a graphic event.

13. The method of claim 12 wherein said sequence of graphics, text, video and audio events includes a second plurality of triggers.

14. The method of claim 1 wherein said selected trigger is a section of a video event.

15. The method of claim 14 wherein said sequence of graphics, text, video and audio events includes a second plurality of triggers.

16. The method of claim 1 wherein said selected trigger is a section of an audio event.

17. The method of claim 16 wherein said sequence of graphics, text, video and audio events includes a second plurality of triggers.

18. A computer for displaying a sequence of graphics, text, video and audio events, said computer comprising:

means for displaying a plurality of triggers and a plurality of filter icons, each of said plurality of filter icons representing a respective one of a plurality of filters;

means for selecting one of said plurality of triggers;

means for selecting one of said plurality of filter icons;

means for displaying a sequence of graphics, text, video and audio events connected to a selected trigger and a selected filter icon;

wherein each of said plurality of filters designates a unique characteristic of events in said sequence of graphics, text, video and audio events connected to said selected trigger, and wherein each of said respective one of said plurality of filters is linked to a designated plurality of triggers and said selected trigger is linked to a designated plurality of filters.

19. The computer of claim 18 wherein said respective one of said plurality of filters is a define filter.

20. The computer of claim 19 wherein said define filter provides a definition for said selected trigger.

21. The computer of claim 18 wherein said respective one of said plurality of filters is a context filter.

22. The computer of claim 21 wherein said context filter provides a context for said selected trigger.

23. The computer of claim 18 wherein said respective one of said plurality of filters is an interpret filter.

24. The computer of claim 23 wherein said interpret filter provides a definition for said selected trigger information relating to an interpretation for said selected trigger.

25. The computer of claim 18 wherein said respective one of said plurality of filters is a method filter.

26. The computer of claim 25 wherein said method filter provides information relating to a literary or poetic method represented by said selected trigger.

27. The computer of claim 26 wherein said selected trigger is a word or phrase in a text event.

28. The computer of claim 27 wherein said sequence of graphics, text, video and audio events includes a second plurality of triggers.

29. The computer of claim 18 wherein said selected trigger is a section of a graphic event.

30. The computer of claim 29 whereto said sequence of graphics, text, video and audio events includes a second plurality of triggers.

31. The computer of claim 18 wherein said selected trigger is a section of a video event.

32. The computer of claim 31 whereto said sequence of graphics, text, video and audio events includes a second plurality of triggers.

33. The computer of claim 18 wherein said selected trigger is a section of an audio event.

34. The computer of claim 33 wherein said sequence of graphics, text, video and audio events includes a second plurality of triggers.

\* \* \* \* \*